United States Patent
Dhuse et al.

(10) Patent No.: US 9,894,151 B2
(45) Date of Patent: *Feb. 13, 2018

(54) GENERATING A SECURE SIGNATURE UTILIZING A PLURALITY OF KEY SHARES

(71) Applicant: CLEVERSAFE, INC., Chicago, IL (US)

(72) Inventors: Greg Dhuse, Chicago, IL (US); Jason K. Resch, Chicago, IL (US); Wesley Leggette, Chicago, IL (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/147,982

(22) Filed: Jan. 6, 2014

(65) Prior Publication Data

US 2014/0122891 A1 May 1, 2014

Related U.S. Application Data

(63) Continuation of application No. 13/413,232, filed on Mar. 6, 2012, now Pat. No. 8,627,091.

(Continued)

(51) Int. Cl.
*H04L 9/32* (2006.01)
*H04L 29/08* (2006.01)
(Continued)

(52) U.S. Cl.
CPC ...... *H04L 67/1004* (2013.01); *G06F 11/1076* (2013.01); *H04L 9/085* (2013.01);
(Continued)

(58) Field of Classification Search
CPC ... H04L 9/085; H04L 9/3247; H04L 67/1004; H04L 67/1097; H04L 67/2847;
(Continued)

(56) References Cited

U.S. PATENT DOCUMENTS 5,675,649 A * 10/1997 Brennan ............... H04L 9/085
380/286
6,490,680 B1 * 12/2002 Scheidt ............. H04L 63/0442
380/286
(Continued)

FOREIGN PATENT DOCUMENTS

WO   WO 2009048726 A1 * 4/2009 .......... G06F 11/1004

OTHER PUBLICATIONS

Rhea, "The OceanStore Write Path", University of California, Berkeley, Jun. 11, 2002, 43 pages.*
(Continued)

*Primary Examiner* — Luu Pham
*Assistant Examiner* — Walter Malinowski
(74) *Attorney, Agent, or Firm* — Garlick & Markison; Timothy W. Markison; Harry S. Tyson, Jr.

(57) ABSTRACT

A method begins by a module to generate a secure signature on an item by selecting a first key representation index of a set of key representation indexes, wherein a first mathematical encoding of a private key generates a first plurality of key shares as a first key representation. The method continues with the module determining whether a first plurality of signature contributions have been received in response to a signature request for the item based on the first key representation index, wherein one of a first set of dispersed storage (DS) units executes a first mathematical signature function using one of the first plurality of key shares on the item to produce a signature contribution of the first plurality of signature contributions and when the first plurality of signature contributions have been received, generating the secure signature on the item from the first plurality of signature contributions.

18 Claims, 30 Drawing Sheets

Related U.S. Application Data

(60) Provisional application No. 61/470,524, filed on Apr. 1, 2011.

(51) Int. Cl.
*H04L 9/08* (2006.01)
*H04N 21/8358* (2011.01)
*G06F 11/10* (2006.01)

(52) U.S. Cl.
CPC ........ *H04L 9/3247* (2013.01); *H04L 67/1097* (2013.01); *H04L 67/2847* (2013.01); *H04N 21/8358* (2013.01); *H04L 2209/34* (2013.01)

(58) Field of Classification Search
CPC ..... H04L 9/08; H04L 9/0883; H04L 67/3281; H04L 2209/34; G06F 11/1076; H04N 21/8358
USPC ................................. 713/176, 171; 380/278
See application file for complete search history.

(56) References Cited

U.S. PATENT DOCUMENTS

| | | | |
|---|---|---|---|
| 6,931,549 B1* | 8/2005 | Ananda | 726/26 |
| 6,947,563 B2* | 9/2005 | Fagin | H04N 7/163 380/210 |
| 7,079,654 B1* | 7/2006 | Remery | G06Q 20/382 380/278 |
| 7,127,067 B1* | 10/2006 | Wachtler | H04L 9/0833 380/255 |
| 7,136,489 B1* | 11/2006 | Madhusudhana et al. | 380/277 |
| 7,187,772 B2* | 3/2007 | Vora | G06Q 20/00 380/277 |
| 7,194,628 B1* | 3/2007 | Guthery | H04L 9/085 713/168 |
| 7,636,724 B2 | 12/2009 | de la Torre et al. | |
| 8,031,875 B1* | 10/2011 | Juels | G06Q 10/087 380/277 |
| 8,520,855 B1* | 8/2013 | Kohno | G06F 21/602 380/259 |
| 2002/0013898 A1* | 1/2002 | Sudia | G06Q 20/02 713/155 |
| 2002/0104025 A1* | 8/2002 | Wrench, Jr. | H04L 9/08 726/3 |
| 2002/0116611 A1* | 8/2002 | Zhou et al. | 713/156 |
| 2002/0126847 A1* | 9/2002 | Wajs | H04N 7/163 380/255 |
| 2003/0026432 A1* | 2/2003 | Woodward | H04L 9/085 380/278 |
| 2003/0088782 A1* | 5/2003 | Forrest | H04L 9/085 713/186 |
| 2003/0088783 A1* | 5/2003 | DiPierro | 713/189 |
| 2003/0120931 A1* | 6/2003 | Hopkins et al. | 713/180 |
| 2003/0172280 A1* | 9/2003 | Scheidt | H04L 63/0442 713/182 |
| 2004/0250082 A1* | 12/2004 | Li | H04L 9/3247 713/181 |
| 2005/0080746 A1* | 4/2005 | Zhu | G06F 21/10 705/59 |
| 2005/0240591 A1* | 10/2005 | Marceau et al. | 707/9 |
| 2005/0262038 A1* | 11/2005 | Sepez et al. | 707/1 |
| 2006/0034494 A1* | 2/2006 | Holloran | H04L 9/32 382/116 |
| 2006/0075246 A1* | 4/2006 | Suga | 713/176 |
| 2006/0130154 A1* | 6/2006 | Lam et al. | 726/30 |
| 2006/0177061 A1* | 8/2006 | Orsini | G06F 21/606 380/268 |
| 2007/0016776 A1* | 1/2007 | Lucidarme | H04H 20/72 713/168 |
| 2007/0101140 A1* | 5/2007 | Rhoads | 713/171 |
| 2007/0116269 A1* | 5/2007 | Nochta | 380/30 |
| 2007/0130084 A1* | 6/2007 | Kay et al. | 705/67 |
| 2007/0180259 A1* | 8/2007 | Bulot | G06Q 50/22 713/183 |
| 2007/0223706 A1* | 9/2007 | Gantman et al. | 380/286 |
| 2008/0181413 A1* | 7/2008 | Yi | H04L 9/085 380/279 |
| 2008/0226065 A1* | 9/2008 | Zunke | H04L 9/0822 380/30 |
| 2009/0080659 A1* | 3/2009 | Elder et al. | 380/278 |
| 2009/0132830 A1* | 5/2009 | Haga | H04L 9/3249 713/189 |
| 2009/0254750 A1* | 10/2009 | Bono | H04L 63/0428 713/170 |
| 2009/0323972 A1* | 12/2009 | Kohno | G06F 21/6245 380/284 |
| 2010/0023771 A1* | 1/2010 | Struik | 713/171 |
| 2010/0037055 A1* | 2/2010 | Fazio | H04L 9/3218 713/171 |
| 2010/0054481 A1* | 3/2010 | Jajodia | H04L 9/0897 380/284 |
| 2010/0180116 A1* | 7/2010 | Coan | H04L 9/0891 713/168 |
| 2010/0235638 A1* | 9/2010 | Irvine | H04L 9/085 713/168 |
| 2011/0099203 A1* | 4/2011 | Fastring | G06F 17/30256 707/783 |
| 2011/0126295 A1* | 5/2011 | Resch | G06F 21/64 726/27 |
| 2012/0102286 A1* | 4/2012 | Holt et al. | 711/165 |
| 2014/0068260 A1* | 3/2014 | Oney | H04L 63/045 713/168 |

OTHER PUBLICATIONS

Libert, "Non-Interactive CCA-Secure Threshold Cryptosystems with Adaptive Security: New Framework and Constructions",Theory of Cryptography, 2012, pp. 75-93.*
Rhea, "Pond: the OceanStore Prototype", University of California, Berkeley, Jan. 6, 2003, 34 pages.*
Ong, "Optimizing Robustness while Generating Shared Secret Safe Primes", University of California, Berkeley, 2005, 18 pages.*
Schnitzer, "Secured Storage Using SecureParser", StorageSS'05, Nov. 11, 20015, Fairfax, Virginia, USA,. pp. 135-140.*
Li, "A Novel Pairwise Keys Pre-Distribution Scheme Based on Binary Tree in Wireless Sensor Networks", 2006 6$^{th}$ International Conference on ITS Telecommunications Proceedings, 2006, IEEE, pp. 913-916.*
Wiegand, "Scalable Video Coding for IPTV Services", IEEE Transactions on Broadcasting, vol. 55, No. 2, Jun. 2009, pp. 527-538.*
Libert, "Adaptively Secure Non-Interactive Threshold Cryptosystems", International Colloquium on Automata, Languages, and Programming, 2011, pp. 588-600.*
Boneh D., Boyen X., Halevi S. (2006) Chosen Ciphertext Secure Public Key Threshold Encryption Without Random Oracles. In: Pointcheval D. (eds) Topics in Cryptology—CT-RSA 2006. CT-RSA 2006. Lecture Notes in Computer Science, vol. 3860. Springer, Berlin, Heidelberg.*
Zhu, "Analyzing Euler-Fermat Theorem Based Multicast Key Distribution Schemes with Chinese Remainder Theorem", 2008 IFIP International Conference on Network and Parallel Computing, 2008, pp. 11-17.*
Nyang, "Knowledge-Proof Based Versatile Smart Card Verification Protocol", ACM Computer Communication Review, 2000, pp. 39-44.*
Kubiatowicz, et al.; OceanStore: An Architecture for Global-Scale Persistent Storage; Proceedings of the Ninth International Conference on Architectural Support for Programming Languages and Operating Systems (ASPLOS 2000); Nov. 2000; pp. 1-12.

* cited by examiner

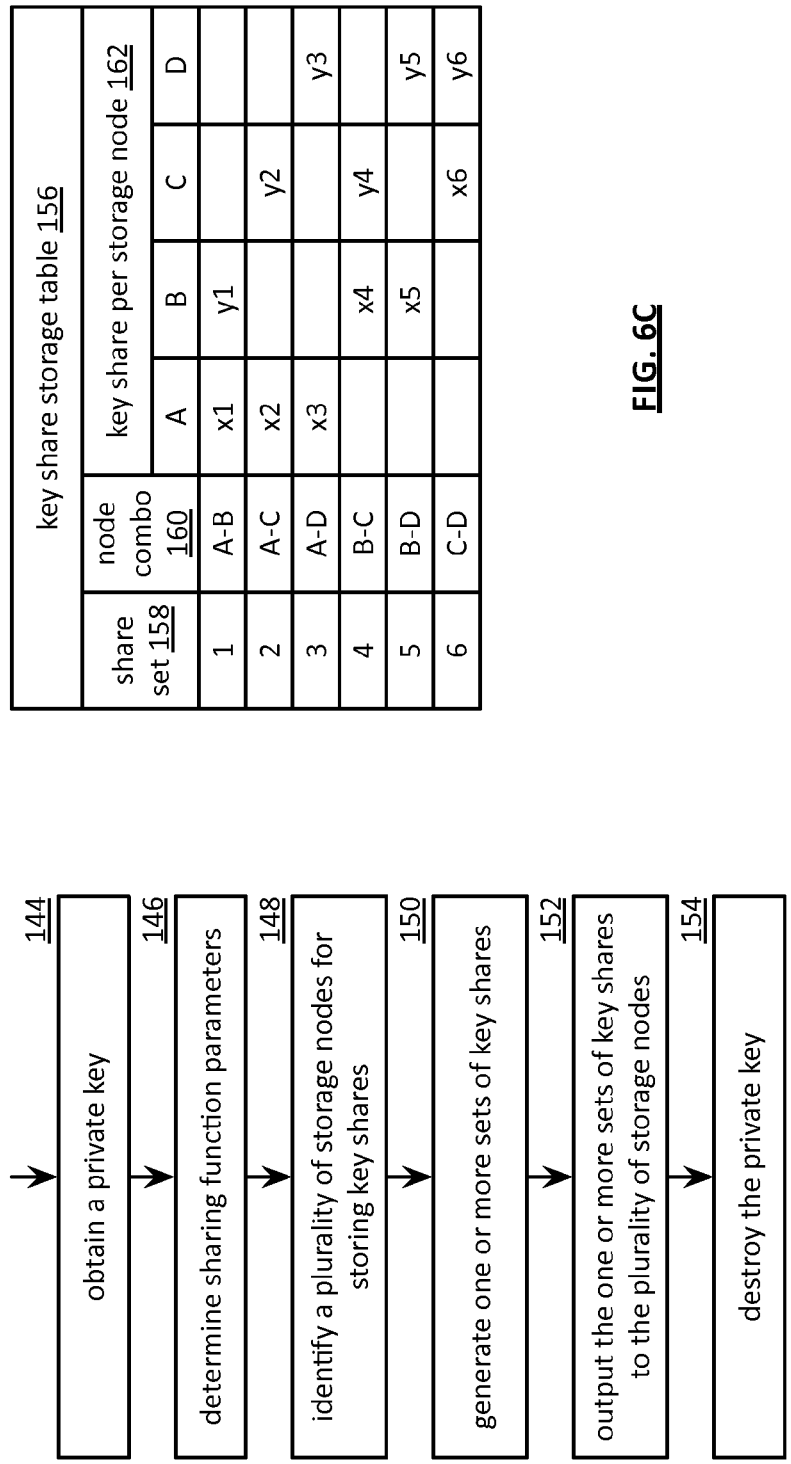

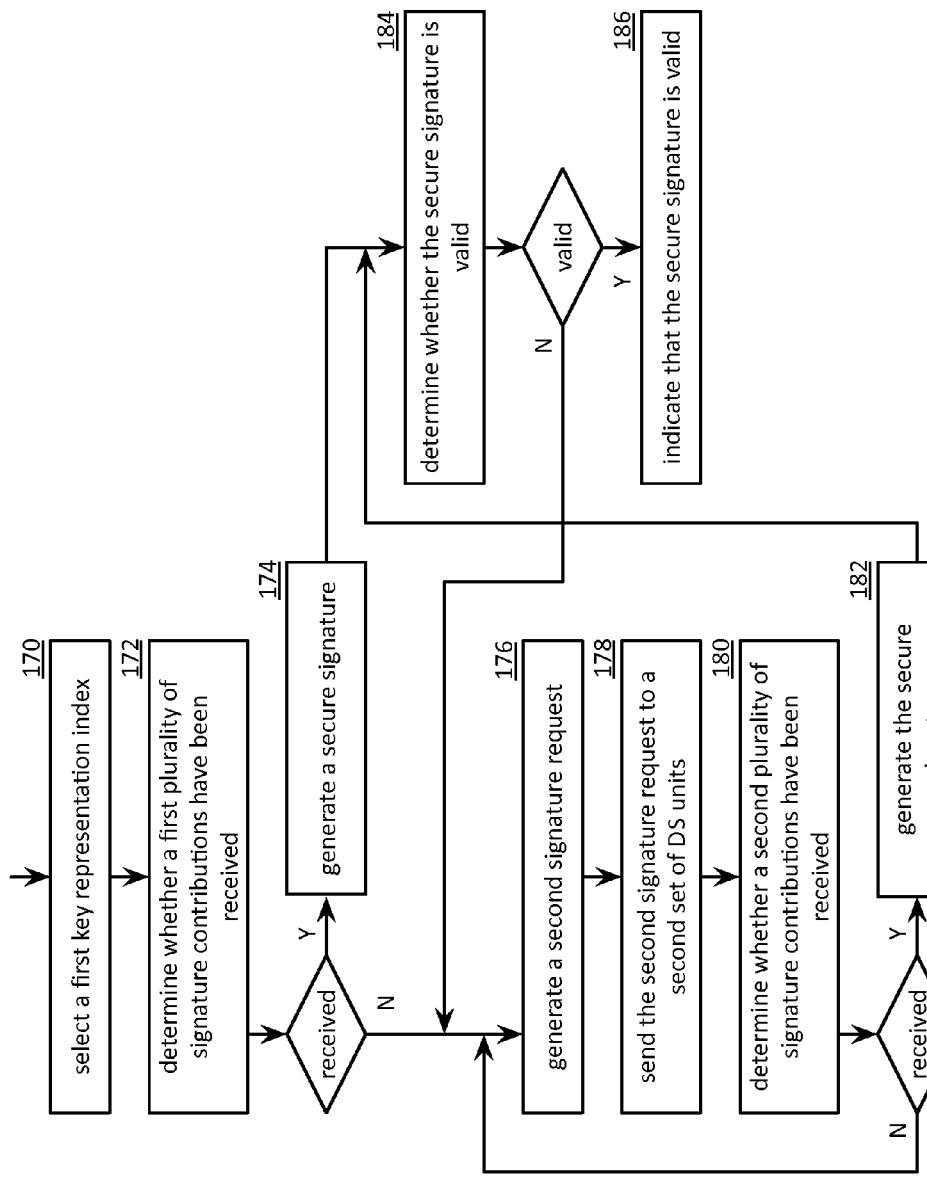

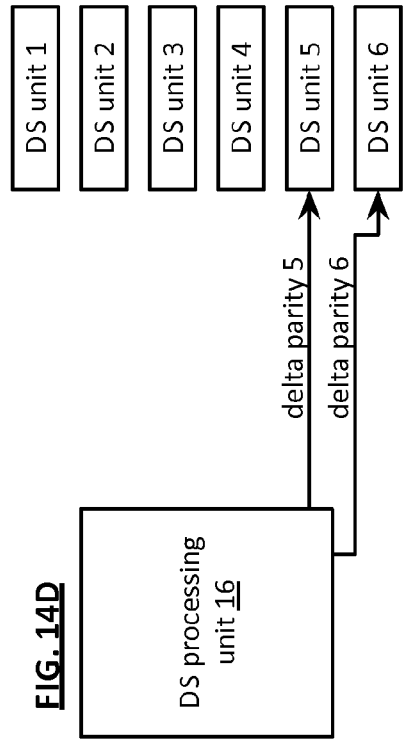
FIG. 14B
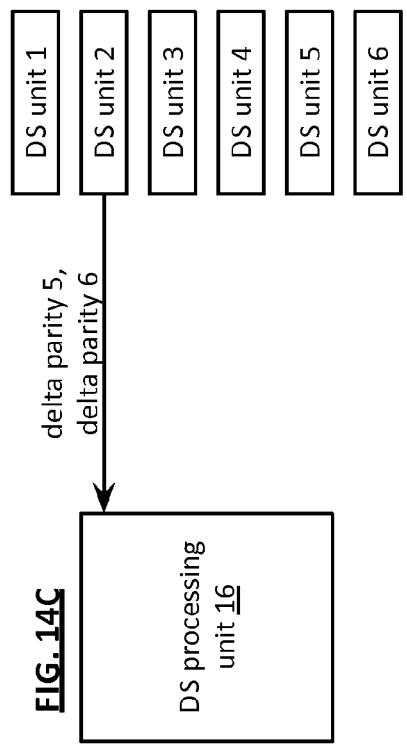
FIG. 14D
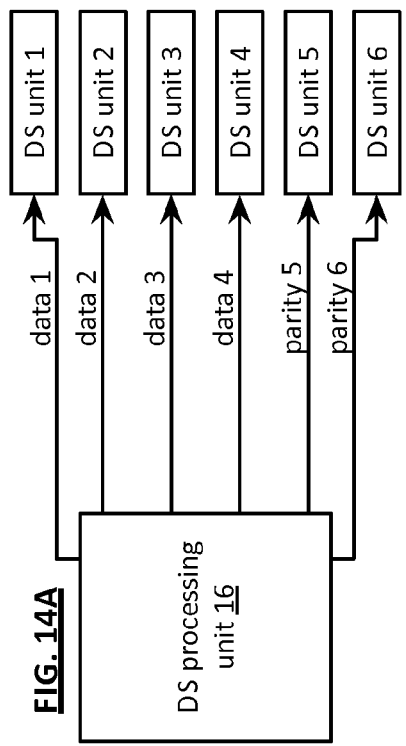
FIG. 14A
FIG. 14C

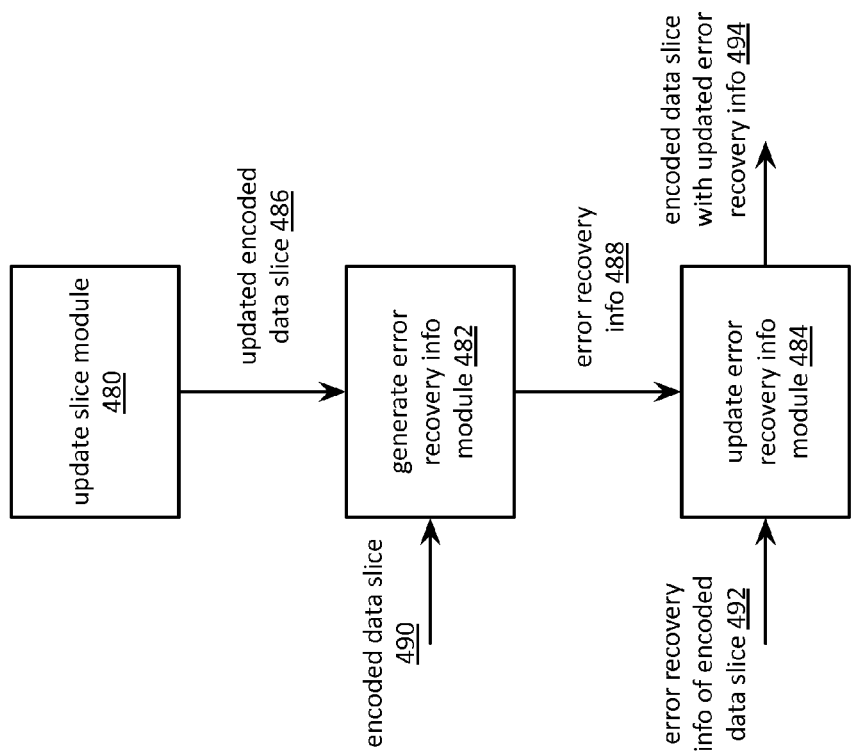

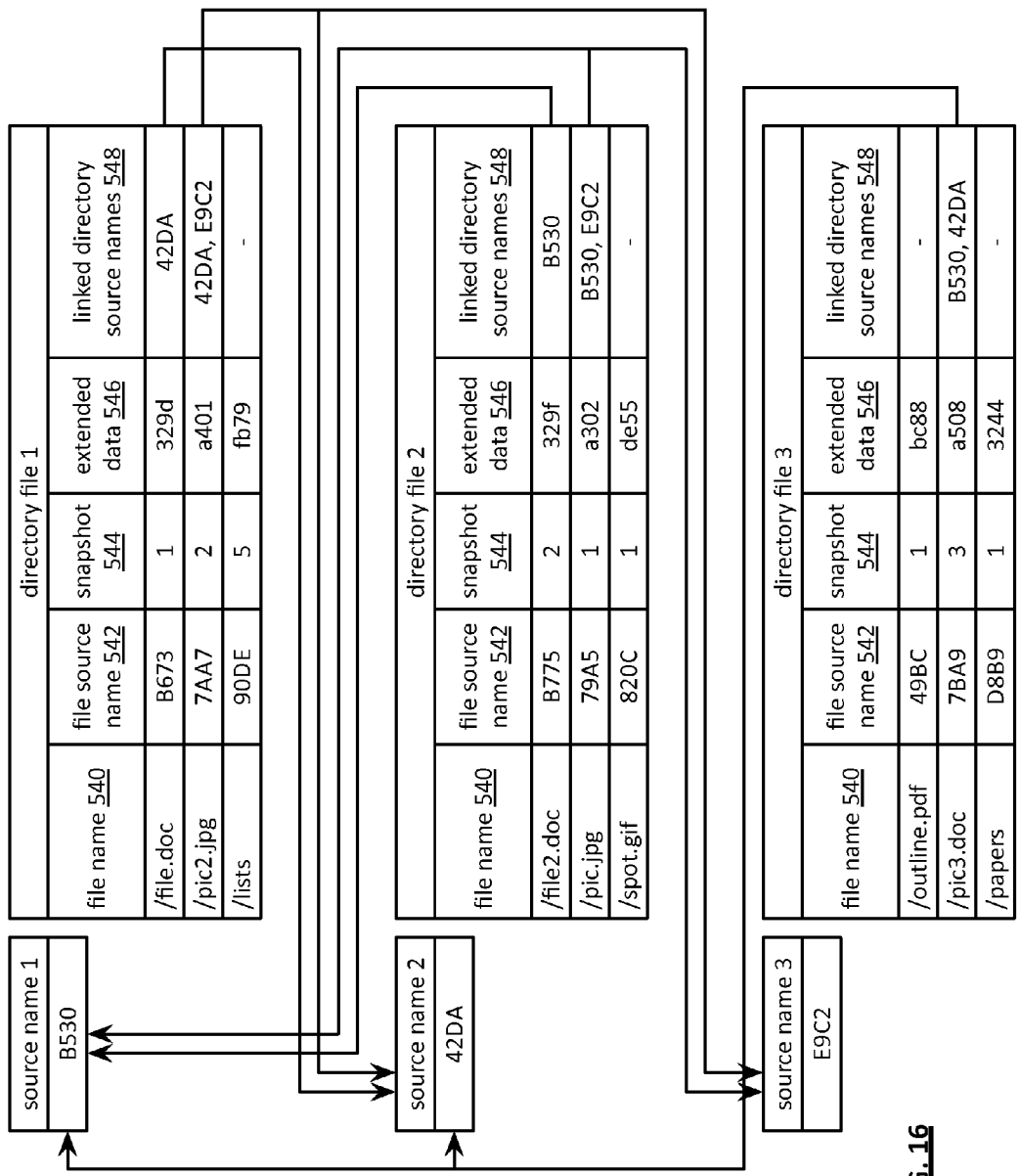

GENERATING A SECURE SIGNATURE UTILIZING A PLURALITY OF KEY SHARES

CROSS REFERENCE TO RELATED PATENTS

The present U.S. Utility Patent Application claims priority pursuant to 35 U.S.C. § 120 as a continuation of U.S. Utility application Ser. No. 13/413,232, entitled "GENERATING A SECURE SIGNATURE UTILIZING A PLURALITY OF KEY SHARES", filed Mar. 6, 2012, issuing as U.S. Pat. No. 8,627,091 on Jan. 7, 2014, which claims priority pursuant to 35 U.S.C. § 119(e) to U.S. Provisional Application No. 61/470,524, entitled "ENCODING DATA STORED IN A DISPERSED STORAGE NETWORK", filed Apr. 1, 2011, all of which are hereby incorporated herein by reference in their entirety and made part of the present U.S. Utility Patent Application for all purposes.

STATEMENT REGARDING FEDERALLY SPONSORED RESEARCH OR DEVELOPMENT

Not Applicable

INCORPORATION-BY-REFERENCE OF MATERIAL SUBMITTED ON A COMPACT DISC

Not Applicable

BACKGROUND OF THE INVENTION

Technical Field of the Invention

This invention relates generally to computing systems and more particularly to data storage solutions within such computing systems.

Description of Related Art

Computers are known to communicate, process, and store data. Such computers range from wireless smart phones to data centers that support millions of web searches, stock trades, or on-line purchases every day. In general, a computing system generates data and/or manipulates data from one form into another. For instance, an image sensor of the computing system generates raw picture data and, using an image compression program (e.g., JPEG, MPEG, etc.), the computing system manipulates the raw picture data into a standardized compressed image.

With continued advances in processing speed and communication speed, computers are capable of processing real time multimedia data for applications ranging from simple voice communications to streaming high definition video. As such, general-purpose information appliances are replacing purpose-built communications devices (e.g., a telephone). For example, smart phones can support telephony communications but they are also capable of text messaging and accessing the Internet to perform functions including email, web browsing, remote applications access, and media communications (e.g., telephony voice, image transfer, music files, video files, real time video streaming. etc.).

Each type of computer is constructed and operates in accordance with one or more communication, processing, and storage standards. As a result of standardization and with advances in technology, more and more information content is being converted into digital formats. For example, more digital cameras are now being sold than film cameras, thus producing more digital pictures. As another example, web-based programming is becoming an alternative to over the air television broadcasts and/or cable broadcasts. As further examples, papers, books, video entertainment, home video, etc. are now being stored digitally, which increases the demand on the storage function of computers.

A typical computer storage system includes one or more memory devices aligned with the needs of the various operational aspects of the computer's processing and communication functions. Generally, the immediacy of access dictates what type of memory device is used. For example, random access memory (RAM) memory can be accessed in any random order with a constant response time, thus it is typically used for cache memory and main memory. By contrast, memory device technologies that require physical movement such as magnetic disks, tapes, and optical discs, have a variable response time as the physical movement can take longer than the data transfer, thus they are typically used for secondary memory (e.g., hard drive, backup memory, etc.).

A computer's storage system will be compliant with one or more computer storage standards that include, but are not limited to, network file system (NFS), flash file system (FFS), disk file system (DFS), small computer system interface (SCSI), internet small computer system interface (iSCSI), file transfer protocol (FTP), and web-based distributed authoring and versioning (WebDAV). These standards specify the data storage format (e.g., files, data objects, data blocks, directories, etc.) and interfacing between the computer's processing function and its storage system, which is a primary function of the computer's memory controller.

Despite the standardization of the computer and its storage system, memory devices fail; especially commercial grade memory devices that utilize technologies incorporating physical movement (e.g., a disc drive). For example, it is fairly common for a disc drive to routinely suffer from bit level corruption and to completely fail after three years of use. One solution is to a higher-grade disc drive, which adds significant cost to a computer.

Another solution is to utilize multiple levels of redundant disc drives to replicate the data into two or more copies. One such redundant drive approach is called redundant array of independent discs (RAID). In a RAID device, a RAID controller adds parity data to the original data before storing it across the array. The parity data is calculated from the original data such that the failure of a disc will not result in the loss of the original data. For example, RAID 5 uses three discs to protect data from the failure of a single disc. The parity data, and associated redundancy overhead data, reduces the storage capacity of three independent discs by one third (e.g., n−1=capacity). RAID 6 can recover from a loss of two discs and requires a minimum of four discs with a storage capacity of n−2.

While RAID addresses the memory device failure issue, it is not without its own failure issues that affect its effectiveness, efficiency and security. For instance, as more discs are added to the array, the probability of a disc failure increases, which increases the demand for maintenance. For example, when a disc fails, it needs to be manually replaced before another disc fails and the data stored in the RAID device is lost. To reduce the risk of data loss, data on a RAID device is typically copied on to one or more other RAID devices. While this addresses the loss of data issue, it raises a security issue since multiple copies of data are available, which increases the chances of unauthorized access. Further, as the amount of data being stored grows, the overhead of RAID devices becomes a non-trivial efficiency issue.

BRIEF DESCRIPTION OF THE SEVERAL VIEWS OF THE DRAWING(S)

FIG. 6B is a flowchart illustrating an example of storing key shares in accordance with the present invention;

FIG. 6C is a diagram illustrating an example of a key share storage table in accordance with the present invention;

FIG. 6D is a flowchart illustrating an example of generating a signature in accordance with the present invention;

FIG. 14A is a schematic block diagram of another embodiment of a computing system in accordance with the present invention;

FIG. 14B is a schematic block diagram of another embodiment of a computing system in accordance with the present invention;

FIG. 14C is a schematic block diagram of another embodiment of a computing system in accordance with the present invention;

FIG. 14D is a schematic block diagram of another embodiment of a computing system in accordance with the present invention;

FIG. 15A is a schematic block diagram of an embodiment of a dispersed storage system in accordance with the present invention;

FIG. 16 is a diagram illustrating an example of a directory file structure in accordance with the present invention;

DETAILED DESCRIPTION OF THE INVENTION

Figure 1:
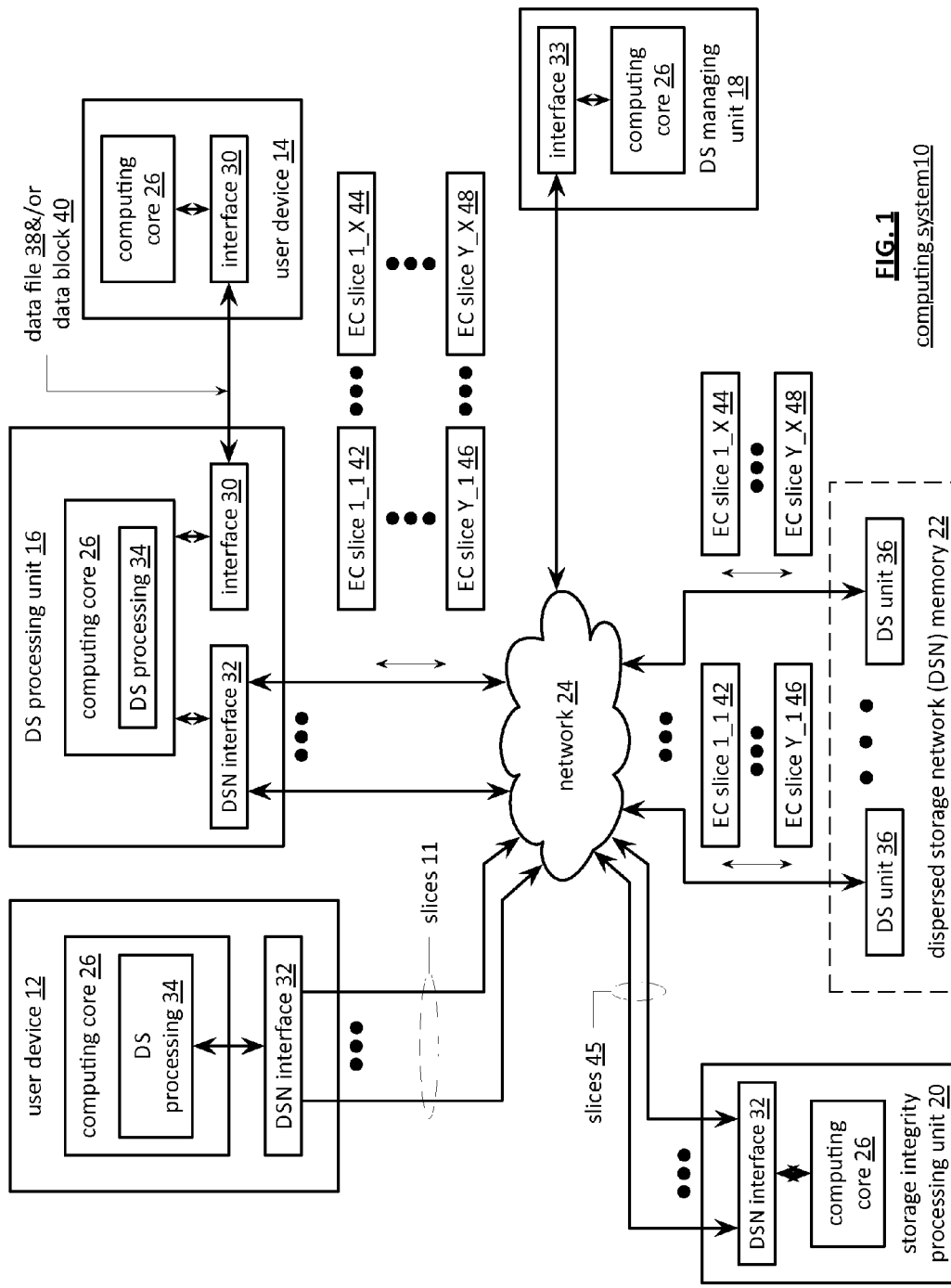
FIG. 1 is a schematic block diagram of an embodiment of a computing system in accordance with the present invention.

FIG. 1 is a schematic block diagram of a computing system 10 that includes one or more of a first type of user devices 12, one or more of a second type of user devices 14, at least one distributed storage (DS) processing unit 16, at least one DS managing unit 18, at least one storage integrity processing unit 20, and a distributed storage network (DSN) memory 22 coupled via a network 24. The network 24 may include one or more wireless and/or wire lined communication systems; one or more private intranet systems and/or public internet systems; and/or one or more local area networks (LAN) and/or wide area networks (WAN).

The DSN memory 22 includes a plurality of distributed storage (DS) units 36 for storing data of the system. Each of the DS units 36 includes a processing module and memory and may be located at a geographically different site than the other DS units (e.g., one in Chicago, one in Milwaukee, etc.).

Each of the user devices 12-14, the DS processing unit 16, the DS managing unit 18, and the storage integrity processing unit 20 may be a portable computing device (e.g., a social networking device, a gaming device, a cell phone, a smart phone, a personal digital assistant, a digital music player, a digital video player, a laptop computer, a handheld computer, a video game controller, and/or any other portable device that includes a computing core) and/or a fixed computing device (e.g., a personal computer, a computer server, a cable set-top box, a satellite receiver, a television set, a printer, a fax machine, home entertainment equipment, a video game console, and/or any type of home or office computing equipment). Such a portable or fixed computing device includes a computing core 26 and one or more interfaces 30, 32, and/or 33. An embodiment of the computing core 26 will be described with reference to FIG. 2.

With respect to the interfaces, each of the interfaces 30, 32, and 33 includes software and/or hardware to support one or more communication links via the network 24 and/or directly. For example, interface 30 supports a communication link (wired, wireless, direct, via a LAN, via the network 24, etc.) between the first type of user device 14 and the DS processing unit 16. As another example, DSN interface 32 supports a plurality of communication links via the network 24 between the DSN memory 22 and the DS processing unit 16, the first type of user device 12, and/or the storage integrity processing unit 20. As yet another example, interface 33 supports a communication link between the DS managing unit 18 and any one of the other devices and/or units 12, 14, 16, 20, and/or 22 via the network 24.

In general, and with respect to data storage, the system 10 supports three primary functions: distributed network data storage management, distributed data storage and retrieval, and data storage integrity verification. In accordance with these three primary functions, data can be distributedly stored in a plurality of physically different locations and subsequently retrieved in a reliable and secure manner regardless of failures of individual storage devices, failures of network equipment, the duration of storage, the amount of data being stored, attempts at hacking the data, etc.

The DS managing unit 18 performs distributed network data storage management functions, which include establishing distributed data storage parameters, performing network operations, performing network administration, and/or performing network maintenance. The DS managing unit 18 establishes the distributed data storage parameters (e.g., allocation of virtual DSN memory space, distributed storage parameters, security parameters, billing information, user profile information, etc.) for one or more of the user devices 12-14 (e.g., established for individual devices, established for a user group of devices, established for public access by the user devices, etc.). For example, the DS managing unit 18 coordinates the creation of a vault (e.g., a virtual memory block) within the DSN memory 22 for a user device (for a group of devices, or for public access). The DS managing unit 18 also determines the distributed data storage parameters for the vault. In particular, the DS managing unit 18 determines a number of slices (e.g., the number that a data segment of a data file and/or data block is partitioned into for distributed storage) and a read threshold value (e.g., the minimum number of slices required to reconstruct the data segment).

As another example, the DS managing unit 18 creates and stores, locally or within the DSN memory 22, user profile information. The user profile information includes one or more of authentication information, permissions, and/or the security parameters. The security parameters may include one or more of encryption/decryption scheme, one or more encryption keys, key generation scheme, and data encoding/decoding scheme.

As yet another example, the DS managing unit 18 creates billing information for a particular user, user group, vault access, public vault access, etc. For instance, the DS managing unit 18 tracks the number of times a user accesses a private vault and/or public vaults, which can be used to generate a per-access bill. In another instance, the DS managing unit 18 tracks the amount of data stored and/or retrieved by a user device and/or a user group, which can be used to generate a per-data-amount bill.

The DS managing unit 18 also performs network operations, network administration, and/or network maintenance. As at least part of performing the network operations and/or administration, the DS managing unit 18 monitors performance of the devices and/or units of the system 10 for potential failures, determines the devices' and/or units' activation status, determines the devices' and/or units' loading, and any other system level operation that affects the performance level of the system 10. For example, the DS managing unit 18 receives and aggregates network management alarms, alerts, errors, status information, performance information, and messages from the devices 12-14 and/or the units 16, 20, 22. For example, the DS managing unit 18 receives a simple network management protocol (SNMP) message regarding the status of the DS processing unit 16.

The DS managing unit 18 performs the network maintenance by identifying equipment within the system 10 that needs replacing, upgrading, repairing, and/or expanding. For example, the DS managing unit 18 determines that the DSN memory 22 needs more DS units 36 or that one or more of the DS units 36 needs updating.

The second primary function (i.e., distributed data storage and retrieval) begins and ends with a user device 12-14. For instance, if a second type of user device 14 has a data file 38 and/or data block 40 to store in the DSN memory 22, it sends the data file 38 and/or data block 40 to the DS processing unit 16 via its interface 30. As will be described in greater detail with reference to FIG. 2, the interface 30 functions to mimic a conventional operating system (OS) file system interface (e.g., network file system (NFS), flash file system (FFS), disk file system (DFS), file transfer protocol (FTP), web-based distributed authoring and versioning (WebDAV), etc.) and/or a block memory interface (e.g., small computer system interface (SCSI), internet small computer system interface (iSCSI), etc.). In addition, the interface 30 may attach a user identification code (ID) to the data file 38 and/or data block 40.

The DS processing unit 16 receives the data file 38 and/or data block 40 via its interface 30 and performs a distributed storage (DS) process 34 thereon (e.g., an error coding dispersal storage function). The DS processing 34 begins by partitioning the data file 38 and/or data block 40 into one or more data segments, which is represented as Y data segments. For example, the DS processing 34 may partition the data file 38 and/or data block 40 into a fixed byte size segment (e.g., $2^1$ to $2^n$ bytes, where n=>2) or a variable byte size (e.g., change byte size from segment to segment, or from groups of segments to groups of segments, etc.).

For each of the Y data segments, the DS processing 34 error encodes (e.g., forward error correction (FEC), information dispersal algorithm, or error correction coding) and slices (or slices then error encodes) the data segment into a plurality of error coded (EC) data slices 42-48, which is represented as X slices per data segment. The number of slices (X) per segment, which corresponds to a number of pillars n, is set in accordance with the distributed data storage parameters and the error coding scheme. For example, if a Reed-Solomon (or other FEC scheme) is used in an n/k system, then a data segment is divided into n slices, where k number of slices is needed to reconstruct the original data (i.e., k is the threshold). As a few specific examples, the n/k factor may be 5/3; 6/4; 8/6; 8/5; 16/10.

For each EC slice 42-48, the DS processing unit 16 creates a unique slice name and appends it to the corresponding EC slice 42-48. The slice name includes universal DSN memory addressing routing information (e.g., virtual memory addresses in the DSN memory 22) and user-specific information (e.g., user ID, file name, data block identifier, etc.).

The DS processing unit 16 transmits the plurality of EC slices 42-48 to a plurality of DS units 36 of the DSN memory 22 via the DSN interface 32 and the network 24. The DSN interface 32 formats each of the slices for transmission via the network 24. For example, the DSN interface 32 may utilize an internet protocol (e.g., TCP/IP, etc.) to packetize the EC slices 42-48 for transmission via the network 24.

The number of DS units 36 receiving the EC slices 42-48 is dependent on the distributed data storage parameters established by the DS managing unit 18. For example, the DS managing unit 18 may indicate that each slice is to be stored in a different DS unit 36. As another example, the DS managing unit 18 may indicate that like slice numbers of different data segments are to be stored in the same DS unit 36. For example, the first slice of each of the data segments is to be stored in a first DS unit 36, the second slice of each of the data segments is to be stored in a second DS unit 36, etc. In this manner, the data is encoded and distributedly stored at physically diverse locations to improve data storage integrity and security.

Each DS unit 36 that receives an EC slice 42-48 for storage translates the virtual DSN memory address of the slice into a local physical address for storage. Accordingly, each DS unit 36 maintains a virtual to physical memory mapping to assist in the storage and retrieval of data.

The first type of user device 12 performs a similar function to store data in the DSN memory 22 with the exception that it includes the DS processing. As such, the device 12 encodes and slices the data file and/or data block it has to store. The device then transmits the slices 11 to the DSN memory via its DSN interface 32 and the network 24.

For a second type of user device 14 to retrieve a data file or data block from memory, it issues a read command via its interface 30 to the DS processing unit 16. The DS processing unit 16 performs the DS processing 34 to identify the DS units 36 storing the slices of the data file and/or data block based on the read command. The DS processing unit 16 may also communicate with the DS managing unit 18 to verify that the user device 14 is authorized to access the requested data.

Assuming that the user device is authorized to access the requested data, the DS processing unit 16 issues slice read commands to at least a threshold number of the DS units 36 storing the requested data (e.g., to at least 10 DS units for a 16/10 error coding scheme). Each of the DS units 36 receiving the slice read command, verifies the command, accesses its virtual to physical memory mapping, retrieves the requested slice, or slices, and transmits it to the DS processing unit 16.

Once the DS processing unit 16 has received a read threshold number of slices for a data segment, it performs an error decoding function and de-slicing to reconstruct the data segment. When Y number of data segments has been reconstructed, the DS processing unit 16 provides the data file 38 and/or data block 40 to the user device 14. Note that the first type of user device 12 performs a similar process to retrieve a data file and/or data block.

The storage integrity processing unit 20 performs the third primary function of data storage integrity verification. In general, the storage integrity processing unit 20 periodically retrieves slices 45, and/or slice names, of a data file or data block of a user device to verify that one or more slices have not been corrupted or lost (e.g., the DS unit failed). The retrieval process mimics the read process previously described.

If the storage integrity processing unit 20 determines that one or more slices is corrupted or lost, it rebuilds the corrupted or lost slice(s) in accordance with the error coding scheme. The storage integrity processing unit 20 stores the rebuilt slice, or slices, in the appropriate DS unit(s) 36 in a manner that mimics the write process previously described.

Figure 2:
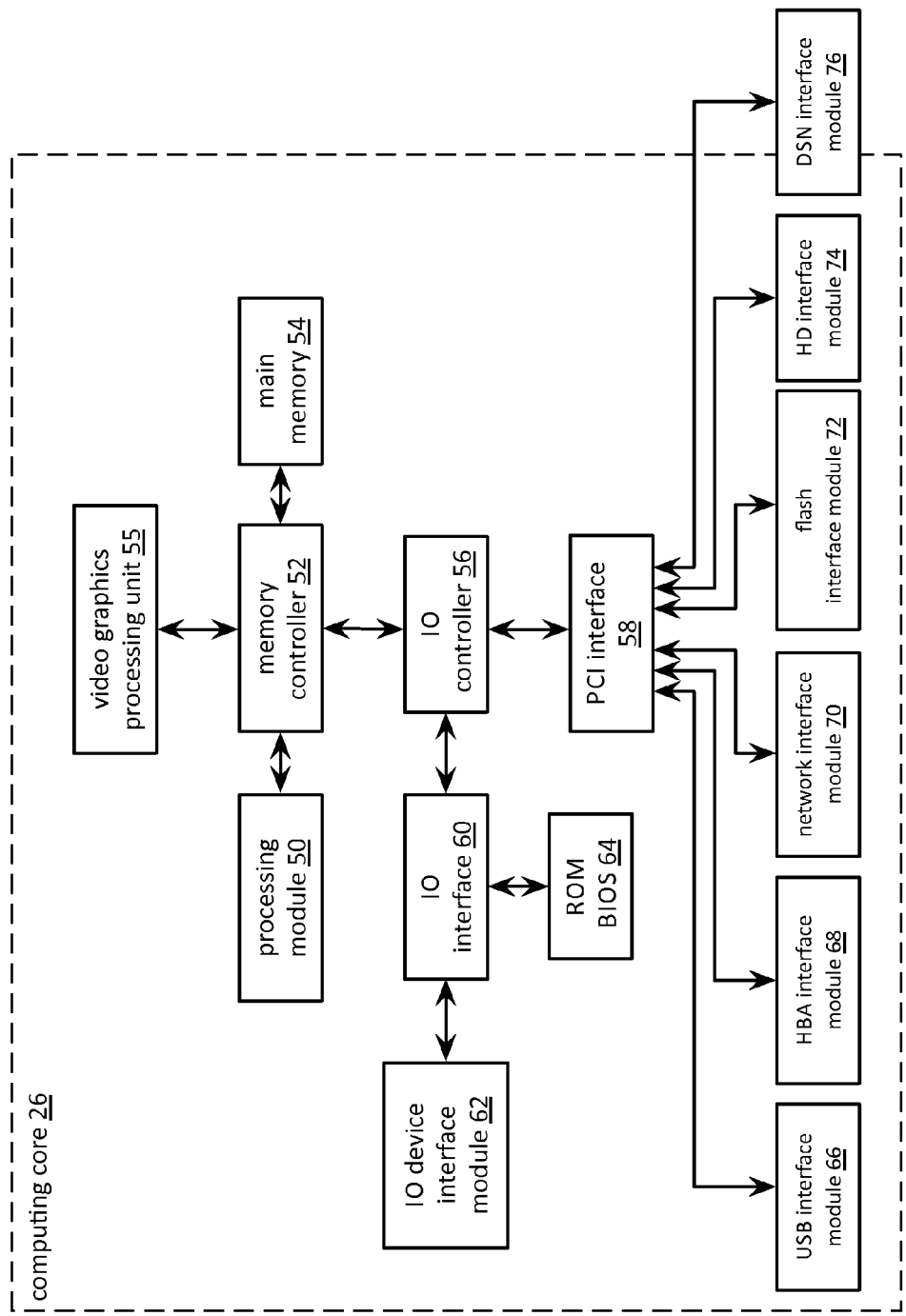
FIG. 2 is a schematic block diagram of an embodiment of a computing core in accordance with the present invention.

FIG. 2 is a schematic block diagram of an embodiment of a computing core 26 that includes a processing module 50, a memory controller 52, main memory 54, a video graphics processing unit 55, an input/output (IO) controller 56, a peripheral component interconnect (PCI) interface 58, an IO interface 60, at least one IO device interface module 62, a read only memory (ROM) basic input output system (BIOS) 64, and one or more memory interface modules. The memory interface module(s) includes one or more of a universal serial bus (USB) interface module 66, a host bus adapter (HBA) interface module 68, a network interface module 70, a flash interface module 72, a hard drive interface module 74, and a DSN interface module 76. Note the DSN interface module 76 and/or the network interface module 70 may function as the interface 30 of the user device 14 of FIG. 1. Further note that the IO device interface module 62 and/or the memory interface modules may be collectively or individually referred to as IO ports.

Figure 3:
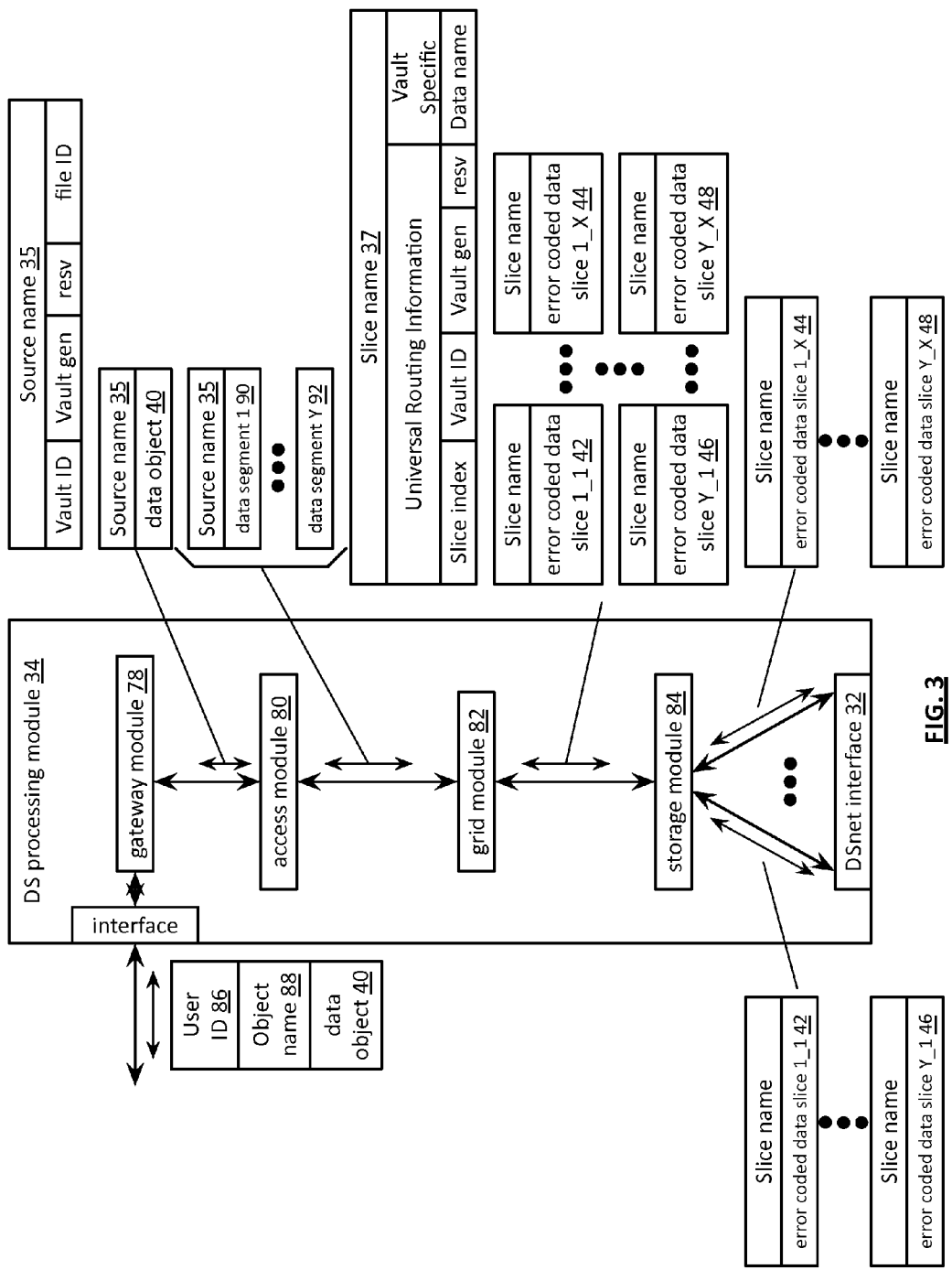
FIG. 3 is a schematic block diagram of an embodiment of a distributed storage processing unit in accordance with the present invention.

FIG. 3 is a schematic block diagram of an embodiment of a dispersed storage (DS) processing module 34 of user device 12 and/or of the DS processing unit 16. The DS processing module 34 includes a gateway module 78, an access module 80, a grid module 82, and a storage module 84. The DS processing module 34 may also include an interface 30 and the DSnet interface 32 or the interfaces 68 and/or 70 may be part of user device 12 or of the DS processing unit 16. The DS processing module 34 may further include a bypass/feedback path between the storage module 84 to the gateway module 78. Note that the modules 78-84 of the DS processing module 34 may be in a single unit or distributed across multiple units.

In an example of storing data, the gateway module 78 receives an incoming data object that includes a user ID field 86, an object name field 88, and the data object field 40 and may also receive corresponding information that includes a process identifier (e.g., an internal process/application ID), metadata, a file system directory, a block number, a transaction message, a user device identity (ID), a data object identifier, a source name, and/or user information. The gateway module 78 authenticates the user associated with the data object by verifying the user ID 86 with the DS managing unit 18 and/or another authenticating unit.

When the user is authenticated, the gateway module 78 obtains user information from the management unit 18, the user device, and/or the other authenticating unit. The user information includes a vault identifier, operational parameters, and user attributes (e.g., user data, billing information, etc.). A vault identifier identifies a vault, which is a virtual memory space that maps to a set of DS storage units 36. For example, vault 1 (i.e., user 1's DSN memory space) includes eight DS storage units (X=8 wide) and vault 2 (i.e., user 2's DSN memory space) includes sixteen DS storage units (X=16 wide). The operational parameters may include an error coding algorithm, the width n (number of pillars X or slices per segment for this vault), a read threshold T, a write threshold, an encryption algorithm, a slicing parameter, a compression algorithm, an integrity check method, caching settings, parallelism settings, and/or other parameters that may be used to access the DSN memory layer.

The gateway module 78 uses the user information to assign a source name 35 to the data. For instance, the gateway module 78 determines the source name 35 of the data object 40 based on the vault identifier and the data object. For example, the source name may contain a file identifier (ID), a vault generation number, a reserved field, and a vault identifier (ID). As another example, the gateway module 78 may generate the file ID based on a hash function of the data object 40. Note that the gateway module 78 may also perform message conversion, protocol conversion, electrical conversion, optical conversion, access control, user identification, user information retrieval, traffic monitoring, statistics generation, configuration, management, and/or source name determination.

The access module 80 receives the data object 40 and creates a series of data segments 1 through Y 90-92 in accordance with a data storage protocol (e.g., file storage system, a block storage system, and/or an aggregated block storage system). The number of segments Y may be chosen or randomly assigned based on a selected segment size and the size of the data object. For example, if the number of segments is chosen to be a fixed number, then the size of the segments varies as a function of the size of the data object. For instance, if the data object is an image file of 4,194,304 eight bit bytes (e.g., 33,554,432 bits) and the number of segments Y=131,072, then each segment is 256 bits or 32 bytes. As another example, if segment size is fixed, then the number of segments Y varies based on the size of data object. For instance, if the data object is an image file of 4,194,304 bytes and the fixed size of each segment is 4,096 bytes, then the number of segments Y=1,024. Note that each segment is associated with the same source name.

The grid module 82 receives the data segments and may manipulate (e.g., compression, encryption, cyclic redundancy check (CRC), etc.) each of the data segments before performing an error coding function of the error coding dispersal storage function to produce a pre-manipulated data segment. After manipulating a data segment, if applicable, the grid module 82 error encodes (e.g., Reed-Solomon, Convolution encoding, Trellis encoding, etc.) the data segment or manipulated data segment into X error coded data slices 42-44.

The value X, or the number of pillars (e.g., X=16), is chosen as a parameter of the error coding dispersal storage function. Other parameters of the error coding dispersal function include a read threshold T, a write threshold W, etc. The read threshold (e.g., T=10, when X=16) corresponds to the minimum number of error-free error coded data slices required to reconstruct the data segment. In other words, the DS processing module 34 can compensate for X-T (e.g., 16−10=6) missing error coded data slices per data segment. The write threshold W corresponds to a minimum number of DS storage units that acknowledge proper storage of their respective data slices before the DS processing module indicates proper storage of the encoded data segment. Note that the write threshold is greater than or equal to the read threshold for a given number of pillars (X).

For each data slice of a data segment, the grid module 82 generates a unique slice name 37 and attaches it thereto. The slice name 37 includes a universal routing information field and a vault specific field and may be 48 bytes (e.g., 24 bytes for each of the universal routing information field and the vault specific field). As illustrated, the universal routing information field includes a slice index, a vault ID, a vault generation, and a reserved field. The slice index is based on the pillar number and the vault ID and, as such, is unique for each pillar (e.g., slices of the same pillar for the same vault for any segment will share the same slice index). The vault specific field includes a data name, which includes a file ID and a segment number (e.g., a sequential numbering of data segments 1-Y of a simple data object or a data block number).

Prior to outputting the error coded data slices of a data segment, the grid module may perform post-slice manipulation on the slices. If enabled, the manipulation includes slice level compression, encryption, CRC, addressing, tagging, and/or other manipulation to improve the effectiveness of the computing system.

When the error coded data slices of a data segment are ready to be outputted, the grid module 82 determines which of the DS storage units 36 will store the EC data slices based on a dispersed storage memory mapping associated with the user's vault and/or DS storage unit attributes. The DS storage unit attributes may include availability, self-selection, performance history, link speed, link latency, ownership, available DSN memory, domain, cost, a prioritization scheme, a centralized selection message from another source, a lookup table, data ownership, and/or any other factor to optimize the operation of the computing system. Note that the number of DS storage units 36 is equal to or greater than the number of pillars (e.g., X) so that no more than one error coded data slice of the same data segment is stored on the same DS storage unit 36. Further note that EC data slices of the same pillar number but of different segments (e.g., EC data slice 1 of data segment 1 and EC data slice 1 of data segment 2) may be stored on the same or different DS storage units 36.

The storage module 84 performs an integrity check on the outbound encoded data slices and, when successful, identifies a plurality of DS storage units based on information provided by the grid module 82. The storage module 84 then outputs the encoded data slices 1 through X of each segment 1 through Y to the DS storage units 36. Each of the DS storage units 36 stores its EC data slice(s) and maintains a local virtual DSN address to physical location table to convert the virtual DSN address of the EC data slice(s) into physical storage addresses.

In an example of a read operation, the user device 12 and/or 14 sends a read request to the DS processing unit 16, which authenticates the request. When the request is authentic, the DS processing unit 16 sends a read message to each of the DS storage units 36 storing slices of the data object being read. The slices are received via the DSnet interface 32 and processed by the storage module 84, which performs a parity check and provides the slices to the grid module 82 when the parity check was successful. The grid module 82 decodes the slices in accordance with the error coding dispersal storage function to reconstruct the data segment. The access module 80 reconstructs the data object from the data segments and the gateway module 78 formats the data object for transmission to the user device.

Figure 4:
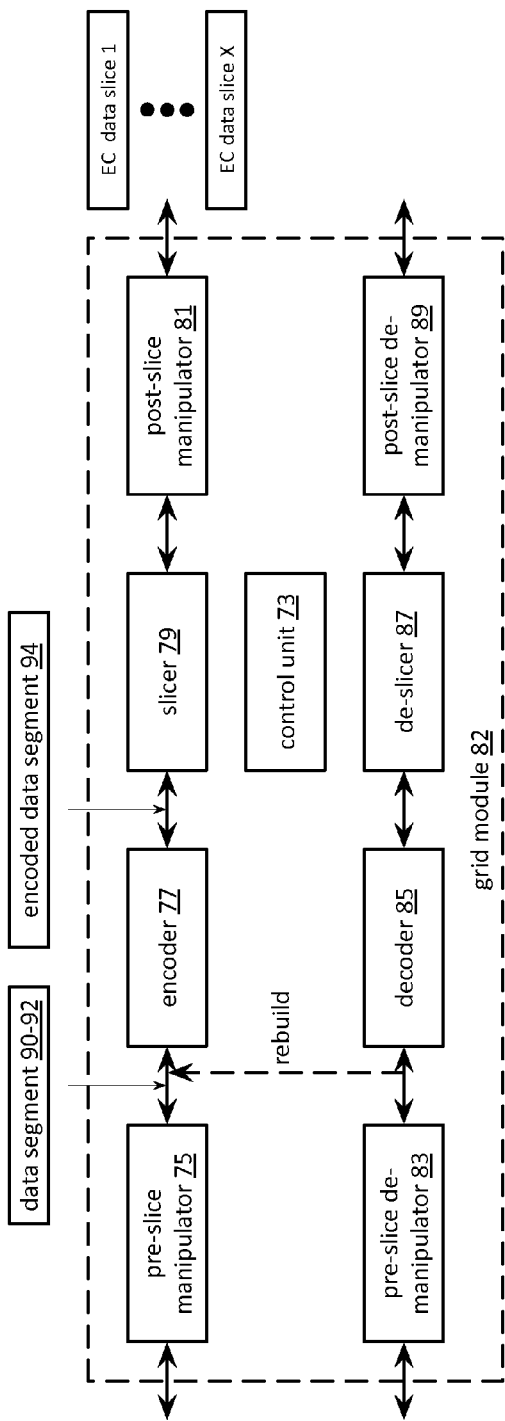
FIG. 4 is a schematic block diagram of an embodiment of a grid module in accordance with the present invention.

FIG. 4 is a schematic block diagram of an embodiment of a grid module 82 that includes a control unit 73, a pre-slice manipulator 75, an encoder 77, a slicer 79, a post-slice manipulator 81, a pre-slice de-manipulator 83, a decoder 85, a de-slicer 87, and/or a post-slice de-manipulator 89. Note that the control unit 73 may be partially or completely external to the grid module 82. For example, the control unit 73 may be part of the computing core at a remote location, part of a user device, part of the DS managing unit 18, or distributed amongst one or more DS storage units.

In an example of a write operation, the pre-slice manipulator 75 receives a data segment 90-92 and a write instruction from an authorized user device. The pre-slice manipulator 75 determines if pre-manipulation of the data segment 90-92 is required and, if so, what type. The pre-slice manipulator 75 may make the determination independently or based on instructions from the control unit 73, where the determination is based on a computing system-wide predetermination, a table lookup, vault parameters associated with the user identification, the type of data, security requirements, available DSN memory, performance requirements, and/or other metadata.

Once a positive determination is made, the pre-slice manipulator 75 manipulates the data segment 90-92 in accordance with the type of manipulation. For example, the type of manipulation may be compression (e.g., Lempel-Ziv-Welch, Huffman, Golomb, fractal, wavelet, etc.), signatures (e.g., Digital Signature Algorithm (DSA), Elliptic Curve DSA, Secure Hash Algorithm, etc.), watermarking, tagging, encryption (e.g., Data Encryption Standard, Advanced Encryption Standard, etc.), adding metadata (e.g., time/date stamping, user information, file type, etc.), cyclic redundancy check (e.g., CRC32), and/or other data manipulations to produce the pre-manipulated data segment.

The encoder 77 encodes the pre-manipulated data segment 92 using a forward error correction (FEC) encoder (and/or other type of erasure coding and/or error coding) to produce an encoded data segment 94. The encoder 77 determines which forward error correction algorithm to use based on a predetermination associated with the user's vault, a time based algorithm, user direction, DS managing unit direction, control unit direction, as a function of the data type, as a function of the data segment 92 metadata, and/or any other factor to determine algorithm type. The forward error correction algorithm may be Golay, Multidimensional parity, Reed-Solomon, Hamming, Bose Ray Chauduri Hocquenghem (BCH), Cauchy-Reed-Solomon, or any other FEC encoder. Note that the encoder 77 may use a different encoding algorithm for each data segment 92, the same encoding algorithm for the data segments 92 of a data object, or a combination thereof.

The encoded data segment 94 is of greater size than the data segment 92 by the overhead rate of the encoding algorithm by a factor of X/T, where X is the width or number of slices, and T is the read threshold. In this regard, the corresponding decoding process can accommodate at most X-T missing EC data slices and still recreate the data segment 92. For example, if X=16 and T=10, then the data segment 92 will be recoverable as long as 10 or more EC data slices per segment are not corrupted.

The slicer 79 transforms the encoded data segment 94 into EC data slices in accordance with the slicing parameter from the vault for this user and/or data segment 92. For example, if the slicing parameter is X=16, then the slicer 79 slices each encoded data segment 94 into 16 encoded slices.

The post-slice manipulator 81 performs, if enabled, post-manipulation on the encoded slices to produce the EC data slices. If enabled, the post-slice manipulator 81 determines the type of post-manipulation, which may be based on a computing system-wide predetermination, parameters in the vault for this user, a table lookup, the user identification, the type of data, security requirements, available DSN memory, performance requirements, control unit directed, and/or other metadata. Note that the type of post-slice manipulation may include slice level compression, signatures, encryption, CRC, addressing, watermarking, tagging, adding metadata, and/or other manipulation to improve the effectiveness of the computing system.

In an example of a read operation, the post-slice de-manipulator 89 receives at least a read threshold number of EC data slices and performs the inverse function of the post-slice manipulator 81 to produce a plurality of encoded slices. The de-slicer 87 de-slices the encoded slices to produce an encoded data segment 94. The decoder 85 performs the inverse function of the encoder 77 to recapture the data segment 90-92. The pre-slice de-manipulator 83 performs the inverse function of the pre-slice manipulator 75 to recapture the data segment 90-92.

Figure 5:
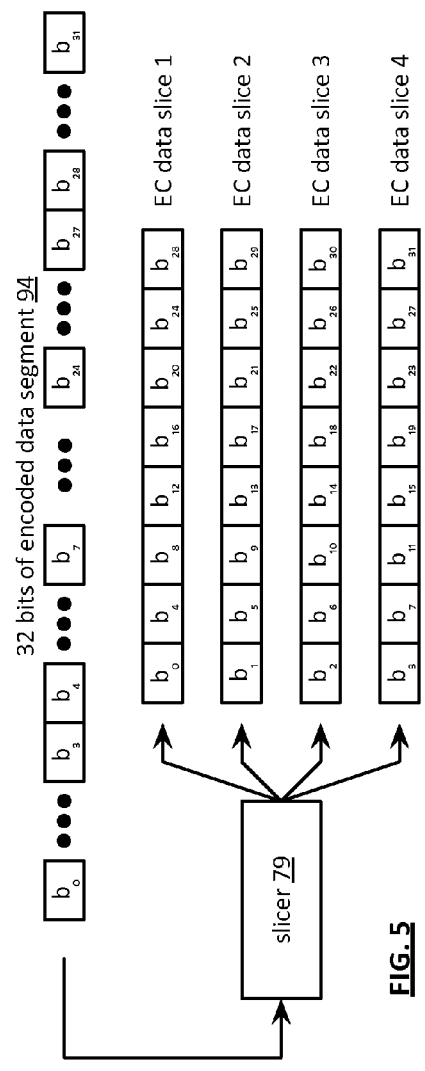
FIG. 5 is a diagram of an example embodiment of error coded data slice creation in accordance with the present invention.

FIG. 5 is a diagram of an example of slicing an encoded data segment 94 by the slicer 79. In this example, the encoded data segment 94 includes thirty-two bits, but may include more or less bits. The slicer 79 disperses the bits of the encoded data segment 94 across the EC data slices in a pattern as shown. As such, each EC data slice does not include consecutive bits of the data segment 94 reducing the impact of consecutive bit failures on data recovery. For example, if EC data slice 2 (which includes bits 1, 5, 9, 13, 17, 25, and 29) is unavailable (e.g., lost, inaccessible, or corrupted), the data segment can be reconstructed from the other EC data slices (e.g., 1, 3 and 4 for a read threshold of 3 and a width of 4).

Figure 6A:
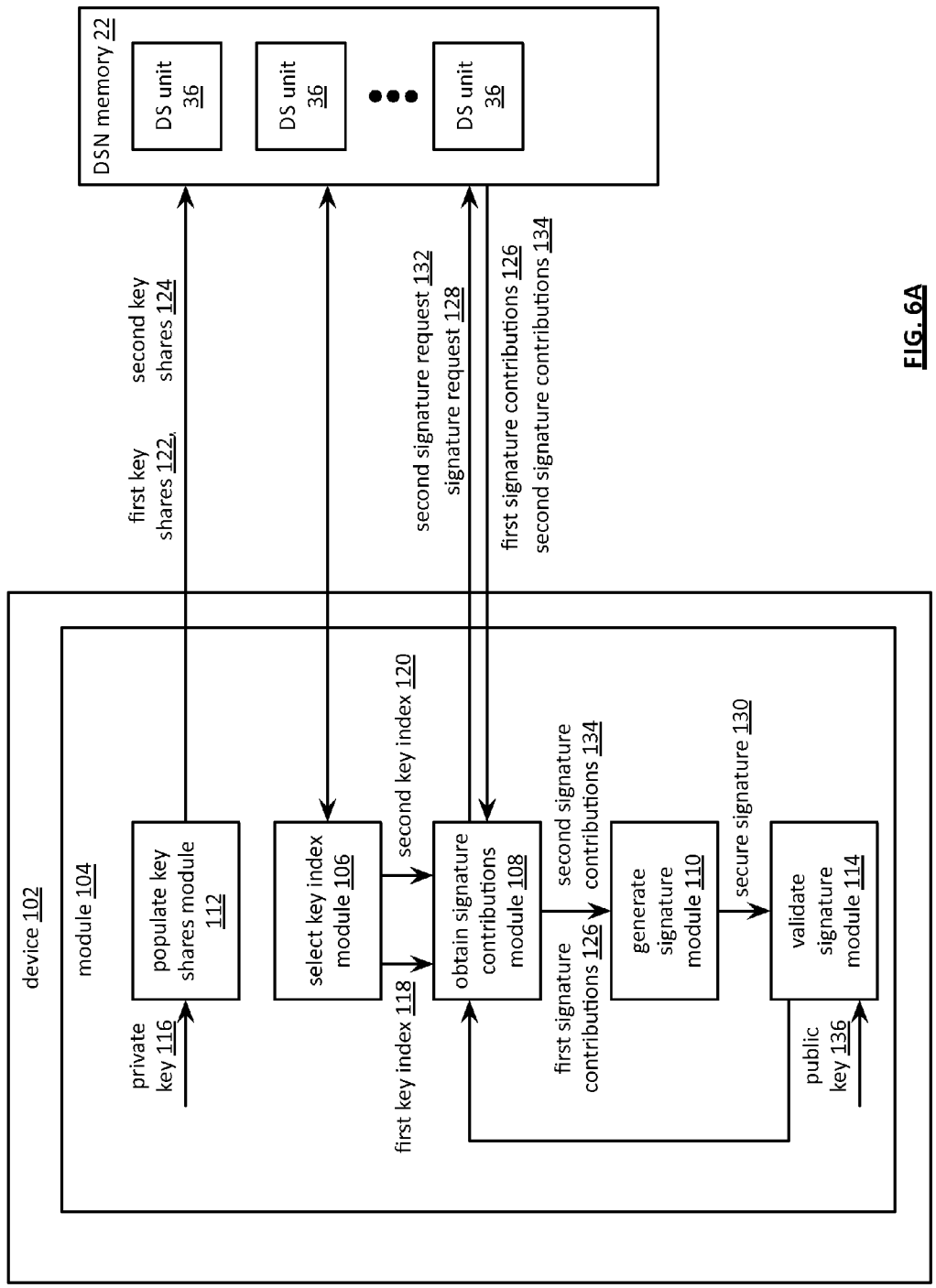
FIG. 6A is a schematic block diagram of another embodiment of a computing system in accordance with the present invention.

FIG. 6A is a schematic block diagram of another embodiment of a computing system that includes a device 102 (e.g., a user device 12-14, a dispersed storage (DS) processing unit 16, a DS managing unit 18, a DS unit 36, and a storage integrity processing unit 20) and a dispersed storage network (DSN) memory 22. The DSN memory 22 includes a plurality of DS units 36. The device 102 includes a module 104 to enable the device 102 to generate a secure signature on an item without a locally stored private key 116 of the device 102. The private key 116 may be obtained by at least one of receiving, generating a private/public key pair, generating based on an attribute associated with the device 102, and generating based on a random number to produce a random key as private key 116. The item includes a data element that includes one or more of registry information, key information, encryption algorithm information, a device certificate, a user certificate, a system element identifier (ID), a DSN access request, and a hash of the data element, wherein a hashing function is applied to the data element to produce the hash of the data element. The module 104 includes a select key index module 106, an obtain signature contributions module 108, a generate signature module 110, a populate key shares module 112, and a validate signature module 114.

The select key index module 106 is operable to select a first key representation index 118 of a set of key representation indexes, wherein the first key representation index 118 includes information regarding a first key representation of a set of key representations, wherein a first mathematical encoding of the private key 116 generates a first plurality of key shares 122 as the first key representation, which is stored in a first set of DS units 36 of the DSN memory 22, and a second mathematical encoding of the private key 116 generates a second plurality of key shares 124 as a second key representation of the set of key representations, which is stored in a second set of DS units 36 of the DSN memory 22. The select key index module 106 functions to select the first key representation index 118 by selecting the first key representation index 118 based on one or more of DS unit status indicators of the first and second sets of DS units, DS unit performance level indicators of the first and second sets of DS units, DS unit retrieval history indicators of the first and second sets of DS units, a security indicator, a query, a command, a key share storage table lookup, and a message. For example, the select key index module 106 selects the first key representation index 118 when DS unit performance level indicators associated with the first set of DS units 36 are favored (e.g., lower average retrieval access latency time) over DS unit performance level indicators associated with the second set of DS units 36.

The first mathematical encoding includes the populate key shares module 112 operable to generate at least one set of key shares for storage in one or more sets of DS units, the generating includes the populate key shares module 112 operable to generate one or more first values, generate a second value based on the one or more first values, the private key 116, and a key share generating mathematical function, and send the one or more first values and the second value to the first set of DS units. The second mathematical encoding includes the populate key shares module 112 further operable to generate one or more third values, generate a fourth value based on the one or more third values, the private key 116, and the key share generating mathematical function, and send the one or more third values and the fourth value to the second set of DS units. The populate key shares module 112 is further operable to randomly generate the one or more first values and generate the second value based on key share generating mathematical function of $(x+y+z) \mod \Phi(n)=d$, where d is the private key 116, n is a public modulus (e.g., a 1024 bit wide public key paired to the private key 116), x and y correspond to the one or more first values, z corresponds to the second value, $\Phi(n)$ is an Euler's totient function $\Phi(n)=(p-1)*(q-1)$, and p and q are large prime numbers in accordance with $n=p*q$. After generating the set of key representations, the populate key shares module 112 destroys the private key 116.

The obtain signature contributions module 108 is operable to determine whether a first plurality of signature contributions 126 have been received in response to a signature request 128 for the item based on the first key representation index 118, wherein one of the first set of DS units executes a first mathematical signature function using one of the first plurality of key shares on the item to produce a signature contribution of the first plurality of signature contributions. For example, the one of the first set of DS units executes the first mathematical signature function as first signature contribution=$(item)^{keyshare} \mod n$, wherein the item is extracted from the request 128, the keyshare is retrieved as a corresponding value from a local memory of the one DS unit, and n is a public modulus extracted from the signature request 128. The signature request 128 includes a set of signature requests, wherein each signature request of the set of signature requests includes one or more of the first key index 118 (e.g., a share set number, a DS unit combination ID, DS unit IDs of the corresponding DS units), a signature payload (e.g., the item to sign), a hash of the signature payload, a DS unit ID, and a public modulus value (e.g., n).

When the first plurality of signature contributions 126 have been received, the generate signature module 110 is operable to generate the secure signature 130 on the item from the first plurality of signature contributions 126. The generate signature module 110 functions to generate the secure signature 130 on the item by multiplying the first plurality of signature contributions 126 to produce a multiplication result and performing a modulus function on the multiplication result to produce the secure signature 130. For example, to generate signature module 110 produces the secure signature 130 on the item in accordance with (contribution 1*contribution 2*contribution 3) mod n, when the first plurality of signature contributions 126 includes three signature contributions.

When the first plurality of signature contributions have not been received (e.g., receiving two when the plurality includes three; not receiving all three within a time period), the obtain signature contributions module 108 is further operable to generate second signature requests 132 for the item based on a second key representation index 120 of the set of key representation indexes, send the second signature requests 132 to the second set of DS units, determine whether a second plurality of signature contributions 134 have been received from the second set of DS units, and when the second plurality of signature contributions 134 have been received, the generate signature module 110 is further operable to generate the secure signature 130 on the item from the second plurality of signature contributions. For example, the select key index module 106 identifies the second key representation index 120 when DS unit performance level indicators associated with the second set of DS units are more favorable (e.g., lower average retrieval access latency time) than DS unit performance level indicators associated with other sets of DS units.

The validate signature module 114 is operable to determine whether the secure signature is valid. For example, the validate signature module 114 indicates that the secure signature 130 is not valid when a hash of the item is not substantially the same as a decrypted secure signature, wherein the secure signature 130 is decrypted utilizing a public key associated with the private key 116. When the secure signature 130 is not valid, the obtain signature contributions module 108 is further operable to generate second signature requests 132 for the item based on the second key representation index 120 of the set of key representation indexes, send the second signature requests 132 to the second set of DS units, determine whether the second plurality of signature contributions 134 have been received from the second set of DS units. When the second plurality of signature contributions 134 have been received, the generate signature module 110 is further operable to generate the secure signature 130 on the item from the second plurality of signature contributions 134. The validate signature module 114 is further operable to determine whether the secure signature 130 on the item from the second plurality of signature contributions 134 is valid.

FIG. 6B is a flowchart illustrating an example of storing key shares. The method begins at step 144 where a processing module obtains a private key (e.g., an encryption key d utilized in an encryption algorithm). The obtaining may be based on one or more of generating a private/public key pair (e.g., a private key and a key), receiving the private key, a query, a lookup, and a user input. The method continues at step 146 where the processing module determines sharing function parameters. The sharing function parameters includes one or more of a width number (e.g., a number of storage nodes w), a decode threshold (e.g., a number of key shares k), a number of shares sets (e.g., w choose k), a public modulus n (e.g., a public key), security function constants p and q (e.g., large primes such that p*q=n), an encryption algorithm identifier (ID), and a decryption algorithm ID. The determining may be based on one or more of a list, a predetermination, a query, a performance level indicator, a reliability level requirement, a message, and a command. For example, the processing module determines w=4, k=2, a number of shares sets=(4 choose 2)=6, a value for n, and a value for p based on a lookup and generates a value for q in accordance with p*q=n.

The method continues at step 148 where the processing module identifies a plurality of storage nodes for storing key shares. The plurality of storage nodes includes two or more of a user device, a dispersed storage (DS) unit, a storage server, and a memory device. The identification may be based on one or more of the sharing function parameters, a list, a predetermination, a query, a performance level indicator, a message, and a command. For example, the processing module identifies the plurality of storage nodes to include 4 DS units when the sharing function parameters include a width w=4 and a performance level indicator indicates that a performance level of the 4 DS units compares favorably to a performance level threshold.

The method continues at step 150 where the processing module generates one or more sets of key shares to include the number of shares sets. For example, the processing module generates 6 sets of key shares when the width w=4 and the decode threshold k=2 (e.g., 4 choose 2=6). The generation produces a set of key shares for each combination of a decode threshold k number of key shares stored in the width w number of storage nodes. The generation of each set of key shares includes generation in accordance with a formula (x+y+z) mod $\Phi$ (n)=private key d, wherein $\Phi$ (n)=(p−1)*(q−1), n=p*q, and x, y, z represent key shares of a corresponding key share set when a number of key shares is three. For example, the processing module randomly chooses values for key shares y and z of a corresponding key share set and generates a value for key share x in accordance with the formula.

In an example of generating key share sets, the processing module generates 10 key shares sets to include a first key share set that includes a key share x1 to store in DS unit 1, a key share y1 to store in DS unit 2, and a key share z1 to store in DS unit 3, a second key share set that includes a key share x2 to store in DS unit 1, a key share y2 to store in DS unit 2, and a key share z2 to store in DS unit 4, a third key share set that includes a key share x3 to store in DS unit 1, a key share y3 to store in DS unit 2, and a key share z3 to store in DS unit 5, a fourth key share set that includes a key share x4 to store in DS unit 1, a key share y4 to store in DS unit 3, and a key share z4 to store in DS unit 5, a fifth key share set that includes a key share x5 to store in DS unit 1, a key share y5 to store in DS unit 4, and a key share z5 to store in DS unit 5, a sixth key share set that includes a key share x6 to store in DS unit 2, a key share y6 to store in DS unit 3, and a key share z6 to store in DS unit 4, a seventh key share set that includes a key share x7 to store in DS unit 2, a key share y7 to store in DS unit 3, and a key share z7 to store in DS unit 5, an eighth key share set that includes a key share x8 to store in DS unit 2, a key share y7 to store in DS unit 4, and a key share z7 to store in DS unit 5, a ninth key share set that includes a key share x9 to store in DS unit 3, a key share y9 to store in DS unit 4, and a key share z9 to store in DS unit 5, and a 10th key share set that includes a key share x10 to store in DS unit 1, a key share y10 to store in DS unit 3, and a key share z10 to store in DS unit 4 when a number storage nodes is 5 and a decode threshold is 3.

The method continues at step 152 where the processing module outputs the one or more sets of key shares to the plurality of storage nodes. In addition, the processing module may output one or more of the sharing function parameters to each storage node of the plurality of storage nodes. For example, the processing module sends the public modulus n to each storage node of the plurality of storage nodes.

The method continues at the step where the processing module destroys the private key d. The destroying of the private key may provide the system with a security performance improvement. A method to generate a signature based on stored shared keys is described in greater detail with reference to FIG. 6D. A method to generate a signature contribution (e.g., by a storage node) is described in greater detail with reference to FIG. 6E.

FIG. 6C is a diagram illustrating an example of a key share storage table 156 that includes a share set field 158, a node combination field 160, and a key share per storage node field 162. The share set field 158 includes a share sets number of share set identifiers of corresponding key share sets. For example, the share set field 158 includes 6 share set identifiers 1-6 when a number of storage nodes w=4, a decode threshold k=2, and the share sets number of share set identifiers is w choose k (e.g., 4 choose 2=6). The node combination field 160 includes a share sets number of node combination entries, wherein each node combination entry corresponds to a combination of a decode threshold number of storage node identifiers. For example, the node combination field includes 6 node combination entries including A-B, A-C, A-D, B-C, B-D, and C-D when storage nodes A-D are utilized to store a share sets number (e.g., 6) of a decode threshold number (e.g., 2) of key shares.

The key share per storage node field 162 includes a share sets number of storage node fields, wherein each storage node field corresponds to a storage node of a number of storage nodes w utilized to store the key shares. Each storage node field includes a key share identifier (e.g., a key representation index) utilized to identify a key share of an associated share set (e.g., key representation) that is stored in a storage node corresponding to the storage node field. For example, share set 1 includes utilization of storage node combination A-B such that key share x1 is stored in storage unit A and key share y1 is stored in storage node B, share set 2 includes utilization of storage node combination A-C such that key share x2 is stored in storage unit A and key share y2 is stored in storage node C, share set 3 includes utilization of storage node combination A-D such that key share x3 is stored in storage unit A and key share y3 is stored in storage node D, share set 4 includes utilization of storage node combination B-C such that key share x4 is stored in storage unit B and key share y4 is stored in storage node C, share set 5 includes utilization of storage node combination B-D such that key share x5 is stored in storage unit B and key share y5 is stored in storage node D, and share set 6 includes utilization of storage node combination C-D such that key share x6 is stored in storage unit C and key share y6 is stored in storage node D. Each set of key shares may be generated in accordance with a formula (x+y) mod $\Phi$ (n)=private key d, wherein $\Phi$ (n)=(p−1)*(q−1). For example, a value of key share y1 is chosen randomly and a value for key share x1 is generated in accordance with the formula. Storing more than one key share set corresponding to more than one key representation of a private key in more than one storage node set may provide the system with an availability improvement.

FIG. 6D is a flowchart illustrating an example of generating a signature, where a device of a distributed storage network (DSN) generates a secure signature on an item without a locally stored private key of the device. The item includes one or more of a data element that includes one or more of registry information, key information, encryption algorithm information, a device certificate, a user certificate, and a system element identifier, and a DSN access request and a hash of the data element.

The method begins at step 170 where a processing module selects a first key representation index of a set of key representation indexes, wherein the first key representation index includes information regarding a first key representation of a set of key representations, wherein a first mathematical encoding of the private key generates a first plurality of key shares as the first key representation, which is stored in a first set of dispersed storage (DS) units of the DSN, and a second mathematical encoding of the private key generates a second plurality of key shares as a second key representation of the set of key representations, which is stored in a second set of dispersed storage (DS) units of the DSN. The first mathematical encoding includes generating one or more first values, generating a second value based on the one or more first values, the private key, and a key share generating mathematical function, and sending the one or more first values and the second value to the first set of DS units. For example, the processing module randomly generates the one or more first values and generates the second value based on key share generating mathematical function of $(x+y+z) \mod \Phi(n)=d$, where d is the private key, x and y correspond to the one or more first values, z corresponds to the second value, and $\Phi(n)$ is an Euler's totient function. The second mathematical encoding includes generating one or more third values, generating a fourth value based on the one or more third values, the private key, and the key share generating mathematical function, and sending the one or more third values and the fourth value to the second set of DS units. After generating the set of key representations, the processing module destroys the private key.

At step 170, the processing module selects the first key representation index based on one or more of DS unit status indicators of the first and second sets of DS units, DS unit performance level indicators of the first and second sets of DS units, DS unit retrieval history indicators of the first and second sets of DS units, a security indicator, a query, a command, a key share storage table lookup, and a message. The method continues at step 172 where the processing module determines whether a first plurality of signature contributions have been received in response to a signature request for the item based on the first key representation index, wherein one of the first set of DS units executes a first mathematical signature function using one of the first plurality of key shares on the item to produce a signature contribution of the first plurality of signature contributions. The signature request includes a set of signature requests, wherein each signature request of the set of signature requests includes one or more of a first key representation identifier (ID) (e.g., a share set number, a DS unit combination ID, DS unit IDs of the corresponding DS units), a signature payload (e.g., something to sign like a certificate), a hash of the signature payload, a DS unit ID, and a public modulus value (e.g., n).

The method branches to step 176 when the processing module determines that the first plurality of signature contributions have not been received. The method continues to step 174 when the processing module determines that the first plurality of signature contributions has been received. The method continues at step 174 where the processing module generates the secure signature on the item from the first plurality of signature contributions. The generating the secure signature on the item includes multiplying the first plurality of signature contributions to produce a multiplication result and performing a modulus function on the multiplication result to produce the secure signature. The method branches to step 184.

The method continues at step 176 where the processing module generates second signature requests for the item based on a second key representation index of the set of key representation indexes when the first plurality of signature contributions have not been received. The method continues at step 178 where the processing module sends the second signature requests to the second set of DS units. The method continues at step 180 where the processing module determines whether a second plurality of signature contributions have been received from the second set of DS units. The method loops back to step 176 to send another signature request when the processing module determines that the second plurality of signature contributions have not been received (e.g., within a time period). The method continues to step 182 when the processing module determines that the second plurality of signature contributions have been received. The method continues at step 182 where the processing module generates the secure signature on the item from the second plurality of signature contributions.

The method continues at step 184 where the processing module determines whether the secure signature is valid. For example, the processing module indicates that the secure signature is not valid when a hash of the item is not substantially the same as a decrypted secure signature utilizing and associated public key. The method branches back to step 176 to send another signature request when the processing module determines that the secure signature is not valid. The method continues to step 186 when the processing module determines that the secure signature is valid. The method continues at step 186 where the processing module indicates that the secure signature is valid. The processing module may output the secure signature to a requesting entity.

Figure 6E:
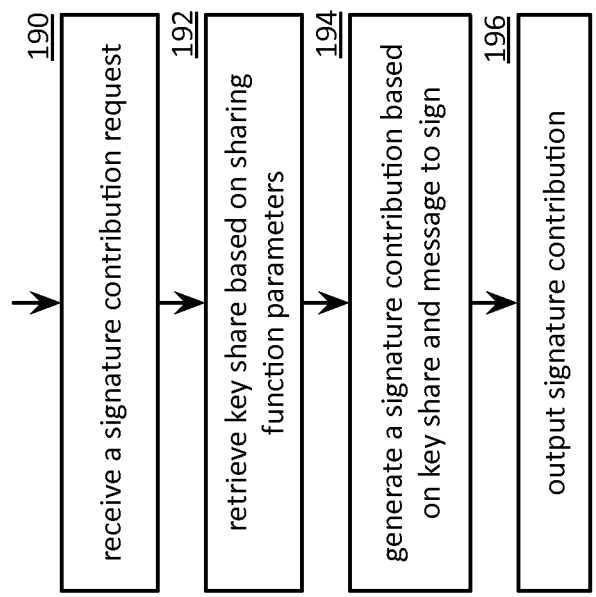
FIG. 6E is a flowchart illustrating an example of generating a signature contribution in accordance with the present invention.

FIG. 6E is a flowchart illustrating an example of generating a signature contribution. The method begins at step 190 where a processing module (e.g., of a storage node, of a dispersed storage (DS) unit) receives a signature contribution request. The method continues at step 192 where the processing module retrieves a key share based one or more of on sharing function parameters and the signature contribution request. The processing module obtains the sharing function parameters based on one or more of receiving the sharing function parameters, extracting the sharing function parameters from the signature contribution request, a lookup, a message, a command, and a predetermination. For example, the processing module extracts the sharing function parameters from the signature contribution request to include a key share identifier (ID). The retrieving of the key share includes obtaining the key share ID and retrieving the key share based on the key share ID. For example, the processing module obtains key share ID x3, determines a storage node A memory location based on the key share ID x3, and retrieves the key share x3 from a memory of the storage node at the storage node memory location.

As another example, the processing module extracts the sharing function parameters from the signature contribution request to include a share set ID. The retrieving of the key share includes obtaining the share set ID and retrieving the key share based on the share set ID and a key share storage table lookup. For example, the processing module obtains share set ID A-D, determines a key share ID of x3 based on a key share storage table lookup utilizing the share set ID A-D as an index, determines a storage node A memory location based on the key share ID x3, and retrieves the key share x3 from a memory of the storage node at the storage node memory location.

The method continues at step 194 where the processing module generates a signature contribution based on the key share and a message (e.g., an item) to sign m. The processing module obtains the message to sign m by at least one of extracting the message to sign m from the signature contribution request and generating a hash of a message payload extracted from the signature contribution request. The generation of the signature contribution includes generating the signature contribution in accordance with an expression signature contribution=$m^x$ mod n, where m is the message to sign or the hash of the message payload, x is the retrieved key share, and n is a public modulus (e.g., a public key). For example, the processing module generates the signature contribution in accordance with signature contribution A=$m^{x3}$ mod n, when the processing module is associated with storage node A and the key share is x3. The method continues at step 196 where the processing module outputs the signature contribution to a requesting entity.

Figure 7:
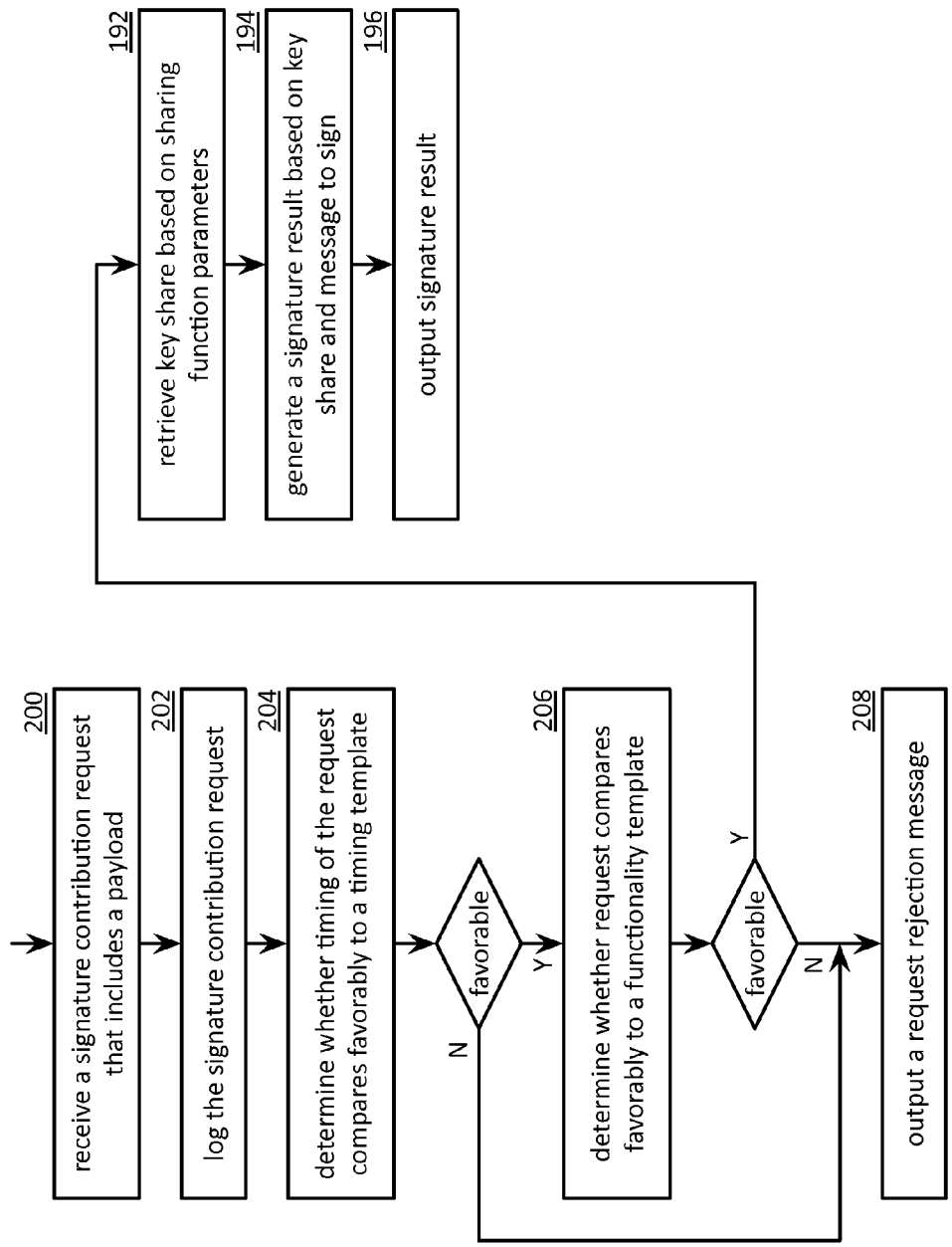
FIG. 7 is a flowchart illustrating another example of generating a signature contribution in accordance with the present invention.

FIG. 7 is a flowchart illustrating another example of generating a signature contribution, which includes similar steps to FIG. 6E. The method begins at step 200 where a processing module (e.g., of a dispersed storage (DS) unit, of a storage node) receives a signature contribution request that includes a payload. The method continues at step 202 where the processing module logs the signature contribution request. The logging includes one or more of extracting request information from the signature contribution request, obtaining a user identifier (ID), obtaining a vault ID, obtaining a timestamp, aggregating the request information, the user ID, the vault ID, and the timestamp to produce logging information, and facilitating storing of the logging information.

The method continues at step 204 where the processing module determines whether timing of the signature contribution request compares favorably to a timing template. For example, the processing module determines that the comparison is favorable when a difference between the timestamp associated with the signature contribution request and a timestamp associated with a previous signature contribution request is greater than a time threshold of the timing template. The method branches to step 208 when the processing module determines that the timing of the request compares unfavorably to the timing template. The method continues to step 206 when the processing module determines that the timing of the request compares favorably to the timing template.

The method continues at step 206 where the processing module determines whether the signature contribution request compares favorably to a functionality template. The determination may be based on one or more of the payload, a payload analysis, and a comparison of the payload analysis to the functionality template. For example, the processing module determines that the request compares favorably to the functionality template when the processing module determines that a registry value of the payload does not conflict with a current registry value. As another example, the processing module determines that the request compares favorably to the functionality template when the payload is not a certificate authority certificate. As yet another example, the processing module determines that the request compares favorably to the functionality template when an Internet protocol (IP) address associated with a requester of the request does not compare unfavorably to an unfavorable IP address list.

The method branches to step 192 of FIG. 6E when the processing module determines that the request compares favorably to the functionality template. The method continues to step 208 when the processing module determines that the request compares unfavorably to the functionality template. The method continues at step 208 where the processing module outputs a request rejection message. The outputting includes generating the request rejection message to include one or more of the signature contribution request, the logging information, the timestamp associated with the signature contribution request, and an error code, and sending the request rejection message to one or more of a requester, a dispersed storage (DS) imaging unit, a DS processing unit, a DS unit, and a user device. When the processing module determines that the request compares favorably to the functionality template, the method continues with steps 192-196 of FIG. 6E where the processing module retrieves a key share based on sharing function parameters, generates a signature result based on the key share and message to sign, and outputs the signature result.

Figure 8:
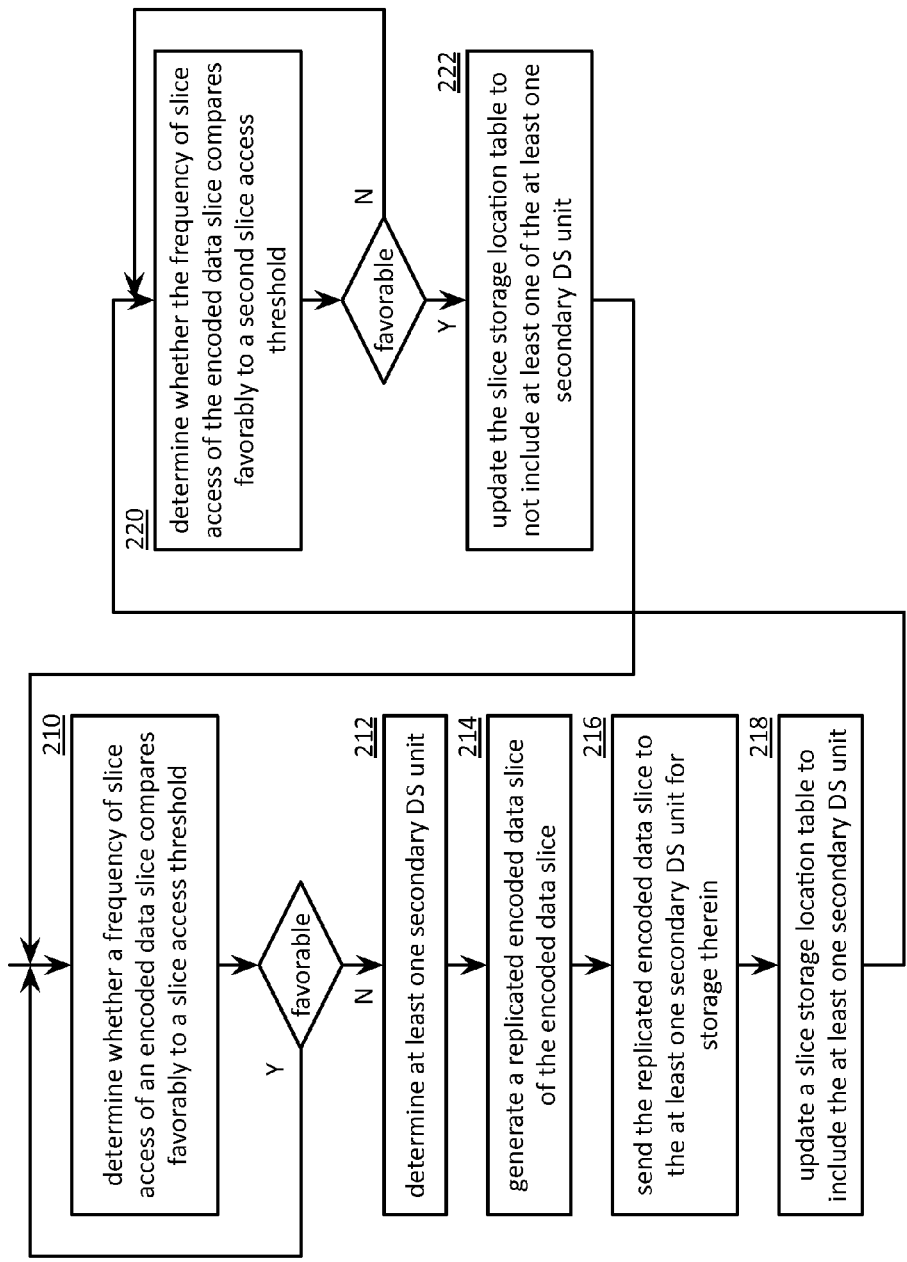
FIG. 8 is a flowchart illustrating an example of replicating encoded data slices in accordance with the present invention.

FIG. 8 is a flowchart illustrating an example of replicating encoded data slices. The method begins at step 210 where a processing module (e.g., of a dispersed storage (DS) unit) determines whether a frequency of slice access of an encoded data slice compares favorably to a slice access threshold. The processing module may obtain the frequency of slice access based on one or more of a frequency of slice access query, a lookup, a list, an error message, a request, and a command. For example, the processing module determines that the frequency of slice access compares unfavorably to the slice access threshold when the frequency of slice access is 500 accesses per minute and the slice access threshold is 100 accesses per minute. The method loops at step 210 when the processing module determines that the frequency of access compares favorably to the slice access threshold. The method continues to step 212 when the processing module determines that the frequency of access compares unfavorably to the slice access threshold.

The method continues at step 212 where the processing module determines at least one secondary DS unit. The determination may be based on one or more of a current access performance level, a performance requirement, an estimated access performance level, a request pattern, a candidate secondary DS unit list, a DS unit location, a DS unit performance level, and a DS unit Internet protocol (IP) address. For example, the processing module determines the at least one secondary DS unit to include a West Coast DS unit went the request pattern includes West Coast slice access requests and a DS unit performance level associated with the West Coast DS unit compares favorably to an access latency performance requirement.

The method continues at step 214 where the processing module generates a replicated encoded data slice of the encoded data slice. The generation includes one or more of immediately retrieving the encoded data slice, retrieving the encoded data slice when a dispersed storage network (DSN) activity level compares favorably to an activity level threshold, rebuilding the encoded data slice, and forming the replicated encoded data slice from the encoded data slice such that the replicated encoded is substantially the same as the encoded data slice.

The method continues at step 216 where the processing module sends the replicated encoded data slice to the at least one secondary DS unit for storage therein. Alternatively, or in addition to, the processing module determines whether the replicated encoded data slice is already stored in the at least one secondary DS unit and sends the replicated encoded data slice to the at least one secondary DS unit when the replicated encoded data slice is not already stored in the at least one secondary DS unit. The method continues at step 218 where the processing module updates a slice storage location table to include an identifier associated with the at least one secondary DS unit. The updating includes updating the slice storage location table to include affiliating a slice name associated with the encoded data slice with the identifier associated with the at least one secondary DS unit.

The method continues at step 220 where the processing module determines whether the frequency of slice access of the encoded data slice compares favorably to a second slice access threshold. For example, the processing module determines that the frequency of slice access compares unfavorably to the second slice access threshold when the frequency of slice access is greater than the second slice access threshold. The method loops at step 220 when the processing module determines that the frequency of slice access compares unfavorably to the second slice access threshold. The method continues to step 222 when the processing module determines that the frequency of slice access compares favorably to the second slice access threshold.

The method continues at step 222 where the processing module updates the slice storage location table to exclude at least one of the at least one secondary DS units. The updating includes updating the slice storage table to exclude affiliating the slice name associated with the encoded data slice with an identifier associated with at least one of the at least one secondary DS unit. The at least one secondary DS unit may delete the replicated encoded data slice when a time period since a last replicated encoded data slice access is greater than a deletion time threshold. The method repeats back to step 210.

Figure 9A:
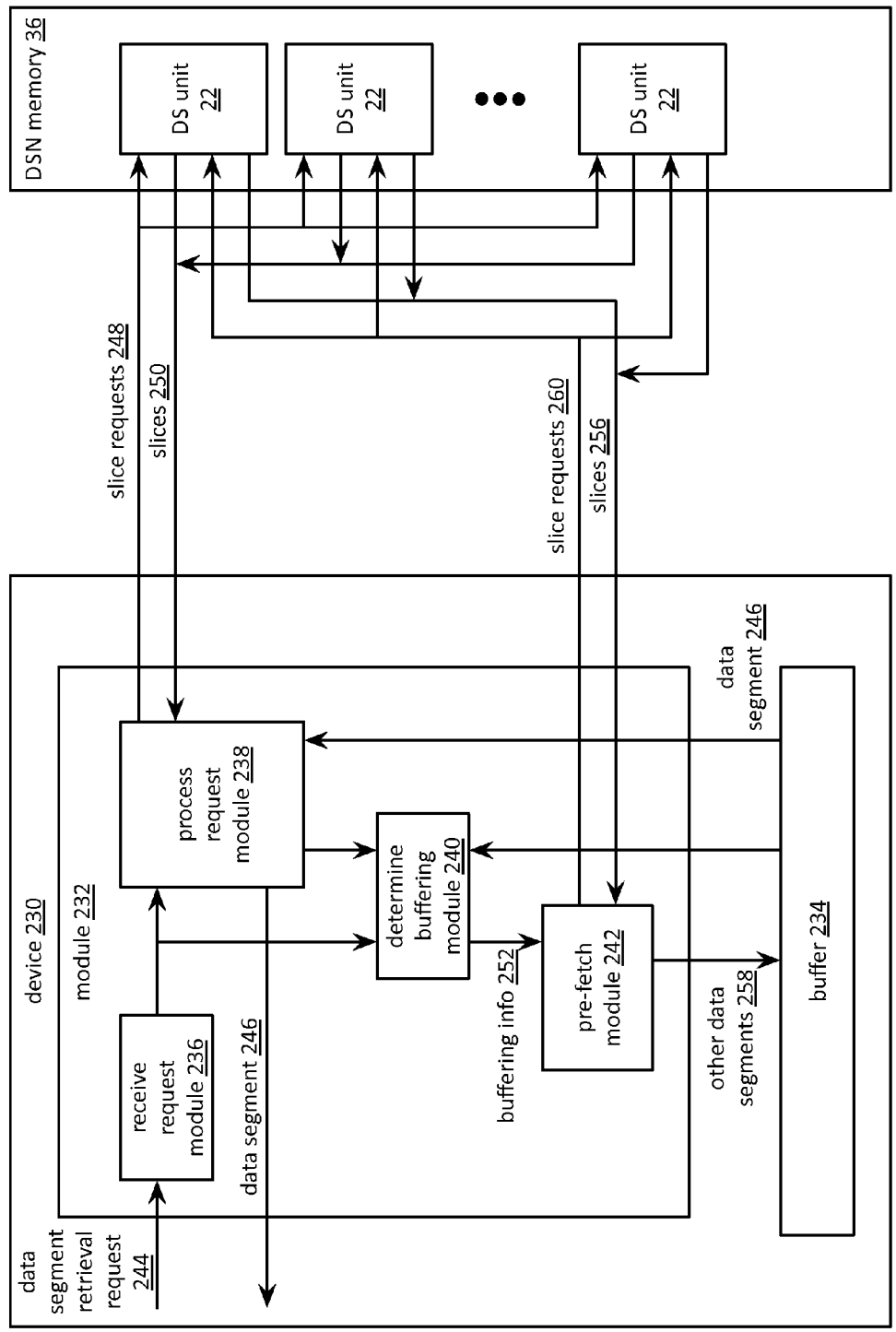
FIG. 9A is a schematic block diagram of another embodiment of a computing system in accordance with the present invention.

FIG. 9A is a schematic block diagram of another embodiment of a computing system that includes a device 230 (e.g., a user device 12, a dispersed storage (DS) processing unit 16) and a dispersed storage network (DSN) memory 36. The DSN memory 36 includes at least one set of DS units 22. The device 230 includes a module 232 and a pre-fetch segment buffer 234. The buffer 234 may be implemented utilizing one or more memory devices, wherein each memory device includes at least one of a magnetic drive memory, a solid-state memory, and an optical drive memory. The module 232 includes a receive request module 236, a process request module 238, a determine buffering module 240, and a pre-fetch module 242.

The receive request module 236 is operable to receive a data segment retrieval request 244 regarding a data segment 246 of a plurality of data segments, wherein the data segment 246 is encoded in accordance with a dispersed storage error coding function (e.g., one or more of the functions, processes, etc. discussed with reference to FIG. 4, an IDA, or other type of FEC), to produce a set of encoded data slices, which is stored in the set of DS units 22 of the DSN memory 36. In response to the data segment retrieval request 244, the process request module 238 is operable to process the data segment retrieval request 244. The process request module 238 functions to process the data segment retrieval request 244 by determining whether the data segment 246 is stored in the pre-fetch segment buffer 234. When the data segment 246 is not stored in the pre-fetch segment buffer 234, the module 238 determines whether the data segment 246 is identified in previous pre-fetch segment buffering information (e.g., a pre-fetch may be in progress). When the data segment 246 is identified in the previous pre-fetch segment buffering information, the module 238 retrieves the data segment 246 from the pre-fetch segment buffer 234. When the data segment 246 is not identified in the previous pre-fetch segment buffering information, the module 238 generates a set of at least a decode threshold number of encoded data slice retrieval requests 248 regarding at least a decode threshold number of the set of encoded data slices 250 (e.g., for sending to the set of DS units 22). When encoded data slices are received, the module 238 decodes at least a decode threshold number of the encoded data slices 250 (e.g., received from the set of DS units 22) to reproduce the data segment 246.

The pre-fetch segment buffering information 252 includes one or more of identity of the one or more other data segments, a number of encoded data slices to retrieve for each of the one or more data segments, pillar identifiers (IDs) corresponding to encoded data slices of the number of encoded data slice to retrieve, a set of DS unit IDs associated with the pillar IDs, and a data segment retrieval performance goal. The process request module 238 further functions to process the data segment retrieval request 244 by determining whether the data segment 246 is stored in the pre-fetch segment buffer 234 and when the data segment 246 is stored in the pre-fetch segment buffer 234, retrieving the data segment 246 from the pre-fetch segment buffer 234.

The determine buffering module 240 is operable to determine the pre-fetch segment buffering information 252 based on the data segment 246, content of the pre-fetch segment buffer 234, a data consumption rate, and a DS unit response rate. The DS unit response rate includes a plurality of DS response characteristics for a plurality of DS units, wherein the plurality of DS units includes the set of DS units and wherein a DS response characteristic includes one or more of a pillar identifier (ID), response latency information, processing consumption, network traffic, response history, and reliability information. For example, the determine buffering module 240 determines the pre-fetch segment buffering information 252 to include an indication to retrieve slices stored in a first and second DS unit for three segments of the one or more other data segments and an indication to retrieve slices stored in a third DS unit for six segments of the one or more data segments when response latency information indicates a slower than average response latency for the third DS unit and an average response latency for the first and second DS units.

The determine buffering module 240 further functions to determine the pre-fetch segment buffering information 252 by determining a data segment retrieval trend of the plurality of data segments and determining the pre-fetch segment buffering information 252 further based on the data segment retrieval trend. For example, the determine buffering module 240 identifies time intervals between sequential data segment retrieval requests as the data segment retrieval trend. As another example, the determine buffering module 240 identifies intervals between decoding of retrieve data segments as the data segment retrieval trend.

When the pre-fetch segment buffering information 252 indicates pre-fetching one or more other data segments 258 of the plurality of data segments, the pre-fetch module 242 is operable to generate one or more pre-fetch segment retrieval requests for the one or more other data segments 258 (e.g., for sending to the set of DS units 22), receive, in response to the one or more pre-fetch segment retrieval requests, one or more sets of at least a decode threshold number of encoded data slices 256, decode, in accordance with the dispersed storage error coding function, the one or more sets of at least a decode threshold number of encoded data slices 256 to reproduce the one or more other data segments 258, and update the pre-fetch segment buffer 234 with the one or more other data segments 258. The pre-fetch module 242 functions to generate the one or more pre-fetch segment retrieval requests by generating, for a pre-fetch segment retrieval request of the one or more pre-fetch segment retrieval requests, at least a decode threshold number of encoded data slices retrieval requests 260.

For example, the pre-fetch module 242 generates the decode threshold number of encoded data slice retrieval requests 260. The module 242 then sends, substantially simultaneously, the decode threshold number of encoded data slice retrieval requests 260 to the set of DS units 22. In response to the requests, the module 242 receives a decode threshold number of encoded data slices 256 and decodes them to reproduce another data segment 258. As another example, the pre-fetch module 242 generates the decode threshold number of encoded data slice retrieval requests 260, sends a first portion of them to a first portion of DS units (e.g., DS units associated with an above average retrieval latency) at a first point in time, and sends the remaining portion to remaining DS units (e.g., DS units associated with an average retrieval latency) at a second point in time. In response to the requests, the module 242 receives a decode threshold number of encoded data slices 256 and decodes them to reproduce another data segment 258 for storage in the pre-fetch segment buffer 234.

Figure 9B:
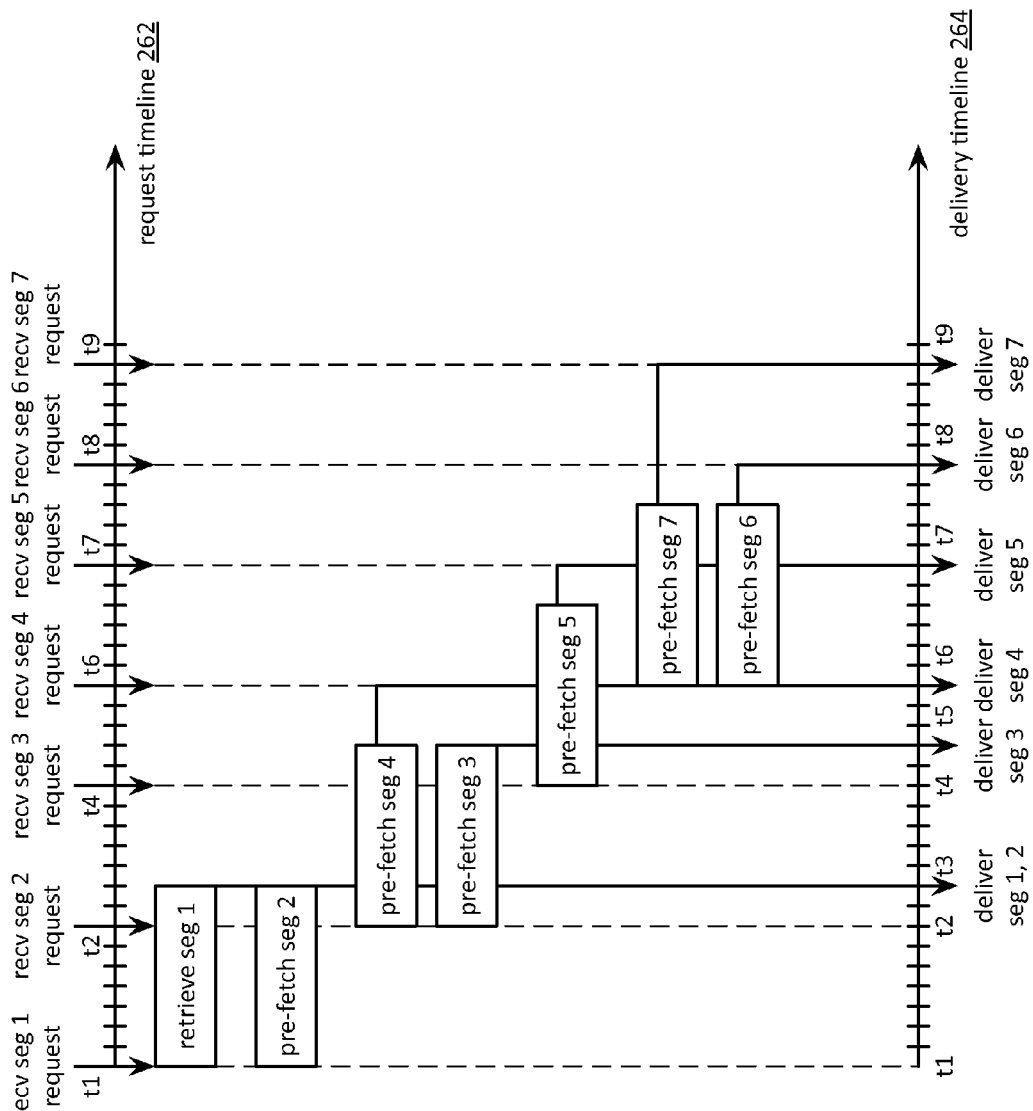
FIG. 9B is a timing diagram illustrating an example of pre-fetching a data segment in accordance with the present invention.

FIG. 9B is a timing diagram illustrating an example of pre-fetching a data segment where a request timeline 262 indicates receiving a set of data segment requests (e.g., receive data segment requests 1-7) and a delivery timeline 264 indicates delivering a set of corresponding data segments (e.g., deliver data segments 1-7). The set of data segment requests may request sequential data segments of a large data file without requesting all data segments of the large data file. For example, a request for data segment one is received at time t1, a request for data segment 2 is received at time t2, a request for data segment 3 is received at time t4, a request for data segment 4 is received at time t6, a request for data segment 5 is received at time t7, a request for data segment 6 is received at time t8, and a request for data segment 7 is received at time t9.

A method to pre-fetch data segments for delivery is utilized to provide a delivery latency improvement. In an example of operation, a new request for data segment 1 is received at time t1 and a data segment retrieval trend is determined that includes anticipation of receiving at least another incremental request for data segment 2. Pre-fetch segment buffering information is determined to initiate retrieval of at least data segments 1-2. Retrieval of data segment 1 from a dispersed storage network memory is initiated at time t1 based on the pre-fetch segment buffering information. Pre-fetch of data segment 2 is initiated at time t1 based on the pre-fetch segment buffering information. The data segment 2 request is received at time t2 and the data segment retrieval trend is updated noting that a request for data segment two has been received but the pre-fetch of data segment two has not yet been completed. The pre-fetch segment buffering information is updated to indicate a more aggressive pre-fetch requirement to speed up data segment retrievals. As such, pre-fetching of data segments 3 and 4 are initiated at time t2. Data segments 1 and 2 are delivered at time t3 at the completion of the retrieval of data segment 1 and the pre-fetch of data segment 2.

The example continues where the data segment 3 request is received at time t4 and the data segment retrieval trend is updated noting that the last three data segment requests are evenly separated by seven time units. The pre-fetch segment buffering information is updated to indicate that a delivery rate of data segments is approximately caught up to a rate of receiving the data segment retrieval requests. As such, pre-fetching of data segment 5 is initiated at time t4. Data segment 3 is delivered at time t5. An access latency of nine time units is associated with delivery of data segment 1, an access latency of two time units is associated with delivery of data segments 2 and 3. The data segment 4 request is received at time t6 and data segment 4 is delivered at time t6 with a zero time unit access latency due to an adaptation in data segment pre-fetching. The data segment retrieval trend is updated noting that the data segment 4 retrieval request was received five time units after a previous data segment 3 request. The pre-fetch segment buffering information is updated to indicate that the rate of receiving the data segment retrieval request is increasing. As such, pre-fetching of data segments 6 and 7 is initiated at time t6 to attempt to maintain a desired zero latency data segment delivery performance level. The data segment 5 retrieval request is received at time t7 and data segment 5 is delivered at time t7 with a zero time unit access latency. Data segments 6 and 7 are also delivered with a zero time unit access latency at times t8 and t9. The method to pre-fetch a data segment is discussed in greater detail with reference to FIG. 9C.

Figure 9C:
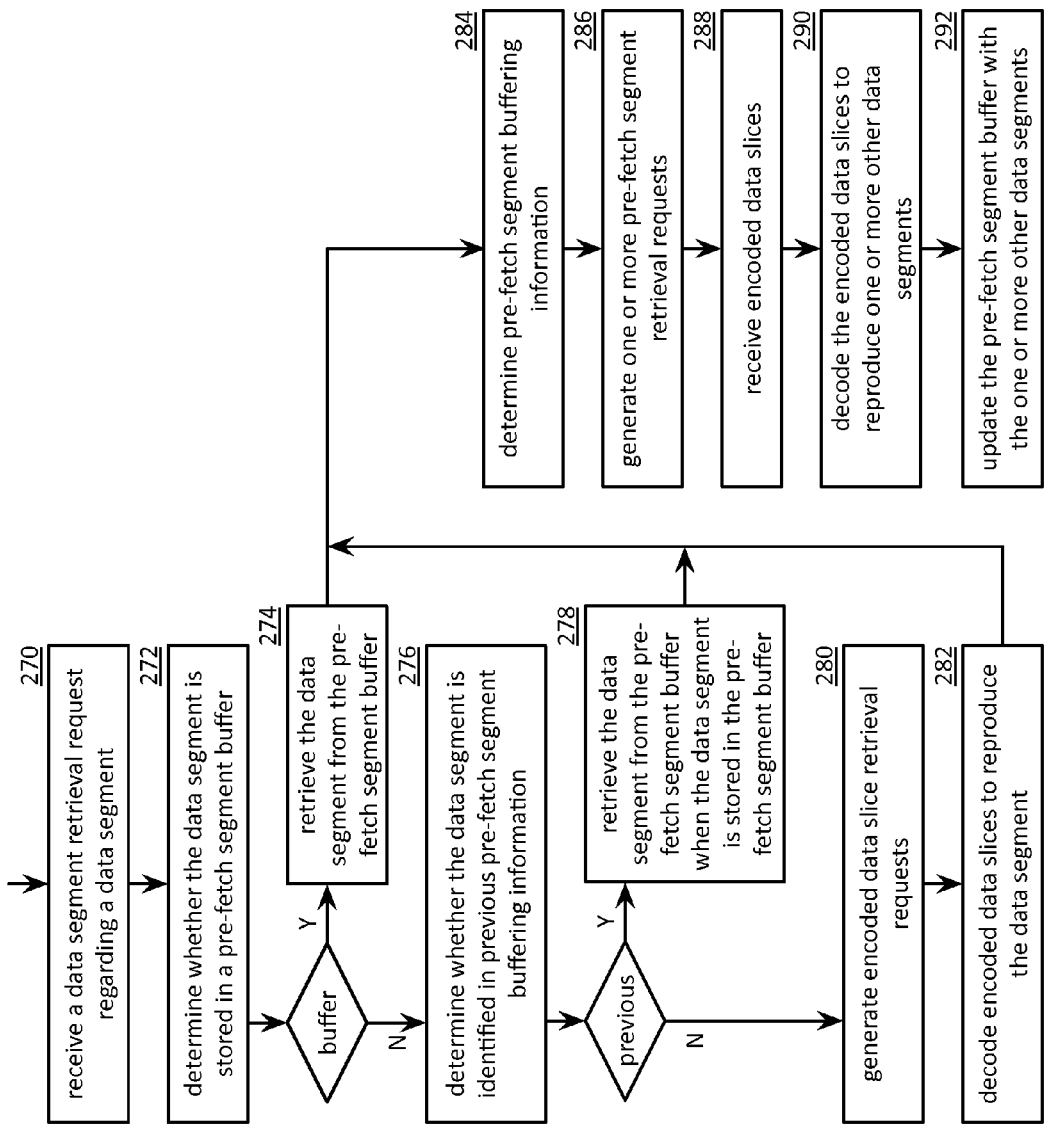
FIG. 9C is a flowchart illustrating an example of pre-fetching a data segment in accordance with the present invention.

FIG. 9C is a flowchart illustrating example of pre-fetching a data segment. The method begins with step 270 where a processing module (e.g., of a device) receives a data segment retrieval request regarding a data segment of a plurality of data segments, wherein the data segment is encoded in accordance with a dispersed storage error coding function to produce a set of encoded data slices, which is stored in a set of dispersed storage (DS) units of a dispersed storage network (DSN) memory. In response to the data segment retrieval request, the method continues at step 272 where the processing module processes the data segment retrieval request by determining whether the data segment is stored in a pre-fetch segment buffer. The method branches to step 276 when the processing module determines that the data segment is not stored in the pre-fetch segment buffer. The method continues to step 274 when the processing module determines that the data segment is stored in the pre-fetch segment buffer. The method continues at step 274 where the processing module retrieves the data segment from the pre-fetch segment buffer. The method branches to step 284.

The method continues at step 276 where the processing module determines whether the data segment is identified in previous pre-fetch segment buffering information when the data segment is not stored in the pre-fetch segment buffer. Pre-fetch segment buffering information includes one or more of identity of the one or more other data segments, a number of encoded data slices to retrieve for each of the one or more data segments, pillar identifiers (IDs) corresponding to encoded data slices of the number of encoded data slice to retrieve, a set of DS unit IDs associated with the pillar IDs, and a data segment retrieval performance goal. The method branches to step 280 when the processing module determines that the data segment is not identified in previous pre-fetch segment buffering information. The method continues to step 278 when the processing module determines that the data segment is identified in previous pre-fetch segment buffering information. The method continues at step 278 where the processing module retrieves the data segment from the pre-fetch segment buffer when the data segment is stored in the pre-fetch segment buffer when the data segment is identified in the previous pre-fetch segment buffering information. The method branches to step 284.

The method continues at step 280 where the processing module generates a set of at least a decode threshold number of encoded data slice retrieval requests regarding at least a decode threshold number of the set of encoded data slices when the data segment is not identified in the previous pre-fetch segment buffering information. The method continues at step 282 where the processing module decodes the at least the decode threshold number of the set of encoded data slices to reproduce the data segment.

The method continues at step 284 where the processing module determines pre-fetch segment buffering information based on the data segment, content of a pre-fetch segment buffer, a data consumption rate, and DS unit response rate. The DS unit response rate includes a plurality of DS response characteristics for a plurality of DS units, wherein the plurality of DS units includes the set of DS units and wherein a DS response characteristic includes one or more of: a pillar identifier (ID), response latency information, processing consumption, network traffic, response history, and reliability information. The determining the pre-fetch segment buffering information includes determining a data segment retrieval trend of the plurality of data segments and determining the pre-fetch segment buffering information further based on the data segment retrieval trend.

When the pre-fetch segment buffering information indicates pre-fetching one or more other data segments of the plurality of data segments, the method continues at step 286 where the processing module generates one or more pre-fetch segment retrieval requests for the one or more other data segments. The generating the one or more pre-fetch segment retrieval requests includes for a pre-fetch segment retrieval request of the one or more pre-fetch segment retrieval requests, generating at least a decode threshold number of encoded data slices retrieval requests. The method continues at step 288 where the processing module receives, in response to the one or more pre-fetch segment retrieval requests, one or more sets of at least a decode threshold number of encoded data slices. The method continues at step 290 where the processing module decodes, in accordance with the dispersed storage error coding function, the one or more sets of at least a decode threshold number of encoded data slices to reproduce the one or more other data segments. The method continues at step 292 where the processing module updates the pre-fetch segment buffer with the one or more other data segments.

Figure 10A:
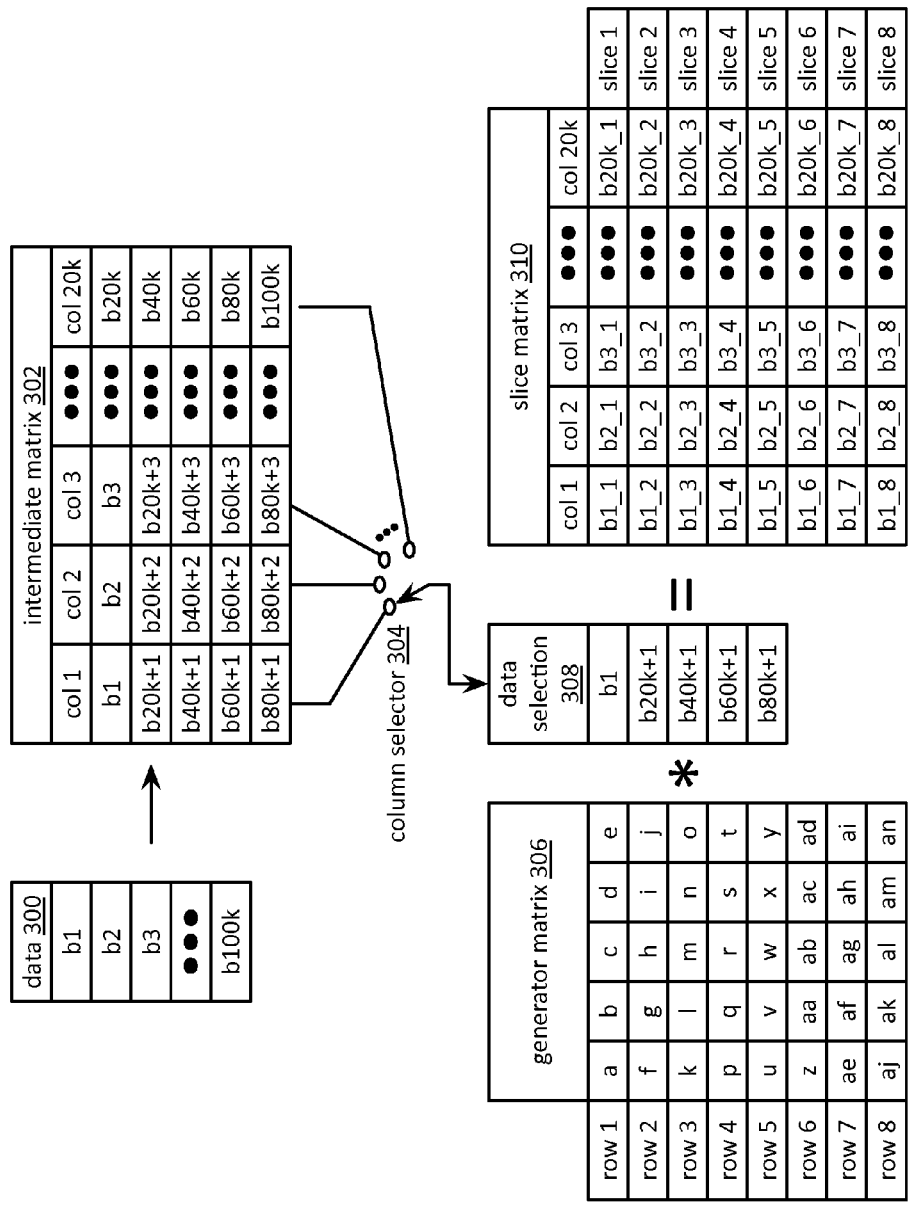
FIG. 10A is a diagram illustrating an example of encoding data in accordance with the present invention.

FIG. 10A is a diagram illustrating an example of encoding data that includes data 300, an intermediate matrix 302, a column selector 304, a generator matrix 306, a data selection 308, and a slice matrix 310 and. The data 300 includes a plurality of data bytes. For example, the data includes 100,000 bytes b1-b100k. The intermediate matrix 302 includes matrix dimensions (e.g., number of rows, number of columns) based on a size of the data and error coding dispersal storage function parameters (e.g., a decode threshold). For example, the intermediate matrix 302 includes five rows and 20,000 columns when the error coding dispersal storage function parameters includes a decode threshold of five and a data size of the data is 100,000 bytes (e.g., columns=data size/decode threshold=100k/5=20k). The intermediate matrix 302 includes entries of sequential data bytes of the data 300 in a row-by-row fashion. For example, row 1 includes bytes b1-20k, row 2 includes bytes b20k+1-b40k, etc.

The generator matrix 306 includes matrix dimensions based on the error coding dispersal storage function parameters (e.g., the decode threshold, a width). For example, the generator matrix 306 includes five columns and eight rows when the decode threshold is five and the width is eight. The generator matrix 306 includes entries in accordance with an error coding dispersal storage function to produce encoded data slices such that at least a decode threshold number of encoded data slices may be utilized to reproduce the data.

The data selection 308 includes matrix dimensions of one by the decode threshold (e.g., one by five when the decode threshold is five). The column selector 304 forms entries of the data selection 308 based on selecting data of each column of the intermediate matrix 302 one by one. For example, the column selector selects a second selection of column 2 to include bytes b2, b20k+2, b40k+2, b60k+2, and b80k+2.

The slice matrix 310 includes matrix dimensions of a width number of rows and a number of columns substantially the same as the number of columns of the intermediate matrix 302. The slice matrix 310 includes entries that form a width number of encoded data slices. Each encoded data slice of the width number of encoded data slices includes a number of bytes substantially the same as the number of columns of the intermediate matrix 302. For example, each encoded data slice of the width number of encoded data slices includes 20,000 bytes, when the decode threshold is five and the size of the data is 100,000 bytes.

In an example of operation, sequential bytes of the data 300 forms the decode threshold number of rows of the intermediate matrix 302 row by row. The column selector 304 selects one column of the intermediate matrix printer to at a time to produce a data selection 308 of a plurality of data selections. The generator matrix 306 is multiplied by each data selection 308 of the plurality of data selections to produce a corresponding column of a plurality of columns of the intermediate matrix 302 of the slice matrix 310. For example, $b1\_1=ab1+b(b20k+1)+c(b40k+1)+d(b60k+1)+e(b80k+1)$, $b1\_2=fb1+g(b20k+1)+h(b40k+1)+i(b60k+1)+j(b80k+1)$, etc, and $b1\_8=ajb1+ak(b20k+1)+al(b40k+1)+am(b60k+1)+an(b80k+1)$ when the column selector selects a first column. As another example, $b2\_1=ab2+b(b20k+2)+c(b40k+2)+d(b60k+2)+e(b80k+2)$, $b2\_2=fb2+g(b20k+2)+h(b40k+2)+i(b60k+2)+j(b80k+2)$, etc, and $b2\_8=ajb2+ak(b20k+2)+al(b40k+2)+am(b60k+2)+an(b80k+2)$ when the column selector 304 selects a second column.

Figure 10B:
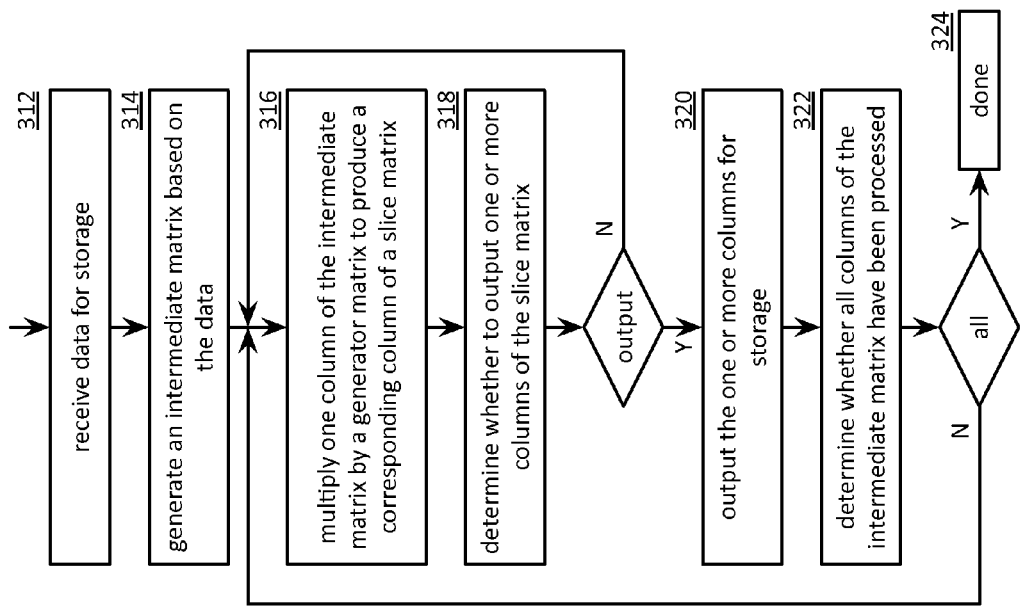
FIG. 10B is a flowchart illustrating an example of encoding data in accordance with the present invention.

FIG. 10B is a flowchart illustrating an example of encoding data. The method begins at step 312 where a processing module (e.g., of a dispersed storage module) receives data for storage. The data may include one or more of a data segment, a data object, a data block, and a data file. The method continues at step 314 where the processing module generates an intermediate matrix based on the data and error coding dispersal storage function parameters. The method continues at step 316 where the processing module multiplies a column of the intermediate matrix by a generator matrix to produce a corresponding column of a slice matrix.

The method continues at step 318 where the processing module determines whether to output one or more columns of the slice matrix. The determination may be based on one or more of a memory utilization indicator, a memory utilization threshold, a processor loading indicator, a processor loading threshold, a column count, a predetermination, a message, and a command. For example, the processing module determines to output three columns of the slice matrix when the memory utilization indicator compares unfavorably to the memory utilization threshold. The method repeats back to step 316 to produce another column of the slice matrix when the processing module determines not to output one or more columns of the slice matrix. The method continues to step 320 when the processing module determines to output one or more columns of the slice matrix.

The method continues at step 320 where the processing module outputs the one or more columns for storage when the processing module determines output one or more columns of the slice matrix. Each column of the one or more columns includes one or more bytes of a corresponding encoded data slice. For example, a width number of complete encoded data slices are output when the one or more columns includes all columns of the intermediate matrix. As another example, a width number of incomplete encoded slices are output when the one or more columns includes less than all columns of the intermediate matrix.

The outputting includes sending the one or more columns and slice information to a dispersed storage (DS) unit storage set for storage therein. The slice information includes one or more of a complete encoded data slice indicator, an append indicator (e.g., to indicate whether incomplete slices may be appended to form complete slices), and at least some of the error coding dispersal storage function parameters. For example, the slice information includes a complete encoded data slice indicator such that the indicator indicates incomplete encoded data slices when the one or more columns includes less than all columns of the intermediate matrix. As another example, the slice information includes an append indicator indicating that incomplete slices may be appended to form complete slices when the intermediate matrix is generated based on all bytes of the data. As yet another example, the slice information includes an append indicator indicating that incomplete or complete slices of a second portion of data may not be appended to incomplete or complete slices of a first portion of the data when a first intermediate matrix is generated based on the first portion of the data and a second intermediate matrix is generated based on the second portion of the data.

The method continues at step 322 where the processing module determines whether all columns of intermediate matrix have been processed. The method repeats back to step 316 to produce a corresponding column of the slice matrix for a next column. The method ends at step 324 when the processing module determines that all columns of the intermediate matrix have been processed.

Figure 10C:
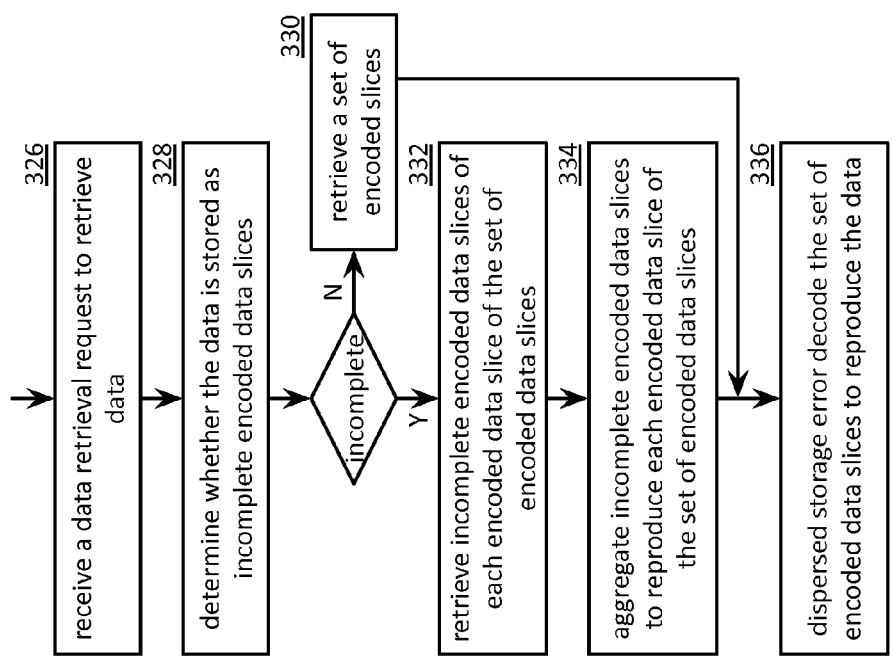
FIG. 10C is a flowchart illustrating an example of decoding data in accordance with the present invention.

FIG. 10C is a flowchart illustrating an example of decoding data. The method begins at step 326 where a processing module receives a data retrieval request to retrieve data. The request may include a data identifier (ID) and a user ID. The method continues at step 328 where the processing module determines whether the data is stored as incomplete encoded data slices. The determination may be based on one or more of the data ID, a lookup, a query, an encoded data slice retrieval response, a message, and obtaining slice information. For example, the processing module determines at least one slice name associated with the data based on generating the slice name based on the data ID and a vault ID corresponding to the user ID. The processing module sends an encoded data slice retrieval request, wherein the request includes the at least one slice name. The processing module receives an encoded data slice retrieval response corresponding to the encoded data slice retrieval request. The receiving may include receiving an encoded data slice and/or receiving slice information. The processing module determines that the data is stored as incomplete encoded data slices when the encoded data slice is incomplete and/or when the slice information indicates that the data is stored as incomplete encoded slices.

The method branches to step 332 when the processing module determines that the data is stored as incomplete encoded data slices. The method continues to step 330 when the processing module determines that the data is not stored as incomplete encoded data slices. The method continues at step 330 where the processing module retrieves a set of encoded data slices and branches to step 336.

The method continues at step 332 where the process module retrieves incomplete encoded data slices of each encoded data slice of the set of encoded data slices when the processing module determines that the data is stored as incomplete encoded data slices. The method continues at step 334 where the processing module aggregates the incomplete encoded data slices to reproduce each encoded data slice of the set of encoded data slices. For example, the processing module reproduces a slice matrix such that sequential columns of corresponding incomplete encoded data slices form the slice matrix. The method continues at step 336 where the processing module dispersed storage error decodes the set of encoded data slices to reproduce the data. The method may repeat to form a plurality of data segments of the data when the data includes the plurality of data segments.

Figure 11A:
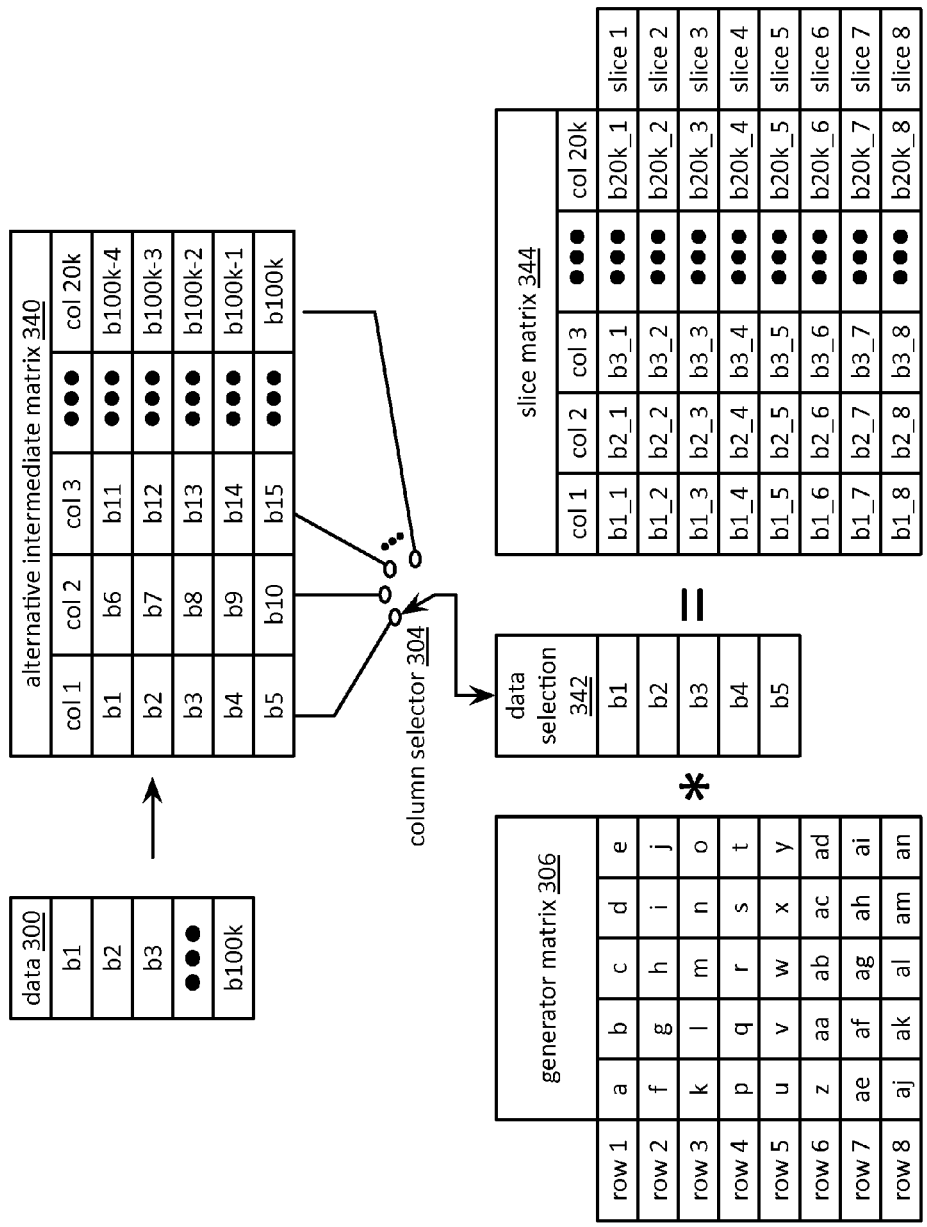
FIG. 11A is a diagram illustrating an example of appending data in accordance with the present invention.

FIG. 11A is a diagram illustrating another example of encoding data, which includes similar elements as discussed with reference to FIG. 10A. The encoding of data includes data 300, an alternative intermediate matrix 340, a column selector 304, a generator matrix 306, a data selection 342, and a slice matrix 344. The data 300 includes a plurality of data bytes. The alternative intermediate matrix 340 includes matrix dimensions (e.g., number of rows, number of columns) based on a size of the data 300 and error coding dispersal storage function parameters (e.g., a decode threshold). For example, the alternative intermediate matrix 340 includes five rows and 20,000 columns when the error coding dispersal storage function parameters includes a decode threshold of five and a data size of the data is 100,000 bytes (e.g., columns=data size/decode threshold=100k/5=20k). The alternative intermediate matrix 340 includes entries of sequential data bytes of the data 300 in a column-by-column fashion. For example, column 1 includes bytes b1-15, column 2 includes bytes b6-10, etc.

The column selector 304 forms entries of the data selection 342 based on selecting data of each column of the intermediate matrix 340 one by one. For example, the column selector 304 selects a second selection of column 2 to include bytes b6-b10 of the data 300. The slice matrix 344 includes matrix dimensions of the width number of rows and a number of columns substantially the same as a number of columns of the alternative intermediate matrix 340. The slice matrix 344 includes entries that form a width number of encoded data slices. Each encoded data slice of the width number of encoded data slices includes a number of bytes substantially the same as the number of columns of the alternative intermediate matrix 340.

In an example of operation, sequential bytes of the data 300 forms the columns of the alternative intermediate matrix 340 column by column. The column selector 304 selects one column of the alternative intermediate matrix 340 at a time to produce a data selection 342 of a plurality of data selections. The generator matrix 306 is multiplied by each data selection 342 of the plurality of data selections to produce a corresponding column of a plurality of columns of the alternative intermediate matrix 340 of the slice matrix 344. For example, $b1\_1=ab1+bb2+cb3+db4+eb5$, $b1\_2=fb1+gb2+hb3+ib4+jb5$, etc, and $b1\_8=ajb1+akb2+alb3+amb4+anb5$ when the column selector 304 selects a first column. As another example, $b2\_1=ab6+bb7+cb8+db9+eb10$, $b2\_2=fb6+gb7+hb8+ib9+jb10$, etc, and b2_8=ajb6+akb7+alb8+amb9+anb10 when the column selector 304 selects a second column.

Utilizing such an alternative intermediate matrix 340 enables appending incomplete slices of corresponding encoded slices to form complete encoded data slices when the data is partitioned into two or more data partitions. For example, an a first incomplete encoded data slice of encoded data slice 1 may be appended to a second incomplete encoded data slice of encoded data slice 1, when the data includes byte 1-byte 100k+5 and the data is partitioned into two partitions which includes a first partition including bytes b1-b100k and a second partition including byte b100k+1-byte 100+5. An apparatus to execute the appending is described in greater detail with reference to FIG. 11B and methods of appending is described in greater detail with reference to FIGS. 11C and 11D.

Figure 11B:
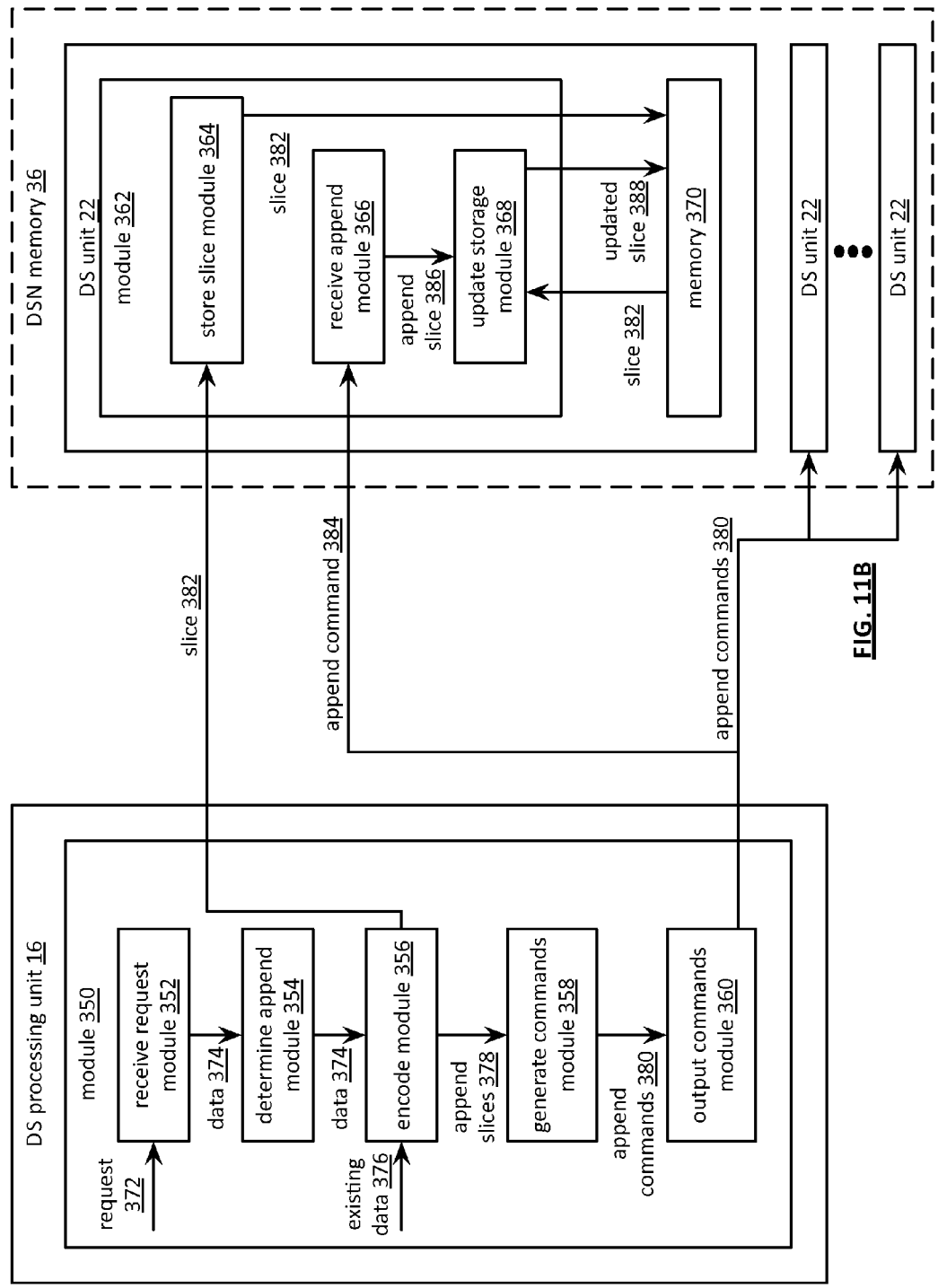
FIG. 11B is a schematic block diagram of another embodiment of a computing system in accordance with the present invention.

FIG. 11B is a schematic block diagram of another embodiment of a computing system that includes a dispersed storage (DS) processing unit 16 and dispersed storage network (DSN) memory 36. The DS processing unit 16 includes a module 350 (e.g., a DS module 34). Alternatively, the DS processing unit 16 may be implemented utilizing a DS module 34 of a user device 12. The module 350 includes a receive request module 352, a determine append module 354, an encode module 356, a generate commands module 358, and an output commands module 360. The DSN memory 36 includes at least one set of DS units 22. Each DS unit 22 includes a module 362 (e.g., a DS module 34) and a memory 370. The module 362 includes a store slice module 364, a receive append module 366, and an update storage module 368. The memory 370 may be implemented as one or more memory devices utilizing one or more of a solid-state memory, a magnetic drive memory, and an optical drive memory.

The receive request module 352 is operable to receive a request 372 to store data 374 in the DSN memory 36. The determine append module 354 is operable to determine whether the data 374 is to be appended to existing data 376 stored in the DSN memory 22, wherein the existing data 376 is stored in the DSN memory 36 as a set of encoded data slices and wherein the existing data 376 is encoded using a dispersed storage error coding function to produce the set of encoded data slices. The determine append module 354 functions to determine whether the data 374 is to be appended by at least one of receiving an append instruction with the data 374, interpreting account information associated with an issuer of the request to store the data 374, and interpreting directory information of at least one of the data 374 and the existing data 376.

When the data 374 is to be appended, the encode module 356 is operable to encode, using an append dispersed storage error coding function, the data 374 to produce a set of encoded append data slices 378. The encode module 356 is further operable to encode the existing data using 376 the dispersed storage error coding function by arranging data blocks of the existing data into a plurality of groups of data blocks and on a group of data block by group of data block basis, matrix-multiplying the plurality of groups of data blocks with a dispersed storage error encoding matrix to produce a plurality of sets of encoded data slice portions and wherein an encoded data slice of the set of encoded data slices includes an encoded data slice portion from each of the plurality of sets of encoded data slice portions.

The encode module 356 is further operable to encode the data 374 using the append dispersed storage error coding function by partitioning the data into data blocks based on size of the data blocks of the existing data, arranging the data blocks of the data into a second plurality of groups of data blocks, wherein a group of data blocks of the second plurality of groups of data blocks includes a same number of data blocks as a group of data blocks of the plurality of groups of data blocks, and on the group of data block by group of data block basis, matrix-multiplying the second plurality of groups of data blocks with the dispersed storage error encoding matrix to produce a second plurality of sets of encoded data slice portions and wherein an encoded append data slice of the set of encoded append data slices includes an encoded data slice portion from each of the second plurality of sets of encoded data slice portions.

The generate commands module 358 is operable to generate a set of append commands 380, wherein an append command of the set of append commands 380 includes an encoded append data slice of the set of encoded append data slices 378 and identity of one of the set of DS units 22 of the DSN memory 36. The append command further includes at least one of a slice name of a corresponding one of set of encoded data slices, an offset indicator, and a column identifier of a slice matrix. The output commands module 360 is operable to output at least a write threshold number of the set of append commands 380 to at least a write threshold number of the set of DS units 22. For example, the output commands module 360 outputs an append command 384 of the set of append commands 380 a DS unit 22 of the set of DS units 22.

The receive request module 352 is further operable to receive second data for storage in the DSN memory 36. The determine append module 354 is further operable to determine whether the second data is to be appended to existing appended data 376 stored in the DSN memory 36, wherein the existing appended data includes the set of encoded data slices and the set of encoded append data slices 378. When the second data is to be appended, the encode module 356 is further operable to encode, using the append dispersed storage error coding function, the second data to produce a second set of encoded append data slices, the generate commands module 358 is further operable to generate a second set of append commands, and the output commands module 360 is further operable to output at least a write threshold number of the second set of append commands to the at least a write threshold number of the set of DS units 22.

The store slice module 364 is operable to store an encoded data slice 382 of the set of encoded data slices, wherein the existing data 376 is encoded using a dispersed storage error coding function to produce the set of encoded data slices. The receive append module 366 is operable to receive the append command 384 that includes an encoded append data slice 386 of the set of encoded append data slices 378 and an instruction to append the encoded append data slice 386 to the encoded data slice 382, wherein the data 374 is encoded using an append dispersed storage error coding function to produce the set of encoded append data slices 378.

The update storage module 368 is operable to update storage of the encoded data slice 382 based on the encoded append data slice 386 to produce an updated encoded data slice 388. The update storage module 368 is further operable to interpret the append command 384 to identify a slice name of the encoded append data slice 386, identify the encoded data slice 382 based on the slice name, append the encoded append data slice 386 to the encoded data slice 382 to produce the updated encoded data slice 388, and update a slice table to associate the slice name with the updated encoded data slice 388. The update storage module 368 functions to update storage of the encoded data slice 382 by identifying the encoded data slice 382 (e.g., by data identifier (ID), by a slice name, by a pillar number), retrieving the encoded data slice 382 to produce a retrieved encoded data slice, appending the encoded append data slice 386 to the retrieved encoded data slice to produce the updated encoded data slice 388, and storing the updated encoded data slice 388. The receive append module 366 is further operable to receive a second append command that includes a second encoded append data slice of a second set of encoded append data slices and another instruction to append the second encoded append data slice to the updated encoded data slice 388, wherein second data is encoded using the append dispersed storage error coding function to produce the second set of encoded append data slices and the update storage module 368 is further operable to update storage of the updated encoded data slice based on the second key encoded append data slice to produce a second updated encoded data slice.

Figure 11C:
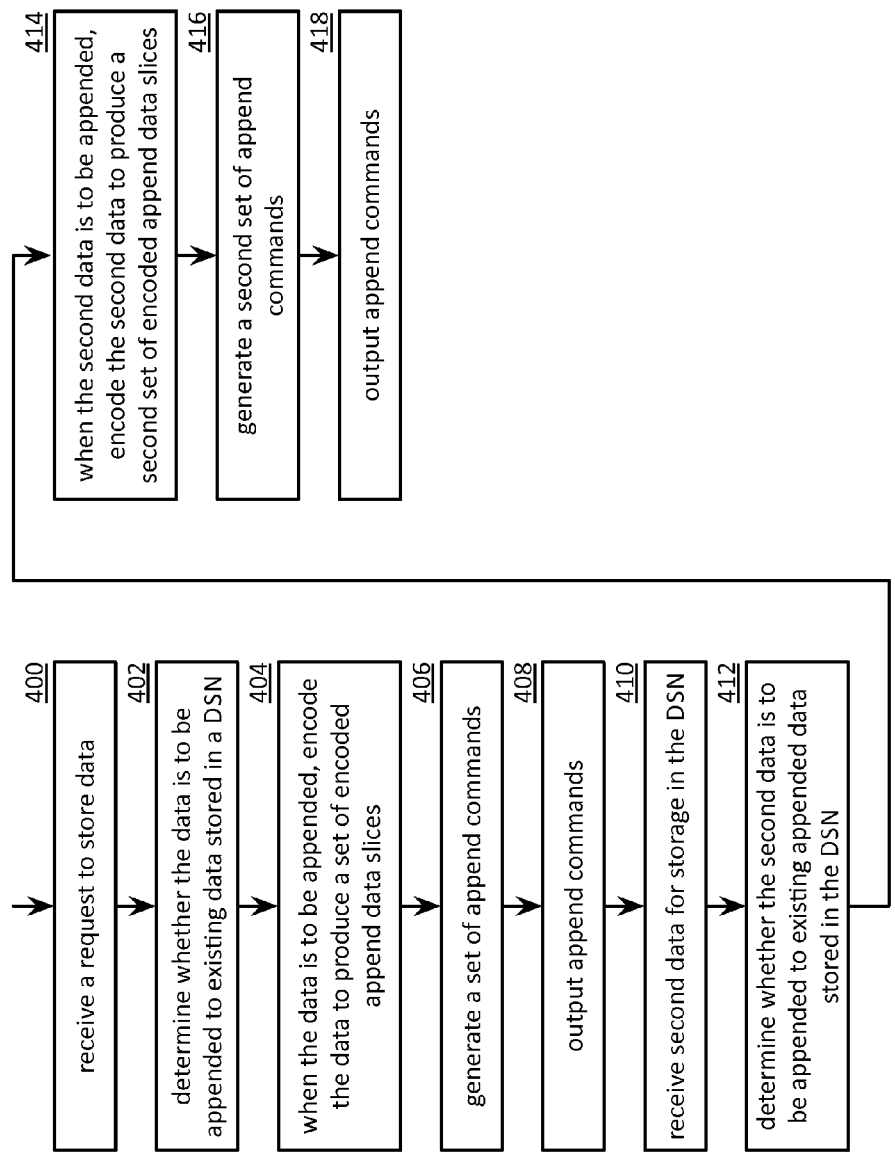
FIG. 11C is a flowchart illustrating an example of appending data in accordance with the present invention.

FIG. 11C is a flowchart illustrating an example of appending data. The method begins at step 400 where a processing module (e.g., of a dispersed storage (DS) processing unit, of a user device) receives a request to store data in dispersed storage network (DSN) memory. The method continues at step 402 where the processing module determines whether the data is to be appended to existing data stored in the DSN memory, wherein the existing data is stored in the DSN memory as a set of encoded data slices and wherein the existing data is encoded using a dispersed storage error coding function to produce the set of encoded data slices. The encoding the existing data using the dispersed storage error coding function includes arranging data blocks of the existing data into a plurality of groups of data blocks and on a group of data block by group of data block basis, matrix-multiplying the plurality of groups of data blocks with a dispersed storage error encoding matrix to produce a plurality of sets of encoded data slice portions and wherein an encoded data slice of the set of encoded data slices includes an encoded data slice portion from each of the plurality of sets of encoded data slice portions.

The determining whether the data is to be appended further includes at least one of receiving an append instruction with the data, interpreting account information associated with an issuer of the request to store the data, and interpreting directory information of at least one of the data and the existing data. When the data is to be appended, the method continues at step 404 where the processing module encodes, using an append dispersed storage error coding function, the data to produce a set of encoded append data slices. The encoding the data using the append dispersed storage error coding function includes partitioning the data into data blocks based on size of the data blocks of the existing data, arranging the data blocks of the data into a second plurality of groups of data blocks, wherein a group of data blocks of the second plurality of groups of data blocks includes a same number of data blocks as a group of data blocks of the plurality of groups of data blocks, and on the group of data block by group of data block basis, matrix-multiplying the second plurality of groups of data blocks with the dispersed storage error encoding matrix to produce a second plurality of sets of encoded data slice portions and wherein an encoded append data slice of the set of encoded append data slices includes an encoded data slice portion from each of the second plurality of sets of encoded data slice portions.

The method continues at step 406 where the processing module generates a set of append commands, wherein an append command of the set of append commands includes one or more of an encoded append data slice of the set of encoded append data slices and identity of one of a set of DS units of the DSN memory. The append command further includes at least one of a slice name of a corresponding one of set of encoded data slices, an incremental slice revision level indicator, an offset indicator, and a column identifier of a slice matrix. The method continues at step 408 where the processing module outputs at least a write threshold number of the set of append commands to at least a write threshold number of the set of DS units.

The method continues at step 410 where the processing module receives second data (e.g., additional data to append) for storage in the DSN memory. The method continues at step 412 where the processing module determines whether the second data is to be appended to existing appended data stored in the DSN memory, wherein the existing pending data includes the set of encoded data slices and the set of encoded append data slices. When the second data is to be appended, the method continues at step 414 where the processing module encodes, using the append dispersed storage error coding function, the second data to produce a second set of encoded append data slices. The method continues at step 416 where the processing module generates a second set of append commands. The method continues at step 418 where the processing module outputs at least a write threshold number of the second set of append commands to the at least a write threshold number of the set of DS units.

Figure 11D:
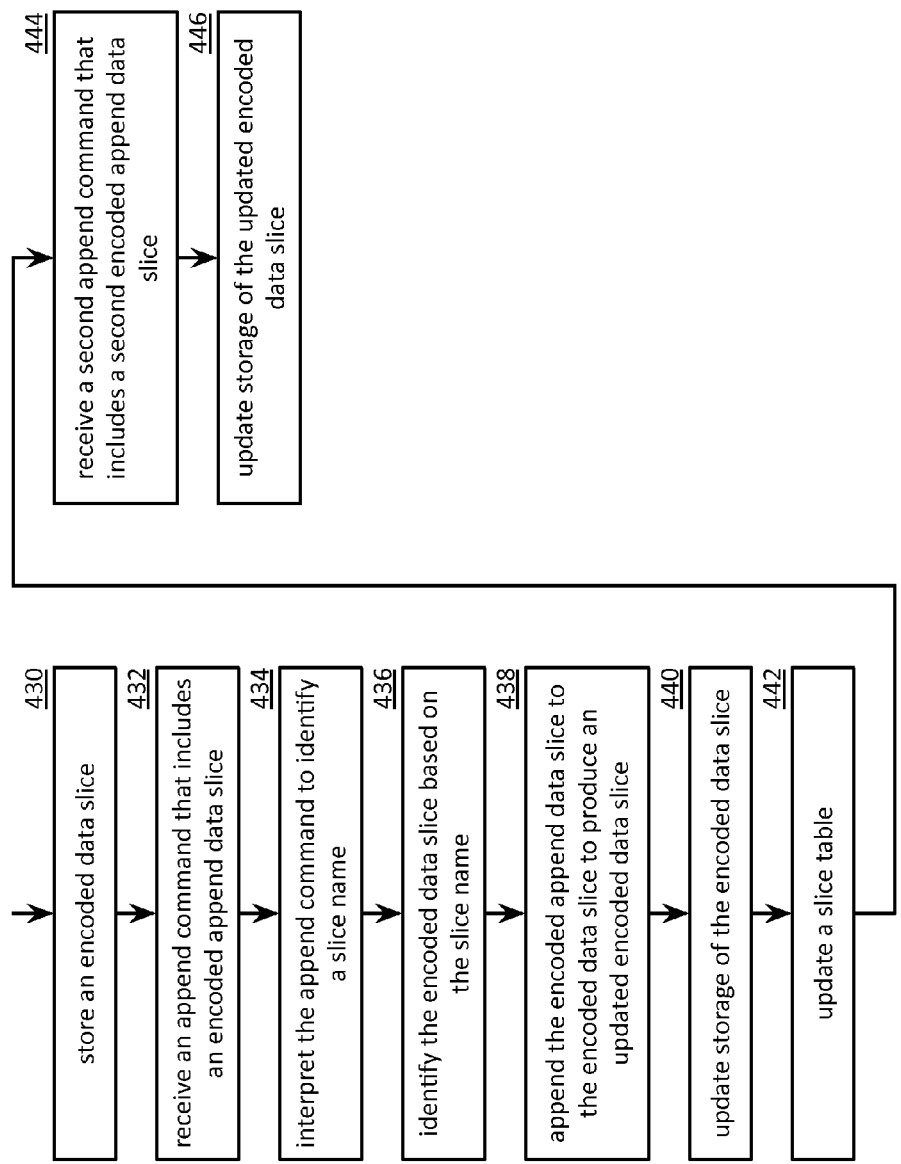
FIG. 11D is a flowchart illustrating an example of appending slice portions in accordance with the present invention.

FIG. 11D is a flowchart illustrating an example of appending slice portions. The method begins at step 430 where a processing module (e.g., of a dispersed storage (DS) unit) stores an encoded data slice of a set of encoded data slices, wherein existing data is encoded using a dispersed storage error coding function to produce the set of encoded data slices. The method continues at step 432 where the processing module receives an append command that includes an encoded append data slice of a set of encoded append data slices and an instruction to append the encoded append data slice to the encoded data slice, wherein data is encoded using an append dispersed storage error coding function to produce the set of encoded append data slices.

The method continues at step 434 where the processing module interprets the append command to identify one or more of a slice name of the encoded append data slice and an incremental revision level indicator. The method continues at step 436 where the processing module identifies the encoded data slice based on one or more of the slice name and the incremental revision level indicator. The method continues at step 438 where the processing module appends the encoded append data slice to the encoded data slice to produce the updated encoded data slice. The method continues at step 440 where the processing module updates storage of the encoded data slice based on the encoded append data slice to produce an updated encoded data slice. The updating storage of the encoded data slice includes identifying the encoded data slice (e.g., by data identifier (ID), by a slice name, by a pillar number, by the incremental revision level indicator), retrieving the encoded data slice to produce a retrieved encoded data slice, appending the encoded append data slice to the retrieved encoded data slice to produce the updated encoded data slice, and storing the updated encoded data slice.

The method continues at step 442 where the processing module updates a slice table to associate the slice name with the updated encoded data slice. The method continues at step 444 where the processing module receives a second append command that includes a second encoded append data slice of a second set of encoded append data slices and another instruction to append the second encoded append data slice to the updated encoded data slice, wherein second data is encoded using the append dispersed storage error coding function to produce the second set of encoded append data slices. The method continues at step 446 where the processing module updates storage of the updated encoded data slice based on the second encoded append data slice to produce a second updated encoded data slice.

FIGS. 12A-E are schematic block diagrams of another embodiment of the computing system that each include a dispersed storage (DS) processing unit 16 and DS units 1-5, wherein each figure of FIGS. 12A-E correspond a step of a Shamir secret share rebuilding scenario. In such a Shamir secret share rebuilding scenario, a first step includes generating and storing a set of Shamir secret shares in DS units 1-5, a second step includes determining a Shamir secret share of the set of Shamir secret shares to be rebuilt, a third step includes requesting a decode threshold number of rebuilt Shamir secret share partials, a fourth step includes generating the decode threshold number of rebuilt Shamir secret share partials, and a fifth step includes decoding the decode threshold number of rebuilt Shamir secret share partials to produce a rebuilt Shamir secret share and storing the rebuilt Shamir secret share. The method of operation is discussed in greater detail with reference to FIGS. 12A-13B.

Figure 12A:
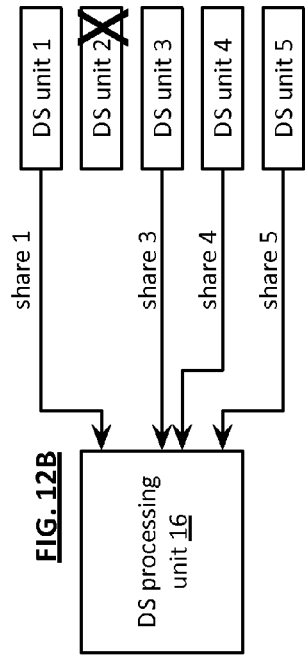
FIG. 12A is a schematic block diagram of another embodiment of a computing system in accordance with the present invention.

FIG. 12A is a schematic block diagram of another embodiment of a computing system of a first step of a Shamir secret share rebuilding scenario, where a dispersed storage (DS) processing unit 16 utilizes a Shamir shared secret function on a secret to produce a width number of Shamir secret shares 1-5. The DS processing unit 16 sends the width number of Shamir secret shares 1-5 to corresponding DS units 1-5 for storage therein.

Figure 12B:
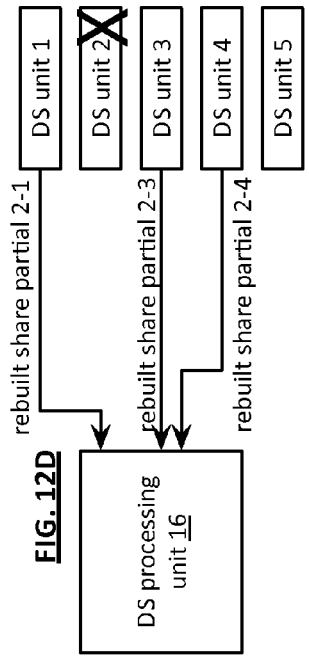
FIG. 12B is a schematic block diagram of another embodiment of a computing system in accordance with the present invention.

FIG. 12B is a schematic block diagram of another embodiment of a computing system of a second step of a Shamir secret sharing rebuilding scenario, where a dispersed storage (DS) processing unit 16 determines a Shamir secret share to be rebuilt. For example, the processing module sends a width number of Shamir secret share retrieval requests to a width number of DS units 1-5 and determines that a Shamir secret share corresponding to DS unit 2 is missing based on receiving Shamir secret shares corresponding to DS units 1, and DS units 3-5 (e.g., and not from DS unit 2).

Figure 12C:
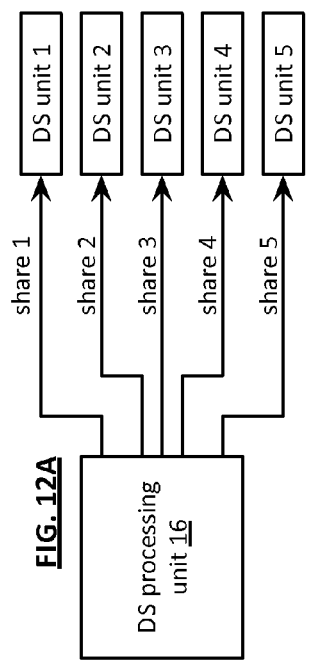
FIG. 12C is a schematic block diagram of another embodiment of a computing system in accordance with the present invention.

FIG. 12C is a schematic block diagram of another embodiment of a computing system of a third step of a Shamir secret sharing rebuilding scenario, where a dispersed storage (DS) processing unit 16 generates a decode threshold number of partial request messages and sends the decode threshold number of partial request messages to a decode threshold number of DS units associated with other Shamir secret shares. The partial request message of the decode threshold number of partial request messages includes an identifier of a Shamir secret share to be rebuilt. For example, the processing module generates the decode threshold number of partial request messages to include an identifier of 2 for the Shamir secret share to be rebuilt and sends the decode threshold number of partial request messages to the decode threshold number of DS units including DS units 1, 3, and 4.

Figure 12D:
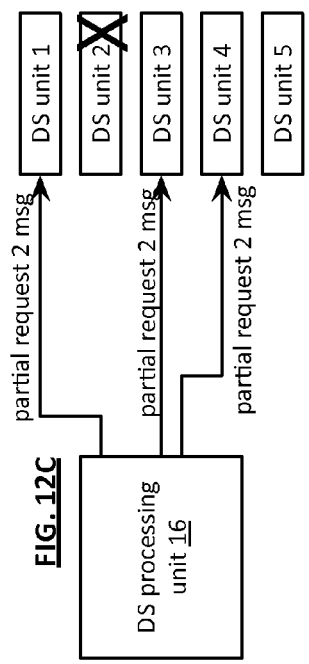
FIG. 12D is a schematic block diagram of another embodiment of a computing system in accordance with the present invention.

FIG. 12D is a schematic block diagram of another embodiment of a computing system of a fourth step of a Shamir secret sharing rebuilding scenario, where each dispersed storage (DS) unit of a decode threshold number of DS units generates a rebuilt share partial based on an identifier of a Shamir secret share to be rebuilt and a corresponding local Shamir secret share and sends the rebuilt share partial to a DS processing unit 16. For example, DS unit 1 generates the rebuilt share partial 2-1 based on an identifier of 2 for the Shamir secret share to be rebuilt and a corresponding local Shamir secret share 1 and sends the rebuilt share partial 2-1 to the DS processing unit 16, DS unit 3 generates the rebuilt share partial 2-3 based on the identifier of 2 for the Shamir secret share to be rebuilt and a corresponding local Shamir secret share 3 and sends the rebuilt share partial 2-3 to the DS processing unit 16, and DS unit 4 generates the rebuilt share partial 2-4 based on the identifier of 2 for the Shamir secret share to be rebuilt and a corresponding local Shamir secret share 4 and sends the rebuilt share partial 2-4 to the DS processing unit 16.

Figure 12E:
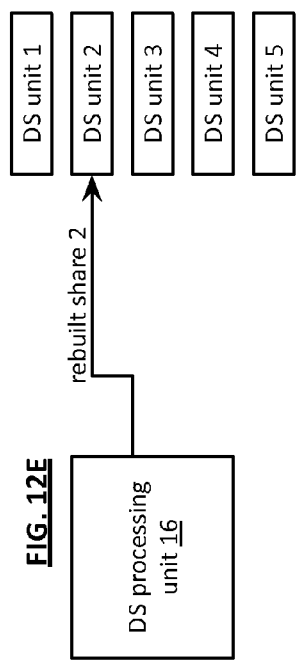
FIG. 12E is a schematic block diagram of another embodiment of a computing system in accordance with the present invention.

FIG. 12E is a schematic block diagram of another embodiment of a computing system of a fifth step of a Shamir secret sharing rebuilding scenario, where a dispersed storage (DS) processing unit 16 receives a decode threshold number of rebuilt share partials, decodes the decode threshold number of rebuilt share partials to produce a rebuilt Shamir secret share, and stores the rebuilt Shamir secret share in a DS unit corresponding to a Shamir secret share to be rebuilt. For example, the processing unit 16 receives rebuilt share partials 2-1, 2-3, and 2-4, decodes the rebuilt share partials 2-1, 2-3, and 2-4 to produce rebuilt Shamir secret share 2, and sends the rebuilt Shamir secret share 2 to DS unit 2 for storage therein.

Figures 13A, 13B:
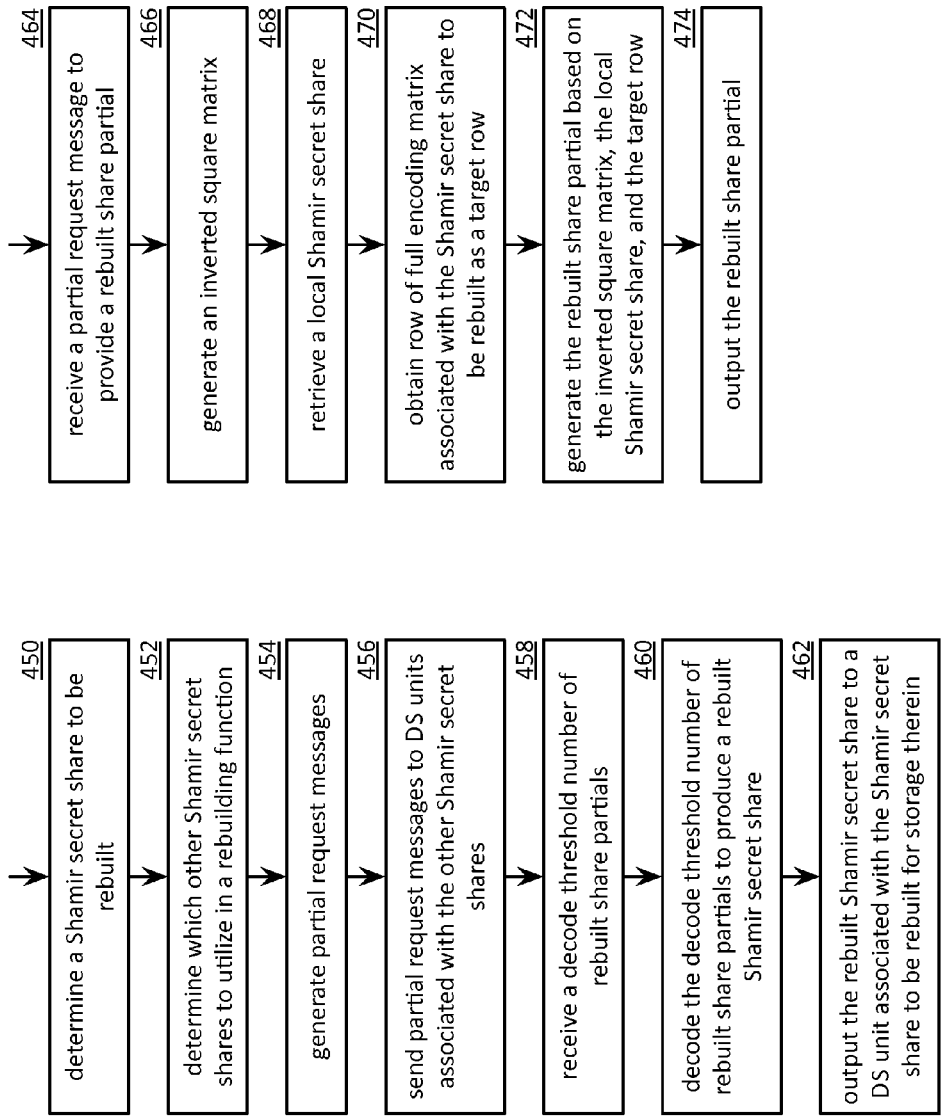
FIG. 13A is a flowchart illustrating an example of rebuilding a Shamir secret share in accordance with the present invention.
FIG. 13B is a flowchart illustrating an example of generating a rebuilt share partial in accordance with the present invention.

FIG. 13A is a flowchart illustrating an example of rebuilding a Shamir secret share. The method begins with step 450 where a processing module (e.g., of a dispersed storage (DS) processing unit) determines a Shamir secret share to be rebuilt. The determination may be based on one or more of a query, a Shamir secret share retrieval sequence, an error message, and a decode result. The method continues at step 452 where the processing module determines which other Shamir secret shares to utilize in a rebuilding function. The determination may be based on one or more of a DS unit status indicator, a decode threshold, a decode result, a retrieval result, a query, and a message. For example, the processing module determines other Shamir secret shares to utilize in the rebuilding function to include DS units 1, 3, and 4 when the decode threshold is three and a corresponding Shamir secret share has been successfully retrieved from each DS unit of DS units 1, 3, and 4.

The method continues at step 454 where the processing module generates a decode threshold number of partial request messages. The messages include one or more of an identifier (ID) associated with the Shamir secret share to be rebuilt, which other Shamir secret shares are being utilized in the rebuilding function, and encoding matrix, a square matrix, an inverted square matrix, and a row of the matrix corresponding to the Shamir secret share to be rebuilt (e.g., wrote 2 for Shamir secret share 2 to be rebuilt). The method continues at step 456 where the processing module sends the decode threshold number of partial request messages to a decode threshold number of DS units associated with the other Shamir secret shares. For example, the processing module sends a partial request message that includes a request for rebuilt share partial 2-1 to DS unit 1, the processing module sends a partial request message that includes a request for rebuilt share partial 2-3 to DS unit 3, and the processing module sends a partial request message that includes a request for rebuilt share partial 2-4 to DS unit 4.

The method continues at step 458 where the processing module receives a decode threshold number of rebuilt share partials. For example, the processing module receives rebuilt share partial 2-1, 2-3, and 2-4. The method continues at step 460 where the processing module decodes the decode threshold number of rebuilt share partials to produce a rebuilt Shamir secret share. For example, the processing module decodes the decode threshold number of rebuilt share partials 2-1, 2-3, and 2-4 in accordance with the formula rebuilt Shamir secret share 2=(rebuilt share partial 2-1) exclusive OR (XOR) (rebuilt share partial 2-3) XOR (rebuilt share partial 2-4). The method continues at step 462 where the processing module outputs the rebuilt Shamir secret share to a DS unit for storage therein, wherein the DS unit is associated with the Shamir secret share to be rebuilt. For example, the processing module sends rebuilt Shamir secret share 2 to DS unit 2 for storage therein.

FIG. 13B is a flowchart illustrating an example of generating a rebuilt share partial. The method begins at step 464 where processing module (e.g., of a dispersed (DS) storage unit) receives a partial request message to provide a rebuilt share partial. The method continues at step 466 where the processing module generates an inverted square matrix. The generation includes one or more of receiving the inverted square matrix, obtaining an encoding matrix (e.g., extracted from the request message, retrieved), selecting a decode threshold number of rows of the encoding matrix to produce a square matrix (e.g., corresponding to other Shamir secret shares to be utilized in a rebuilding function), and inverting the square matrix to produce the inverted square matrix.

The method continues at step 468 where the processing module retrieves a local Shamir secret share. The retrieving includes identifying the local Shamir secret share to produce a local Shamir secret share identifier (ID) based on the partial request message and retrieving the local Shamir secret share based on the local Shamir secret share ID. For example, the processing module identifies the local Shamir secret share as local Shamir secret share 1 based on receiving a request message for rebuilt share partial 2-1 and retrieves Shamir secret share 1 from a local memory of a dispersed storage (DS) unit.

The method continues at step 470 where the processing module obtains a row of a full encoding matrix associated with the Shamir secret share to be rebuilt as a target row. The obtaining may include one or more of receiving the target row in the partial request message and extracting the target row from the full encoding matrix based on an ID of the Shamir secret share to be rebuilt. The processing module may obtain the full encoding matrix based on one or more of extracting the full encoding matrix from the partial request message and retrieving the full encoding matrix. For example, the processing module extracts row 2 of the full encoding matrix when the request message includes a request for rebuilt share partial 2-1.

The method continues at step 472 where the processing module generates the rebuilt share partial based on the inverted square matrix, the local Shamir secret share, and the target row. For example, the processing module multiplies the inverted square matrix by the local Shamir secret (e.g., in matrix form wherein the local Shamir secret share is placed in a row corresponding to an ID of the local Shamir secret share) by the target row to produce the rebuilt share partial. The method continues at step 474 where the processing module outputs the rebuilt share partial. For example, the processing module sends the rebuilt share partial to a requesting entity (e.g. a DS processing unit), associated with the partial request message.

FIGS. 14A-D are schematic block diagrams of another embodiment of a computing system that each include a dispersed storage (DS) processing unit 16 and DS units 1-6, wherein each figure of FIGS. 14A-D correspond a step of a data update scenario. In such a data update scenario, a first step includes the DS processing unit 16 generating and storing data as data 1-4 and parity of the data as parity 5-6 in DS units 1-6 when an associated encoding function includes a decode threshold of 4 and a width of 6, a second step includes the DS processing unit 16 storing updated data as updated data 2 by sending updated data 2 to DS unit 2 for storage therein, a third step includes DS unit 2 generating delta parity 5 and delta parity 6 based on data 2 and updated data 2 and sending delta parity 5 and delta parity 6 to DS processing unit 16, and a fourth step includes the DS processing unit 16 forwarding delta parity 5 to DS unit 5 and delta parity 6 to DS unit 6, DS unit 5 generates and stores updated parity 5 based on parity 5 and delta parity 5, and DS unit 6 generates and stores updated parity 6 based on parity 6 and delta parity 6.

Alternatively, the third step includes the DS processing unit 16 retrieving data 2 from DS unit 2 and generating delta parity 5 and delta parity 6 based on data 2 and updated data 2. Alternatively, the fourth step includes the DS processing unit 16 retrieving parity 5 from DS unit 5 and retrieving parity 6 from DS unit 6, generating updated parity 5 and updated parity 6, and sending updated parity 5 to DS unit 5 for storage therein and sending updated parity 6 to DS unit 6 for storage therein. The method of operation is discussed in greater detail with reference to FIGS. 14A-15C.

FIG. 14A is a schematic block diagram of another embodiment of a computing system of a first step of a data update scenario, where a dispersed storage (DS) processing unit 16 generates and stores data as data 1-4 and parity of the data as parity 5-6 in DS units 1-6. The generation of data 1-4 and parity 5-6 is in accordance with a data encoding function, wherein the data encoding function includes utilizing an encoding matrix. In a first embodiment, the encoding matrix includes a unity square matrix (e.g., a first decode threshold number of rows each includes a one in a single column of a decode threshold number of columns producing a diagonal string of one's) and includes a width number minus the decode threshold number of parity rows. The parity rows include encoding matrix entries in accordance with the data encoding function. In a second embodiment, encoding matrix does not include the unity square matrix.

The generation of data 1-4 and parity 5-6 includes matrix multiplying the encoding matrix by the data to produce a width number of encoded data slices, wherein encoded data slices 1-4 produce data 1-4 and encoded data slices 5-6 produce parity 5-6. The storing of the data includes sending data 1 to DS unit 1 for storage therein, sending data 2 to DS unit 2 for storage therein, sending data 3 to DS unit 3 for storage therein, sending data 4 to DS unit 4 for storage therein, sending parity 5 to DS unit 5 for storage therein, and sending parity 6 to DS unit 6 for storage therein.

FIG. 14B is a schematic block diagram of another embodiment of a computing system of a second step of a data update scenario, where a dispersed storage (DS) processing unit 16 obtains an updated portion of data to produce updated data and sends an updated data storage request message to a corresponding DS unit to replace a corresponding portion of the data. The obtaining may include receiving the updated portion of data, receiving data that includes the updated portion of data, and analyzing data to identify the updated portion of data. The storage request message may include one or more of the updated data, encoding information, and a request for delta parity information. The encoding information may include one or more of an encoding matrix, a width, and a decode threshold. For example, the DS processing unit 16 receives an updated portion of data corresponding to a second portion of data to produce updated data 2 and sends a storage request message to DS unit 2 that includes the updated data 2.

FIG. 14C is a schematic block diagram of another embodiment of a computing system of a third step of a data update scenario, where a dispersed storage (DS) unit generates delta parity information based on updated data, data (e.g., previous data which is being replaced by the updated data), and an encoding function and sends the delta parity information to a corresponding DS processing unit 16. Alternatively, the DS unit directly sends the delta parity information to one or more other DS units associated with storage of parity information. For example, DS unit 2 generates the delta parity information to include delta parity 5 and delta parity 6 based on updated data 2, data 2, and the encoding function and sends the delta parity information to the DS processing unit 16. For instance, DS unit 2 generates the delta parity information in accordance with formulas delta parity 5=rebuilt partial (for parity 5 based on updated data 2)−rebuilt partial (for parity 5 based on data 2) and delta parity 6=rebuilt partial (for parity 6 based on updated data 2)−rebuilt partial (for parity 6 based on data 2) and sends the delta parity information to a corresponding DS processing unit 16. The DS unit 2 generates such a rebuilt partial (for parity 5 based on updated data 2) by multiplying an inverted square matrix of a unity matrix of an encoding matrix of the encoding function by a data matrix including the updated data 2 by a row of the encoding matrix corresponding to parity 5.

FIG. 14D is a schematic block diagram of another embodiment of a computing system of a fourth step of a data update scenario, where a dispersed storage (DS) processing unit 16 outputs delta parity information to one or more DS units associated with storing parity information and each of the one or more DS units generates and stores updated parity information based on the parity information, stored parity information, and encoding information. For example, the DS processing unit 16 outputs delta parity 5 to DS unit 5 and delta parity 6 to DS unit 6. DS unit 5 retrieves parity 5 (e.g., from a local DS unit 5 memory), wherein parity 5 is associated with updated parity 5. DS unit 5 generates updated parity 5 in accordance with a formula updated parity 5=parity 5+delta parity 5. DS unit 5 stores updated parity 5 (e.g., in the local memory), replacing parity 5. DS unit 6 retrieves parity 6 (e.g., from a local DS unit 6 memory), wherein parity 6 is associated with updated parity 5. DS unit 6 generates updated parity 6 in accordance with a formula updated parity 6=parity 6+delta parity 6. DS unit 6 stores updated parity 6 (e.g., in the local DS unit 6 memory), replacing parity 6.

FIG. 15A is a schematic block diagram of an embodiment of a dispersed storage system that includes an update slice module 480, a generate error recovery information module 482, and an update error recovery information module 484. The update slice module 480, when operable within a computing device, causes the computing device to update an encoded data slice 490 of a set of encoded data slices to produce an updated encoded data slice 486, wherein data is encoded in accordance with a dispersed storage error coding function to produce the set of encoded data slices and wherein at least some of the encoded data slices of the set of encoded data slices include error recovery information. For example, the update slice module 480 receives updated data, determines an identity of the encoded data slice 490 based on at least one difference between the data and the updated data, and generates the updated encoded data slice 486 based on the difference and in accordance with the dispersed storage error coding function.

The generate error recovery information module 482, when operable within a second computing device, causes the second computing device to, for each one of the at least some of the encoded data slices that include error recovery information, generate partial error recovery information based on one or more of: the encoded data slice 490, the updated encoded data slice 486, update information, and the dispersed storage error coding function to produce a collection of partial error recovery information 488. The update information includes one or more of a slice name, a revision number of the updated encoded data slice, a generator matrix, an encoding matrix, a pillar number of the updated encoded data slice.

The generate error recovery information module 482 functions to generate one of the collection of partial error recovery information by generating a first term (e.g., a partially encoded data slice utilizing the updated encoded data source 486) of a corresponding one of the at least some of the encoded data slices that includes the error recovery information based on the updated encoded data slice 486 in accordance with the dispersed storage error coding function, generating a second term (e.g., another partially encoded data slice utilizing the encoded data slice 490) of the corresponding one of the at least some of the encoded data slices that includes the error recovery information based on the encoded data slice 490 in accordance with the dispersed storage error coding function, and performing a mathematical function on the first and second terms to produce the one of the collection of partial error recovery information. For example, the generate error recovery information module 482 adds the first and second terms to produce the one of the collection of partial error recovery information. As another example, the generate error recovery information module 482 performs an exclusive OR logical function on the first and second terms to produce the one of the collection of partial error recovery information.

The generate error recovery information module 482 functions to generate the first term by obtaining an encoding matrix of the dispersed storage error coding function (e.g., retrieve from local memory, receive), reducing the encoding matrix to produce a square matrix that excludes one or more rows including a row associated with the corresponding one of the at least some of the encoded data slices that includes the error recovery information (e.g., alternatively may receive the square matrix), inverting the square matrix to produce an inverted matrix (e.g., alternately may receive the inverted matrix), matrix multiplying the inverted matrix by the updated encoded data slice 486 to produce a vector, and matrix multiplying the vector by a row of the encoding matrix corresponding to the corresponding one of the at least some of the encoded data slices that includes the error recovery information to produce the first term. The generate error recovery information module 482 functions to generate the second term by matrix multiplying the inverted matrix by the encoded data slice 490 to produce a second vector and matrix multiplying the second vector by the row of the encoding matrix corresponding to the corresponding one of the at least some of the encoded data slices that includes the error recovery information to produce the second term.

The update error recovery information module 484, when operable within the first or the second computing device, causes the first or the second computing device to update the error recovery information of an encoded data slice 492 of the at least some of the encoded data slices that include error recovery information based on a corresponding one of the collection of partial error recovery information 488 to produce an encoded data slice that includes updated error recovery information 494. The update error recovery information module 484 functions to update the error recovery information by executing a mathematical function on the encoded data slice that includes the error recovery information 492 and the corresponding one of the collection of partial error recovery information 488 to produce the encoded data slice that includes updated error recovery information 494. For example, update error recovery information module 484 adds the encoded data slice that includes the error recovery information 492 and the corresponding one of the collection of partial error recovery information 488 to produce the encoded data slice that includes updated error recovery information 494. As another example, update error recovery information module 484 performs an exclusive OR function on the encoded data slice that includes the error recovery information 492 and the corresponding one of the collection of partial error recovery information 488 to produce the encoded data slice that includes updated error recovery information 494.

Figure 15B:
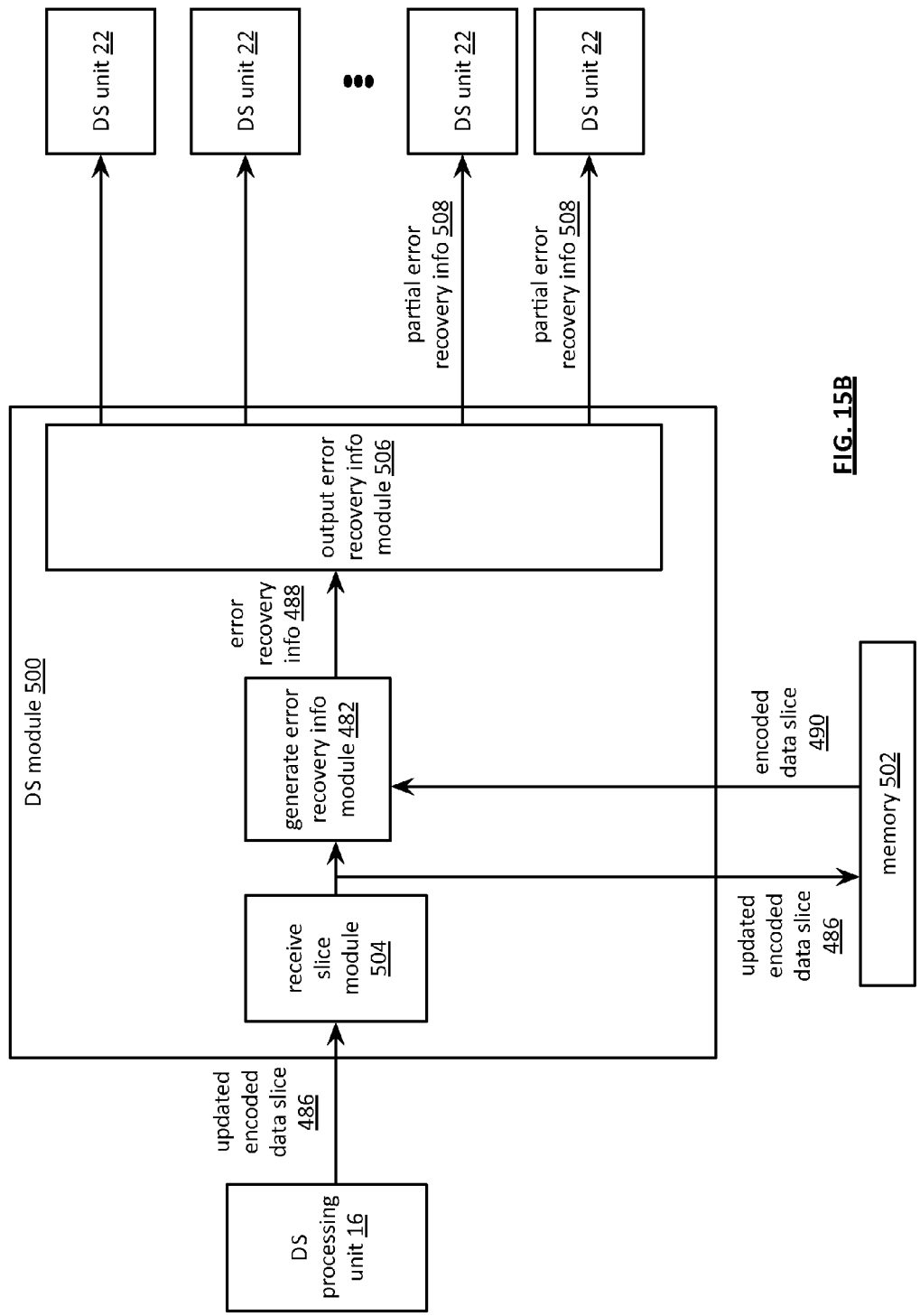
FIG. 15B is a schematic block diagram of another embodiment of a computing system in accordance with the present invention.

FIG. 15B is a schematic block diagram of another embodiment of a computing system that includes a dispersed storage (DS) processing unit 16, a computing device 501 (e.g., a DS unit 22, a user device, another DS processing unit), and a set of DS units 22. The computing device 501 includes a DS module 500 and a memory 502. The memory 502 may be implemented utilizing one or more memory devices, wherein each memory device includes at least one of a magnetic drive memory, a solid-state memory, and an optical drive memory. The DS module 500 includes a receive slice module 504, a generate error recovery information module 482, and an output error recovery information module 506.

The receive slice module 504, when operable within the computing device 501, causes the computing device to facilitate receiving an updated encoded data slice 486, wherein the updated encoded data slice 486 is an updated version of an encoded data slice 490 of a set of encoded data slices, wherein data is encoded in accordance with a dispersed storage error coding function to produce the set of encoded data slices and wherein at least some of the encoded data slices of the set of encoded data slices include error recovery information. The receive slice module 504 is further operable to facilitate storing the updated encoded data slice 486 (e.g., in memory 502).

The generate error recovery information module 482, when operable within the computing device 501, causes the computing device to, for each one of the at least some of the encoded data slices that include error recovery information, generate partial error recovery information 508 based on one or more of: the encoded data slice 490, the updated encoded data slice 486, update information, and the dispersed storage error coding function to produce a collection of partial error recovery information 488. The update information includes one or more of a slice name, a revision number of the updated encoded data slice, a generator matrix, an encoding matrix, a pillar number of the updated encoded data slice. The output error recovery information module 506, when operable within the computing device 501, causes the computing device to facilitate outputting the collection of partial error recovery information 488 for storage in at least some of the set of DS units 22, which store the at least some of the encoded data slices that include error recovery information. For example, the output error recovery information module 506 outputs partial error recovery information 508 to a fifth DS unit, wherein the fifth DS unit corresponds to one of the at least some of the encoded data slices of the set of encoded data slices that includes error recovery information and the partial error recovery information 508 corresponds to the fifth DS unit.

Figure 15C:
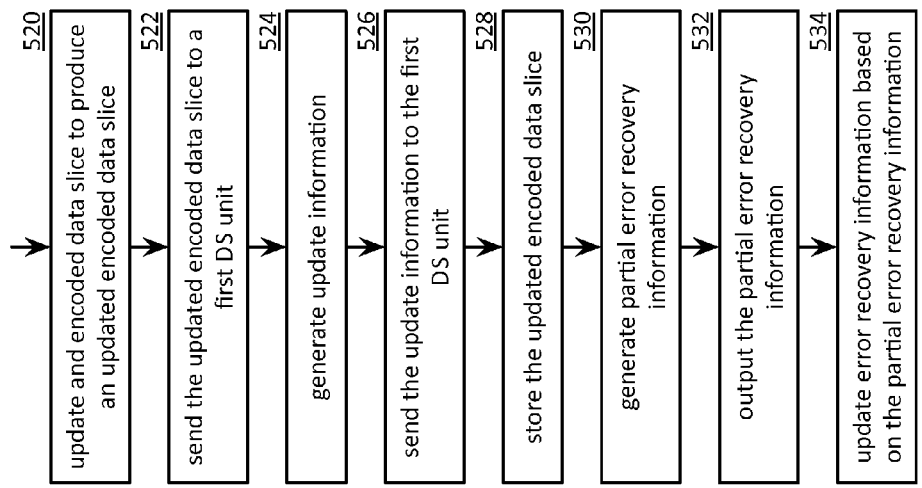
FIG. 15C is a flowchart illustrating an example of updating error recovery information in accordance with the present invention.

FIG. 15C is a flowchart illustrating an example of updating error recovery information. The method begins at step 520 where a dispersed storage (DS) processing module (e.g., of a DS processing unit) updates an encoded data slice of a set of encoded data slices to produce an updated encoded data slice, wherein data is encoded in accordance with a dispersed storage error coding function to produce the set of encoded data slices and wherein at least some of the encoded data slices of the set of encoded data slices include error recovery information. The method continues at step 522 where the DS processing module sends the updated encoded data slice to a first DS unit of a set of DS units. The method continues at step 524 where the DS processing module generates update information to include one or more of: a slice name, a revision number of the updated encoded data slice, a generator matrix, an encoding matrix, a pillar number of the updated encoded data slice. The method continues at step 526 where the DS processing module sends the update information to the first DS unit.

The method continues at step 528 where the first DS unit stores the updated encoded data slice. In addition, the first DS unit stores the update information when the first DS unit receives the update information. For each one of the at least some of the encoded data slices that include error recovery information, the method continues at step 530 where the first DS unit generates partial error recovery information based on one or more of: the encoded data slice, the updated encoded data slice, update information, and the dispersed storage error coding function to produce a collection of partial error recovery information. The generating the one of the collection of partial error recovery information includes generating a first term of a corresponding one of the at least some of the encoded data slices that includes the error recovery information based on the updated encoded data slice in accordance with the dispersed storage error coding function, generating a second term of the corresponding one of the at least some of the encoded data slices that includes the error recovery information based on the encoded data slice in accordance with the dispersed storage error coding function, and performing a mathematical function (e.g., subtraction, exclusive OR) on the first and second terms to produce the one of the collection of partial error recovery information.

The generating the first term includes obtaining an encoding matrix of the dispersed storage error coding function, reducing the encoding matrix to produce a square matrix that excludes one or more rows including a row associated with the corresponding one of the at least some of the encoded data slices that includes the error recovery information, inverting the square matrix to produce an inverted matrix, matrix multiplying the inverted matrix by the updated encoded data slice to produce a vector, and matrix multiplying the vector by a row of the encoding matrix corresponding to the corresponding one of the at least some of the encoded data slices that includes the error recovery information to produce the first term. The generating the second term includes matrix multiplying the inverted matrix by the encoded data slice to produce a second vector and matrix multiplying the second vector by the row of the encoding matrix corresponding to the corresponding one of the at least some of the encoded data slices that includes the error recovery information to produce the second term.

The method continues at step 532 where the first DS unit outputs the collection of partial error recovery information for storage (e.g., as a portion of updated encoded data slices) in at least some of the set of DS units, which store the at least some of the encoded data slices that include error recovery information. The method continues at step 534 where one of the at least some of the set of DS units updates the error recovery information of an encoded data slice of the at least some of the encoded data slices that includes the error recovery information based on a corresponding one of the collection of partial error recovery information to produce an encoded data slice that includes updated error recovery information. The updating the error recovery information includes executing a mathematical function (e.g., summing, exclusive OR) on the encoded data slice that includes the error recovery information and the corresponding one of the collection of partial error recovery information to produce the encoded data slice that includes updated error recovery information. Next, the one of the at least some of the set of DS units stores the encoded data slice that includes updated error recovery information.

FIG. 16 is a diagram illustrating an example of a directory file structure that includes directory files 1-3. Alternatively, any number of directory files may be included. The directory files 1-3 may be utilized to affiliate file system filenames to storage locations within a dispersed storage network (DSN) memory. The storage location may be specified by a source name within the DSN memory. The source name may include one or more of a vault identifier (ID), a generation ID, and an object number. The object number may include a random number that is permanently assigned to data to be stored in the DSN memory upon a first storage sequence of the data. A vault source name includes a source name and a data segment ID.

Each directory file of the directory files 1-3 may be stored as encoded directory slices in the DSN memory at a location affiliated with the directory file. For example, directory file 1 is dispersed storage error encoded to produce one or more sets of encoded directory 1 slices that are stored in the DSN memory at location source name 1 (e.g., B530). As another example, directory file 2 is dispersed storage error encoded to produce one or more sets of encoded directory 2 slices that are stored in the DSN memory at location source name 2 (e.g., 42DA). As yet another example, directory file 3 is dispersed storage error encoded to produce one or more sets of encoded directory 3 slices that are stored in the DSN memory at location source name 3 (e.g., E9C2).

Each directory file of the directory files 1-3 includes a file name field 540, a file source name field 542, a snapshot field 544, an extended data field 546, and a linked directory source names field 548. Each field of the directory file includes one or more entries, wherein each entry of the one or more entries per field is associated with an entry within each other field of a common row of the directory file. The file name field 540 includes one or more entries, wherein each entry of the one or more entries includes a file system file name including at least one of a root directory name, a directory name, and a file name. For example, a directory name entry of the file name field includes /lists and a file name entry of the file name field includes /file.doc and /pic2.jpg.

The file source name field 542 includes one or more entries, wherein each entry of the one or more entries includes a source name of a corresponding entry (e.g., same row) in the file name field. For example, a file source name field entry of B673 associated with a file name field entry of /file.doc indicates that the file with file name /file.doc is stored in the DSN memory (e.g., as a plurality of sets of encoded data slices) at a location with a source name of B673. As another example, a file with file name /pic2.jpg is stored in the DSN memory at a location with a source name of 7AA7. As yet another example, a directory file with directory name /lists is stored in the DSN memory at a location with a source name of 90DE. Accessing such a directory file associated with /lists may be utilized to access one or more files under the directory /lists. For example, accessing the directory file stored in the DSN memory at the location with the source name of 90DE may be utilized to access a file associated with a file name of /lists/summary.doc. As another example, accessing the directory file stored in the DSN memory at the location with the source name of 90DE may be utilized to access a sub-directory of /lists/documents and accessing the sub-directory of /lists/documents may be utilized access a file associated with a file name of /lists/documents/reportA.doc. As such, the directory file structure may be associated with any number of levels (e.g., sub-directories).

The snapshot field 544 includes one or more entries, wherein each entry the one or more entries includes a snapshot ID of a corresponding entry (e.g., same row) in the file name field. For example, a snapshot field entry of 1 associated with the file name field entry of /file.doc indicates that the file with file name /file.doc is associated with a snapshot ID of 1. As another example, the file with file name /pic2.jpg is associated with a snapshot ID of 2. As yet another example, the directory file with directory name /lists is associated with a snapshot ID of 5.

The extended data field 546 includes one or more entries, wherein each entry of the one or more entries includes at least one of a timestamp, a size indicator, a segmentation allocation table (SAT) vault source name, metadata, and a content portion associated with a corresponding entry (e.g., same row) in the file name field. For example, an extended data field entry of 329d associated with the file name field entry of /file.doc indicates that the file with file name /file.doc is associated with an extended data value of 329d. As another example, the file with file name /pic2.jpg is associated with an extended data value of a401. As yet another example, the directory file with directory name /lists is associated with an extended data value of fb79.

The linked directory source names field 548 includes one or more entries, wherein each entry the one or more entries includes zero or more source names of linked directory files associated with a corresponding entry (e.g., same row) in the file name field and/or a corresponding entry in the snapshot field. For example, a linked directory source names field entry of 42DA associated with the file name field entry of /file.doc indicates that the file with file name /file.doc and snapshot ID 1 is associated with a linked directory file with a DSN address of 42DA. As another example, the file with file name /pic2.jpg and snapshot ID 2 is associated with the linked directory file with the DSN address of 42DA and is associated with a linked directory file with a DSN address of E9C2. As yet another example, the directory file with directory name /lists is not associated with a linked directory file.

The linked directory source name field 548 provides linkage between two or more portions of the directory file structure. The linkage may be utilized when directory files include affiliated entries. The affiliation includes entries that share common filenames with different snapshot IDs, entries that share common filenames with different revisions, entries of file names that are moved from a first directory to a second directory, and entries of filenames that are cloned from a first directory to a second directory. For example, a second revision of file name /pic2.jpg of a second snapshot included in directory file 1 is linked to a first revision of file name /pic.jpg of a first snapshot included in directory file 2 and is linked to a third revision of file name /pic3/jpg of a third snapshot included in directory file 3. As another example, a first revision of file name /file.doc of a first snapshot included in directory file 1 is linked to a second revision of file name /file2.doc of a second snapshot included in directory file 2.

A request to delete a file may result in deletion of an associated directory file entry and in deletion of encoded data slices associated with the file in accordance with a deletion method. The deletion method may be based on one or more of a snapshot ID associated with a file name of the file from a primary directory file and one or more associated snapshot IDs and corresponding filenames from one or more linked directory files (e.g., utilizing one or more linked directory source names from the primary directory file).

For example, a plurality of encoded data slices associated with file name /file2.doc at source name B775 are deleted, a plurality of encoded data slices associated with file name /file.doc at source name B673 are deleted, a directory file 2 entry associated with file name /file2.doc is deleted, and a directory file 1 entry associated with file name /file.doc is deleted when a request is received to delete the file associated with the file name /file2.doc since file name/file2.doc is associated with a snapshot ID of 2, only one linked directory exists (e.g., directory file 1), an associated entry of linked directory file 1 for file name /file.doc is associated with a snapshot ID of 1 (e.g., older), and the deletion method specifies to delete older snapshots when a newer snapshot is deleted.

As another example, the directory file 1 entry associated with file name /file.doc is deleted when a request is received to delete the file associated with the file name /file.doc since file name/file.doc is associated with a snapshot ID of 1, only one linked directory exists (e.g., directory file 2), an associated entry of linked directory file 2 for file name /file2.doc is associated with a snapshot ID of 2 (e.g., newer), and the deletion method specifies to not delete newer snapshots and associated older snapshots one and older snapshot is deleted. The method to process a request to delete a file is discussed in greater detail with reference to FIG. 17.

Figure 17:
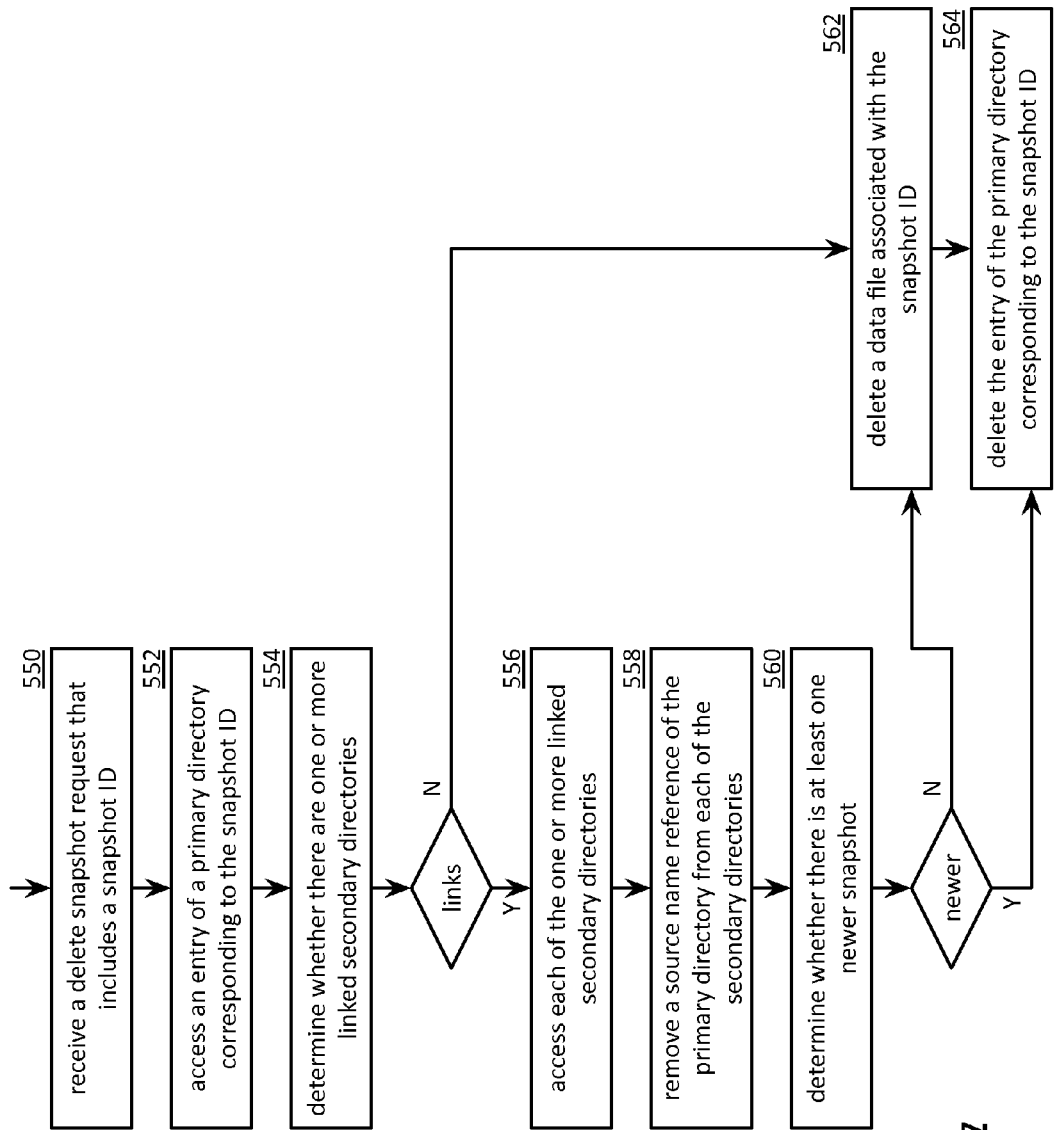
FIG. 17 is a flowchart illustrating an example of deleting a snapshot in accordance with the present invention.

FIG. 17 is a flowchart illustrating an example of deleting a snapshot. The method begins at step 550 where a processing module receives a delete snapshot request. The delete snapshot request includes one or more of a snapshot identifier (ID), a file name, a primary directory source name, and a vault ID. The method continues at step 552 where the processing module accesses an entry of a primary directory corresponding to the snapshot ID. The accessing includes one or more of obtaining (e.g., receiving, traversing a directory structure, a query) a source name of the primary directory, retrieving at least one set of encoded primary directory slices from a dispersed storage network (DSN) memory, dispersed storage error decoding the at least one set of encoded primary directory slices to produce a primary directory file, identifying an entry of the primary directory file corresponding to the snapshot ID and/or the file name, and extracting the entry of the primary directory file.

The method continues at step 554 where the processing module determines whether there are one or more linked secondary directories. The determination may be based on accessing a linked directory source names field of the entry of the primary directory file to determine whether at least one linked directory source name is present. The method branches to step 562 when the processing module determines that there is not one or more linked secondary directories (e.g., no linked directory source name is present). The method continues to step 556 when the processing module determines that there is one or more linked secondary directories.

The method continues at step 556 where the processing module accesses each of the one or more linked secondary directories. The accessing includes utilizing the at least one linked directory source name to retrieve at least one set of encoded secondary directory slices from the DSN memory, dispersed storage error decoding the at least one set of encoded secondary directory slices to produce one or more secondary directory files, identifying an entry of each secondary directory file of the one or more secondary directory files corresponding to the snapshot ID and/or the file name, and extracting the entry of each secondary directory file of the one or more secondary directory files.

The method continues at step 558 where the processing module removes a source name reference of the primary directory from each of the linked secondary directories. The removing includes deleting the source name of the primary directory from a linked directory source names field of each secondary directory file of the one or more secondary directory files, dispersed storage error encoding each secondary directory file to produce one or more sets of encoded secondary directory slices, and storing the one or more sets of encoded secondary directory slices in the DSN memory utilizing the at least one linked directory source name.

The method continues at step 560 where the processing module determines whether there is at least one newer snapshot. The determination may be based on extracting a snapshot ID entry from a snapshot of each entry of each secondary directory file of the one or more secondary directory files and comparing each snapshot ID entry to the snapshot ID of the primary directory. The processing module determines that there is at least one newer snapshot when at least one snapshot ID entry is greater than the snapshot ID of the primary directory. The method branches to step 564 when the processing module determines that there is at least one newer snapshot. The method continues to step 562 when the processing module determines that there is not at least one newer snapshot.

The method continues at step 562 where the processing module deletes the data file associated with the snapshot ID. The deleting includes extracting a source name of the data file from the entry of the primary directory file and outputting one or more delete encoded data slice messages to the DSN memory utilizing the source name of the data file such that a plurality of sets of encoded data slices associated with the data file and the snapshot ID are deleted from the DSN memory.

The method continues at step 564 where the processing module deletes the entry of the primary directory corresponding to the snapshot ID. The deleting includes deleting the entry of the primary directory file to produce a modified primary directory file, dispersed storage error encoding the modified primary directory file to produce at least one set of encoded modified primary directory slices, and outputting the at least one set of encoded modified primary directory slices to the DSN memory for storage therein utilizing the source name of the primary directory.

Figure 18:
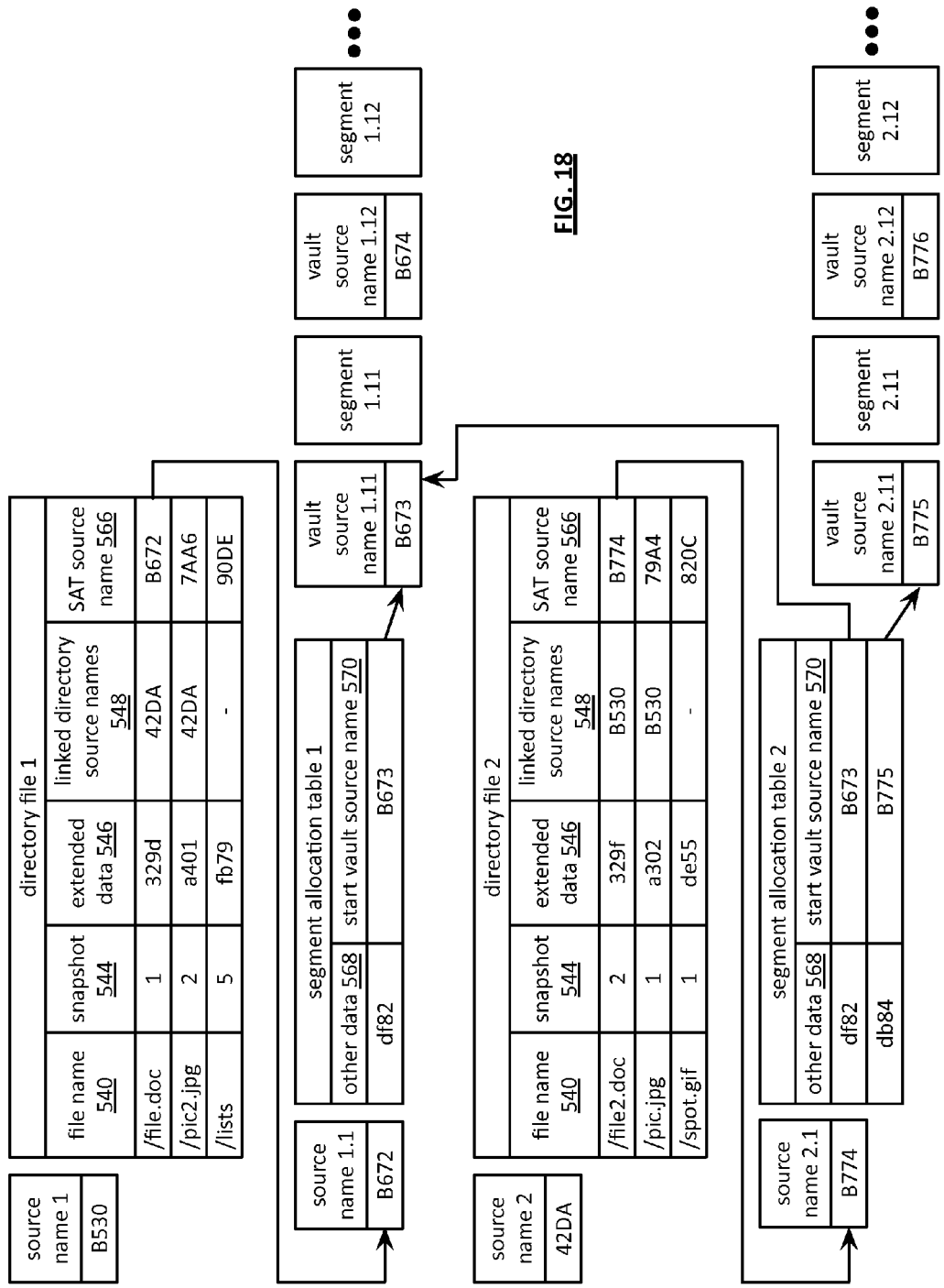
FIG. 18 is a diagram illustrating another example of a directory file structure in accordance with the present invention.

FIG. 18 is a diagram illustrating another example of a directory file structure that includes directory files 1-2, segment allocation tables (SAT) 1-2, a plurality of data segments 1.11, 1.12 etc., and a plurality of data segments 2.11, 2.12 etc. Alternatively, any number of directory files, SATs, and data segments may be included. The directory files 1-2 may be utilized to affiliate file system filenames to storage locations within a dispersed storage network (DSN) memory. The storage location may be specified by a source name and/or a vault source name within the DSN memory.

Each directory file of the directory files 1-2 may be stored as encoded directory slices in the DSN memory at a location affiliated with the directory file. For example, directory file 1 is dispersed storage error encoded to produce one or more sets of encoded directory 1 slices that are stored in the DSN memory at location source name 1 (e.g., B530). As another example, directory file 2 is dispersed storage error encoded to produce one or more sets of encoded directory 2 slices that are stored in the DSN memory at location source name 2 (e.g., 42DA).

Each directory file of the directory files 1-2 includes a file name field 540, a snapshot field 544, an extended data field 546, a linked directory source names field 548, and a SAT source name field 566. Each field of the directory file includes one or more entries, wherein each entry of the one or more entries per field is associated with an entry within each other field of a common row of the directory file. The file name field 540 includes one or more entries, wherein each entry of the one or more entries includes a file system file name including at least one of a root directory name, a directory name, and a file name. For example, a directory name entry of the file name field includes /lists and a file name entry of the file name field includes /file.doc and /pic2.jpg.

The snapshot field 544 includes one or more entries, wherein each entry the one or more entries includes a snapshot ID of a corresponding entry (e.g., same row) in the file name field. For example, a snapshot field entry of 1 associated with the file name field entry of /file.doc indicates that the file with file name /file.doc is associated with a snapshot ID of 1. As another example, the file with file name /pic2.jpg is associated with a snapshot ID of 2. As yet another example, the directory file with directory name /lists is associated with a snapshot ID of 5.

The extended data field 546 includes one or more entries, wherein each entry of the one or more entries includes at least one of a timestamp, a size indicator, metadata, and a content portion associated with a corresponding entry (e.g., same row) in the file name field. For example, an extended data field entry of 329d associated with the file name field entry of /file.doc indicates that the file with file name /file.doc is associated with an extended data value of 329d. As another example, the file with file name /pic2.jpg is associated with an extended data value of a401. As yet another example, the directory file with directory name /lists is associated with an extended data value of fb79.

The linked directory source names field 548 includes one or more entries, wherein each entry the one or more entries includes zero or more source names of linked directory files associated with a corresponding entry (e.g., same row) in the file name field and/or a corresponding entry in the snapshot field. For example, a linked directory source names field entry of 42DA associated with the file name field entry of /file.doc indicates that the file with file name /file.doc and snapshot ID 1 is associated with a linked directory file with a DSN address of 42DA. As another example, the file with file name /pic2.jpg and snapshot ID 2 is associated with the linked directory file with the DSN address of 42DA. As yet another example, the directory file with directory name /lists is not associated with a linked directory file.

The linked directory source name field 548 further provides linkage between two or more portions of the directory file structure. The linkage may be utilized when directory files include affiliated entries. The affiliation includes entries that share common filenames with different snapshot IDs, entries that share common filenames with different revisions, entries of file names that are moved from a first directory to a second directory, and entries of filenames that are cloned from a first directory to a second directory. For example, a second revision of file name /pic2.jpg of a second snapshot included in directory file 1 is linked to a first revision of file name /pic.jpg of a first snapshot included in directory file 2. As another example, a first revision of file name /file.doc of a first snapshot included in directory file 1 is linked to a second revision of file name /file2.doc of a second snapshot included in directory file 2.

The SAT source name field 566 includes one or more entries, wherein each entry of the one or more entries includes a SAT source name of a corresponding entry (e.g., same row) in the file name field. For example, a SAT source name field entry of B672 associated with a file name field entry of /file.doc indicates that the file with file name /file.doc is stored in the DSN memory (e.g., as a plurality of sets of encoded data slices) at a location specified in a SAT 1, wherein SAT 1 is stored in the DSN memory at location B672. As another example, a file with file name /pic2.jpg is stored in the DSN memory at a location specified in a SAT, wherein the SAT is stored in the DSN memory at location 7AA6. As yet another example, a directory file with directory name /lists is stored in the DSN memory at a location specified in a SAT, wherein the SAT is stored in the DSN memory at location 90DE. Accessing such a directory file associated with /lists may be utilized to access one or more files under the directory /lists. For example, accessing the directory file stored in the DSN memory may be utilized to access a file associated with a file name of /lists/summary-.doc. As another example, accessing the directory file stored in the DSN memory may be utilized to access a sub-directory of /lists/documents and accessing the sub-directory of /lists/documents may be utilized access a file associated with a file name of /lists/documents/reportA.doc. As such, the directory file structure may be associated with any number of levels (e.g., sub-directories).

Each SAT of SATs 1-2 includes an other data field 568 and a start vault source name field 570. Each field of the SAT includes one or more entries, wherein each entry of the one or more entries per field is associated with an entry within each other field of a common row of the SAT. The other data field 568 includes one or more entries, wherein each entry of the one or more entries includes a data segment size indicator, a segmentation approach (e.g., fixed size, ramping size), and a total length of all segments indicator.

The start vault source name field 570 includes one or more entries, wherein each entry of the one or more entries includes a vault source name associated with a first data segment of an associated file. A first set of encoded data slices corresponding to the first data segment are stored in the DSN memory at a location specified by the vault source name. A second set of encoded data slices corresponding to a second data segment is stored in the DSN memory at a location specified by the vault source name plus offset of one. Each successive set of encoded data slices corresponding to successive data segments is stored in the DSN memory allocation specified by the vault source name plus a segment number offset (e.g., data segment number−1). A number of successive sets of encoded data slices corresponding to the number of successive data segments is based on the total length of all data segments indicator of the other data entry of the SAT. For example, a first set of encoded data slices corresponding to a first data segment 1.11 of the file /file.doc is stored in the DSN memory at a vault source name of B673, a second set of encoded data slices corresponding to a second data segment 1.12 of the file /file.doc is stored in the DSN memory at a vault source name of B674 (e.g., B673+2-1), etc. until the entire data file stored (e.g., a number of data segments multiplied by the size of each data segment equals the total length of all data segments indicator).

A request to delete a file may result in deletion of an associated directory file entry, deletion of an associated SAT, and deletion of encoded data slices associated with the file in accordance with a deletion method. The deletion method may be based on one or more of a snapshot ID associated with a file name of the file from a primary directory file and one or more associated snapshot IDs and corresponding filenames from one or more linked directory files (e.g., utilizing one or more linked directory source names from the primary directory file).

For example, a plurality of encoded data slices associated with file name /file2.doc starting at vault source name B775 are deleted, one or more sets of encoded SAT slices associated with file name /file2.doc at vault source name B774 are deleted, a plurality of encoded data slices associated with file name /file.doc starting at vault source name B673 are deleted, one or more sets of encoded SAT slices associated with file name /file.doc at vault source name B672 are deleted, a directory file 2 entry associated with file name /file2.doc is deleted, and a directory file 1 entry associated with file name /file.doc is deleted when a request is received to delete the file associated with the file name /file2.doc since file name/file2.doc is associated with a snapshot ID of 2, only one linked directory exists (e.g., directory file 1), an associated entry of linked directory file 1 for file name /file.doc is associated with a snapshot ID of 1 (e.g., older), and the deletion method specifies to delete older snapshots when a newer snapshot is deleted.

As another example, the directory file 1 entry associated with file name /file.doc is deleted and the one or more sets of encoded SAT slices associated with file name /file.doc at vault source name B672 are deleted, when a request is received to delete the file associated with the file name /file.doc since file name/file.doc is associated with a snapshot ID of 1, only one linked directory exists (e.g., directory file 2), an associated entry of linked directory file 2 for file name /file2.doc is associated with a snapshot ID of 2 (e.g., newer), and the deletion method specifies to not delete newer snapshots and associated older snapshots one and older snapshot is deleted. The method to process a request to delete a file is discussed in greater detail with reference to FIG. 19.

Figure 19:
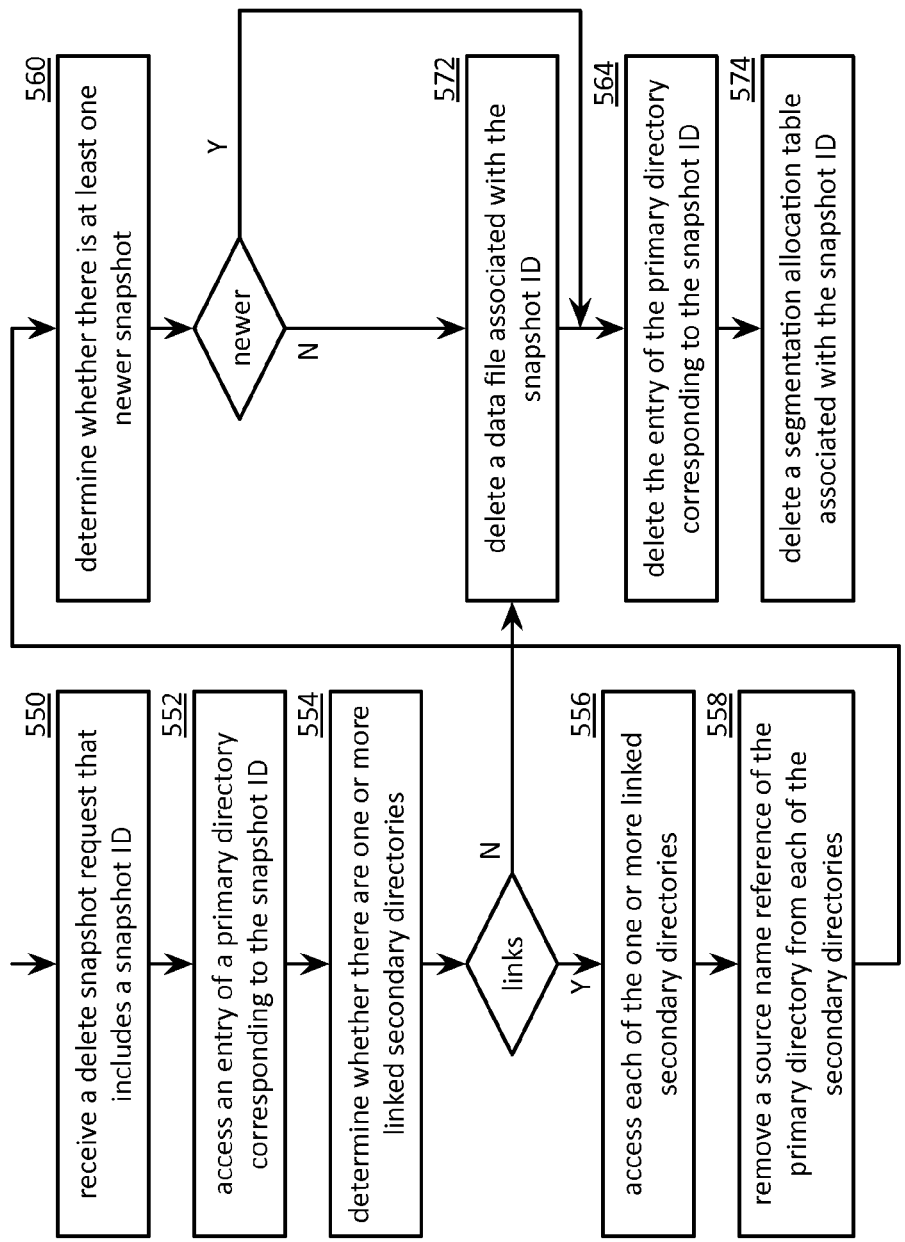
FIG. 19 is a flowchart illustrating another example of deleting a snapshot in accordance with the present invention.

FIG. 19 is a flowchart illustrating another example of deleting a snapshot, which include similar steps to FIG. 17. The method begins with steps 550-554 of FIG. 17 where a processing module receives a delete snapshot request, accesses an entry of a primary directory corresponding to the snapshot identifier (ID), and determines whether there are one or more linked secondary directories. The method branches to step 572 when the processing module determines that there is not one or more linked secondary directories (e.g., no linked directory source name is present). The method continues to step 556 of FIG. 17 when the processing module determines that there is one or more linked secondary directories.

The method continues with steps 556-560 of FIG. 17 where the processing module accesses each of the one or more linked secondary directories, removes a source name reference of the primary directory from each of the linked secondary directories, and determines whether there is at least one newer snapshot. The method branches to step 564 of FIG. 17 when the processing module determines that there is at least one newer snapshot. The method continues to step 572 when the processing module determines that there is not at least one newer snapshot.

The method continues at step 572 where the processing module deletes the data file associated with the snapshot ID. The deleting includes extracting a segmentation allocation table (SAT) source name from the entry of the primary directory file, retrieving at least one set of encoded SAT slices based on the SAT source name, dispersed storage error decoding the at least one set of encoded SAT slices to produce a SAT, extracting a start vault source name of a first data segment corresponding to the data file from the SAT, determining a plurality of vault source names associated with other data segments corresponding to the data file based on extracting other data from the SAT (e.g., a data segment size indicator, a total length of all segments indicator), and outputting one or more delete encoded data slice messages to a dispersed storage network (DSN) memory utilizing the start vault source name and the plurality of vault source names such that a plurality of sets of encoded data slices associated with the data file and the snapshot ID are deleted from the DSN memory.

The method continues with step 564 of FIG. 17 where the processing module deletes the entry of the primary directory corresponding to the snapshot ID and continues at step 574 where the processing module deletes a segmentation allocation table associated with the snapshot ID. The deleting includes outputting one or more delete encoded SAT slice messages to the DSN memory utilizing the SAT source name corresponding to the entry of the primary directory file such that at least one set of encoded SAT slices associated with the data file and the snapshot ID are deleted from the DSN memory.

As may be used herein, the terms "substantially" and "approximately" provides an industry-accepted tolerance for its corresponding term and/or relativity between items. Such an industry-accepted tolerance ranges from less than one percent to fifty percent and corresponds to, but is not limited to, component values, integrated circuit process variations, temperature variations, rise and fall times, and/or thermal noise. Such relativity between items ranges from a difference of a few percent to magnitude differences. As may also be used herein, the term(s) "operably coupled to", "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to". As may even further be used herein, the term "operable to" or "operably coupled to" indicates that an item includes one or more of power connections, input(s), output(s), etc., to perform, when activated, one or more its corresponding functions and may further include inferred coupling to one or more other items. As may still further be used herein, the term "associated with", includes direct and/or indirect coupling of separate items and/or one item being embedded within another item. As may be used herein, the term "compares favorably", indicates that a comparison between two or more items, signals, etc., provides a desired relationship. For example, when the desired relationship is that signal 1 has a greater magnitude than signal 2, a favorable comparison may be achieved when the magnitude of signal 1 is greater than that of signal 2 or when the magnitude of signal 2 is less than that of signal 1.

As may also be used herein, the terms "processing module", "processing circuit", and/or "processing unit" may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may be, or further include, memory and/or an integrated memory element, which may be a single memory device, a plurality of memory devices, and/or embedded circuitry of another processing module, module, processing circuit, and/or processing unit. Such a memory device may be a read-only memory, random access memory, volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The present invention has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claimed invention. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claimed invention.

One of average skill in the art will also recognize that the functional building blocks, and other illustrative blocks, modules and components herein, can be implemented as illustrated or by discrete components, application specific integrated circuits, processors executing appropriate software and the like or any combination thereof.

The present invention may have also been described, at least in part, in terms of one or more embodiments. An embodiment of the present invention is used herein to illustrate the present invention, an aspect thereof, a feature thereof, a concept thereof, and/or an example thereof. A physical embodiment of an apparatus, an article of manufacture, a machine, and/or of a process that embodies the present invention may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

While the transistors in the above described figure(s) is/are shown as field effect transistors (FETs), as one of ordinary skill in the art will appreciate, the transistors may be implemented using any type of transistor structure including, but not limited to, bipolar, metal oxide semiconductor field effect transistors (MOSFET), N-well transistors, P-well transistors, enhancement mode, depletion mode, and zero voltage threshold (VT) transistors.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the present invention. A module includes a processing module, a functional block, hardware, and/or software stored on memory for performing one or more functions as may be described herein. Note that, if the module is implemented via hardware, the hardware may operate independently and/or in conjunction software and/or firmware. As used herein, a module may contain one or more sub-modules, each of which may be one or more modules.

While particular combinations of various functions and features of the present invention have been expressly described herein, other combinations of these features and functions are likewise possible. The present invention is not limited by the particular examples disclosed herein and expressly incorporates these other combinations.

What is claimed is:

1. A method for a device of a distributed storage network (DSN) to generate a secure signature on an item without a locally stored private key of the device, the method comprises:

generating a first key representation of a private key by randomly generating one or more first values, and generating a second value based on key share generating mathematical function of $(x+y+z) \bmod \Phi(n) = d$, where d is the private key, x and y are one or more integers corresponding to the one or more first values, z is an integer corresponding to the second value, and $\Phi(n)$ is an Euler's totient function;

generating a second key representation of the private key by generating one or more third values, and generating a fourth value based on the one or more third values, the private key, and a key share generating mathematical function;

selecting, by the device, a set of storage units of the DSN to perform the secure signature, wherein differing sets of storage units of the DSN store a plurality of key representations of the private key, including the first key representation and the second key representation;

identifying, by the device and based on an association with the set of storage units, a key representation index corresponding to a key representation of the plurality of key representations stored in the selected set of storage units, wherein a mathematical encoding is performed on the private key to produce a plurality of key shares, and wherein the plurality of key shares is referenced by the key representation index;

sending, by the device, a signature request, the key representation index, and an item to be signed to the set of storage units;

identifying, by each storage unit of the set of storage units, a corresponding one of the plurality of key shares based on the key representation index;

generating, by each storage unit of the set of storage units, a signature contribution for the item to be signed using the corresponding one of the plurality of key shares; and generating, by the device, a secure signature on the item based on the signature contributions of the set of storage units.

2. The method of claim 1, wherein the selecting the set of storage units of the DSN further comprises at least one of:
    selecting the set of storage units based on reliability of the set of storage units; and
    selecting the set of storage units based on performance of the set of storage units.

3. The method of claim 1, wherein the identifying the key representation index comprises:
    selecting the key representation index from a plurality of key representation indexes, wherein the plurality of key representation indexes corresponds to the plurality of key representations of the private key.

4. The method of claim 3 further comprises:
    each of the plurality of key representations being a different mathematical encoding of the private key and including a different plurality of key shares.

5. The method of claim 4 further comprises:
    the pluralities of key shares of the plurality of key representations are stored in differing sets of storage units, wherein a storage unit is included in more than one set of the differing sets of storage units.

6. The method of claim 1, wherein the generating, by each storage unit of the set of storage units, a signature contribution comprises:
    performing, by each storage unit of the set of storage units, a corresponding partial signature mathematical function on the item using the corresponding one of the plurality of key shares to generate the signature contribution.

7. The method of claim 6, wherein the corresponding partial signature mathematical function comprises:
    the signature contribution=(the item to be signed)$^{keyshare}$ mod n, wherein n is a public modulus.

8. The method of claim 1, wherein generating a first key representation of the private key further includes:
    sending, by the device, the one or more first values and the second value to the set of storage units.

9. The method of claim 1, wherein generating a second key representation of the private key further includes:
    sending, by the device, the one or more third values and the fourth value to the set of storage units.

10. A non-transitory computer readable storage medium comprises:
    a first memory section storing operational instructions that, when executed by a computing device, causes the computing device to:
        select a set of storage units of a distributed storage network (DSN) to perform a secure signature on an item, wherein differing sets of storage units of the DSN store a plurality of key representations of a private key associated with the computing device, the plurality of key representations including at least a first key representation and a second key representation;
        identify, based on an association with the set of storage units, a key representation index corresponding to a key representation of the plurality of key representations stored in the selected set of storage units, wherein a mathematical encoding is performed on the private key to produce a plurality of key shares, and wherein the plurality of key shares is referenced by the key representation index;
        send a signature request, the key representation index, and an item to be signed to the set of storage units;
    a second memory section storing operational instructions that, when executed by a storage unit of the set of storage units, causes the storage unit to:
        identify a corresponding one of the plurality of key shares based on the key representation index;
        generate a signature contribution for the item to be signed using the corresponding one of the plurality of key shares;
    a third memory section storing operational instructions that, when executed by the computing device, causes the computing device to:
        generate a secure signature on the item based on the signature contributions of the set of storage units; and
    a fourth memory section storing operational instructions that, when executed by the computing device, causes the computing device to:
        generate the first key representation by:
            randomly generating one or more first values; and
            generating a second value based on key share generating mathematical function of $(x+y+z) \bmod \Phi(n)=d$, where d is the private key, x and y are one or more integers corresponding to the one or more first values, z is an integer corresponding to the second value, and $\Phi(n)$ is an Euler's totient function; and
        generate the second key representation by:
            generating one or more third values; and
            generating a fourth value based on the one or more third values, the private key, and a key share generating mathematical function.

11. The non-transitory computer readable storage medium of claim 10, wherein the first memory section further comprises operational instructions that, when executed by the computing device, causes the computing device to select the set of storage units of the DSN further by at least one of:
    selecting the set of storage units based on reliability of the set of storage units; and selecting the set of storage units based on performance of the set of storage units.

12. The non-transitory computer readable storage medium of claim 10, wherein the first memory section further comprises operational instructions that, when executed by the computing device, causes the computing device to identify the key representation index by:
   selecting the key representation index from a plurality of key representation indexes, wherein the plurality of key representation indexes corresponds to the plurality of key representations of the private key.

13. The non-transitory computer readable storage medium of claim 12 further comprises:
   each of the plurality of key representations being a different mathematical encoding of the private key and including a different plurality of key shares.

14. The non-transitory computer readable storage medium of claim 13 further comprises:
   the pluralities of key shares of the plurality of key representations are stored in differing sets of storage units, wherein a storage unit is included in more than one set of the differing sets of storage units.

15. The non-transitory computer readable storage medium of claim 10, wherein the second memory section further comprises operational instructions that, when executed by the storage unit, causes the storage unit to generate the signature contribution by:
   performing a corresponding partial signature mathematical function on the item using the corresponding one of the plurality of key shares to generate the signature contribution.

16. The non-transitory computer readable storage medium of claim 15, wherein the corresponding partial signature mathematical function comprises:
   the signature contribution=(the item to be signed)$^{keyshare}$ mod n, wherein n is a public modulus.

17. The non-transitory computer readable storage medium of claim 10, wherein the fourth memory section further comprises operational instructions that, when executed by the computing device, causes the computing device to send the one or more first values and the second value to the set of storage units.

18. The non-transitory computer readable storage medium of claim 10, wherein the fourth memory section further comprises operational instructions that, when executed by the computing device, causes the computing device to send the one or more third values and the fourth value to the set of storage units.

* * * * *